US012074711B2

(12) United States Patent
Cirik et al.

(10) Patent No.: US 12,074,711 B2
(45) Date of Patent: Aug. 27, 2024

(54) HYBRID AUTOMATIC REPEAT REQUEST ACKNOWLEDGEMENT CODEBOOK DETERMINATION

(71) Applicant: Ofinno, LLC, Reston, VA (US)

(72) Inventors: Ali Cagatay Cirik, Herndon, VA (US); Esmael Hejazi Dinan, McLean, VA (US); Yunjung Yi, Vienna, VA (US); Hua Zhou, Herndon, VA (US); Alireza Babaei, Fairfax, VA (US); Youngwoo Kwak, Vienna, VA (US); Kyungmin Park, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 609 days.

(21) Appl. No.: 17/212,426

(22) Filed: Mar. 25, 2021

(65) Prior Publication Data

US 2021/0234640 A1  Jul. 29, 2021

Related U.S. Application Data

(63) Continuation of application No. PCT/US2020/040475, filed on Jul. 1, 2020.
(Continued)

(51) Int. Cl.
*H04W 72/0446* (2023.01)
*H04L 1/1812* (2023.01)
(Continued)

(52) U.S. Cl.
CPC .......... *H04L 1/1819* (2013.01); *H04L 1/1896* (2013.01); *H04W 24/08* (2013.01); *H04W 72/0446* (2013.01); *H04W 72/1263* (2013.01); *H04W 72/23* (2023.01); *H04W 72/535* (2023.01)

(58) Field of Classification Search
CPC ..... H04W 72/04; H04W 48/10; H04W 48/12; H04W 72/0446; H04W 72/20; H04W 76/28; H04W 72/0457; H04W 72/231
See application file for complete search history.

(56) References Cited

U.S. PATENT DOCUMENTS

2019/0246395 A1* 8/2019 Huang ................... H04W 72/12
2020/0022144 A1* 1/2020 Papasakellariou .... H04W 72/23
2021/0314100 A1* 10/2021 Yeo ....................... H04B 7/0417

OTHER PUBLICATIONS

3GPP TS 38.212 V15.5.0 (Mar. 2019); Technical Specification; 3rd Generation Partnership Project; Technical Specification Group Radio Access Network; NR; Multiplexing and channel coding; (Release 15).
(Continued)

*Primary Examiner* — Tu X Nguyen
(74) *Attorney, Agent, or Firm* — Matthew Fernandez; Kavon Nasabzadeh; Philip R. Smith

(57) ABSTRACT

A wireless device receives downlink control information (DCIs), in a control channel monitoring occasion, scheduling transport blocks (TBs) in downlink time slots. Each DCI of the DCIs: schedules a respective TB, of the TBs, in a downlink time slot of the downlink time slots; and indicates a same uplink time slot for transmission of acknowledgement information of the respective TB. A determination is made, in an acknowledgement codebook, locations of acknowledgement information of the TBs based on starting times of the downlink time slots. The acknowledgement codebook is transmitted.

20 Claims, 31 Drawing Sheets

Related U.S. Application Data

(60) Provisional application No. 62/870,640, filed on Jul. 3, 2019.

(51) Int. Cl.

| | |
|---|---|
| *H04L 1/1867* | (2023.01) |
| *H04W 24/08* | (2009.01) |
| *H04W 72/1263* | (2023.01) |
| *H04W 72/23* | (2023.01) |
| *H04W 72/50* | (2023.01) |

(56) References Cited

OTHER PUBLICATIONS

3GPP TS 38.213 V15.5.0 (Mar. 2019); Technical Specification; 3rd Generation Partnership Project; Technical Specification Group Radio Access Network; NR; Physical layer procedures for control (Release 15).
3GPP TS 38.214 V15.5.0 (Mar. 2019); Technical Specification; 3rd Generation Partnership Project; Technical Specification Group Radio Access Network; NR; Physical layer procedures for data; (Release 15).
3GPP TS 38.300 V15.5.0 (Mar. 2019); Technical Specification; 3rd Generation Partnership Project; Technical Specification Group Radio Access Network; NR; NR and NG-RAN Overall Description; Stage 2; (Release 15).
3GPP TS 38.321 V15.5.0 (Mar. 2019); Technical Specification; 3rd Generation Partnership Project; Technical Specification Group Radio Access Network; NR; Medium Access Control (MAC) protocol specification; (Release 15).
3GPP TS 38.331 V15.5.0 (Mar. 2019); Technical Specification; 3rd Generation Partnership Project; Technical Specification Group Radio Access Network; NR; Radio Resource Control (RRC) protocol specification; (Release 15).
R1-1904112; 3GPP TSG RAN WG1 Meeting #96bis; Xi'an, China, Apr. 8-12, 2019; Source:vivo; Title:Cross-carrier scheduling with different numerologies; Agenda Item:7.2.13.2.
R1-1904154; 3GPP TSG RAN WG1 Meeting #96bis; Xi'an, China, Apr. 8-12, 2019; Source: ZTE Corporation; Title: Discussion on cross-carrier scheduling with different numerologies; Agenda item:7.2.13.2.
R1-1905032; 3GPP TSG-RAN WG1 #96; Xi'an, China, Apr. 8-12, 2019; Source: Qualcomm Incorporated; Title: Cross-slot scheduling power saving techniques; Agenda item:7.2.9.2.
R1-1905142; 3GPP TSG-RAN WG1 Meeting 96bis; Xi'an, China, Apr. 8-12, 2019; Source:Ericsson; Title:Cross-carrier scheduling with different numerologies; Agenda Item:7.2.13.2.
R1-1905154; 3GPP TSG RAN WG1 #96bis; Xi'an, China, Apr. 8-12, 2019; Source:ASUSTeK; Title: Cross-carrier scheduling with different numerologies; Agenda Item:7.2.13.2.
R1-1905279; 3GPP TSG-RAN WG1 #96bis; Xi'an, China, Apr. 8-12, 2019; Source: Qualcomm Incorporated; Title: Cross-Carrier Scheduling with Different Numerologies; Agenda item:7.2.13.2.
R1-1905756—7.2.13.2 summary V6; 3GPP TSG RAN WG1 Meeting #96bis;Xi'an, China, Apr. 8-12, 2019; Source: Nokia, Nokia Shanghai Bell; Title:Feature lead summary #2 on Cross-carrier Scheduling with Different Numerologies; Agenda item:7.2.13.2.
R1-1906017; 3GPP TSG RAN WG1 Meeting #97; Reno, USA, May 13-17, 2019; Source:Huawei, HiSilicon; Title: Remaining details for cross-carrier scheduling with different numerologies; Agenda Item:7.2.13.2.
R1-1906183; 3GPP TSG RAN WG1 Meeting #97; Reno, USA, May 13-17, 2019; Source:vivo; Title:Remaining Issues of cross-carrier scheduling with mix numerologies; Agenda Item:7.2.13.2.
R1-1906291; 3GPP TSG RAN WG1 #97; Reno, USA, May 13-17, 2019; Source:OPPO; Title:On Cross-carrier Scheduling with Different Numerologies; Agenda Item:7.2.13.2.
R1-1906311; 3GPP TSG RAN WG1 Meeting #97; Reno, USA, May 13-17, 2019; Source:CATT; Title:Discussion on cross-carrier scheduling with different numerologies; Agenda Item: 7.2.13.2.
R1-1906359; 3GPP TSG RAN WG1 #97; Reno, USA, May 13-17, 2019; Source: Spreadtrum Communications; Title: Discussion on cross-carrier scheduling with different numerologies; Agenda item:7.2.13.2.
R1-1906420; 3GPP TSG RAN WG1 Meeting #97; Reno, USA, May 13-17, 2019; Source: ZTE Corporation; Title: Discussion on cross-carrier scheduling with different numerologies; Agenda item:7.2.13.2.
R1-1906527; 3GPP TSG RAN WG1 #97; Reno, USA, May 13-17, 2019; Source: CMCC; Title:Discussion on cross-carrier scheduling with different numerologies; Agenda item:7.2.13.2.
R1-1906827; 3GPP TSG-RAN WG1 #97; Reno, USA, May 13-17, 2019; Source: Intel Corporation; Title: On cross-carrier Scheduling with Different Numerologies; Agenda item:7.2.13.2.
R1-1906913; 3GPP TSG RAN WG1 #97; Reno, USA, May 13-17, 2019; Source:Samsung; Title:Cross-carrier Scheduling with Different Numerologies; Agenda Item:7.2.13.2.
R1-1907065; 3GPP TSG RAN WG1 Meeting #97;Reno, NV, USA, May 13-17, 2019; Source:Nokia; Title:[96b-NR-09] Email discussion summary on cross-carrier scheduling with different numerologies; Agenda item:7.2.13.2.
R1-1907066; 3GPP TSG RAN WG1 Meeting #97; Reno, USA, May 13-17, 2019; Source: Nokia, Nokia Shanghai Bell; Title:Feature lead summary on Cross-carrier Scheduling with Different Numerologies; Agenda item:7.2.13.2.
R1-1907068; 3GPP TSG RAN WG1 Meeting #97 ; Reno, NV, USA, May 13-17, 2019; Source:Nokia, Nokia Shanghai Bell; Title:Remaining details of cross-carrier scheduling with mixed numerologies; Agenda item:7.2.13.2.
R1-1907304; 3GPP TSG-RAN WG1 #97;Reno, USA, May 13-17, 2019; Source: Qualcomm Incorporated; Title:Cross-Carrier Scheduling with Different Numerologies; Agenda item:7.2.13.2.
R1-1907331; 3GPP TSG-RAN WG1 Meeting #97Tdoc; Reno, USA, May 13-17, 2019; Source: Ericsson; Title:Cross-carrier scheduling with different numerologies; Agenda Item:7.2.13.2.
R1-1907557; 3GPP TSG RAN WG1 Meeting #96bis; Reno, USA, May 13-17, 2019.; Source: KT Corp .; Title:On Cross-carrier Scheduling with Different Numerologies; Agenda Item:7.2.13.2.
R1-1907759; 3GPP TSG RAN WG1 Meeting #97; Reno, USA, May 13-17, 2019; Source: Nokia, Nokia Shanghai Bell; Title:Feature lead summary #2 on Cross-carrier Scheduling with Different Numerologies; Agenda item:7.2.13.2.
R1-1907855; 3GPP TSG RAN WG1 Meeting #97; Reno, USA, May 13-17, 2019; Source: Nokia, Nokia Shanghai Bell; Title:Feature lead summary #3 on Cross-carrier Scheduling with Different Numerologies; Agenda item:7.2.13.2.
R1-19xxxxx; 3GPP TSG RAN WG1 Meeting #96bis; Xi'an, China, Apr. 8-12, 2019; Source:Nokia, Nokia Shanghai Bell; Title:Feature lead summary #2 on Cross-carrier Scheduling with Different Numerologies; Agenda tem:7.2.13.2.
R1-1813327; 3GPP TSG RAN WG1 Meeting #95; Spokane, USA, Nov. 12-16, 2018; Source: NTT Docomo, Inc.; Title: Enhancements to Scheduling/HARQ/CSI Processing timeline for URLLC; Agenda Item:7.2.6.1.4.
R1-1812183; 3GPP TSG RAN WG1 Meeting #95; 3GPP TSG RAN WG1 Meeting #95; Spokane, USA, Nov. 12-16, 2018, Source: Huawei, HiSilicon; Title: Corrections on bandwidth part and CA; Agenda Item: 7.1.3.4.
International Search Report and Written Opinion for International Application No. PCT/US2020/040475, mailed Oct. 10, 2020.

\* cited by examiner

Transmit DCIs, in a control channel monitoring occasion, scheduling TBs in downlink time slots, where each DCI of the DCIs: schedules a respective TB, of the TBs, in a downlink time slot of the downlink time slots; and indicates a same uplink time slot for reception of acknowledgment information of the respective TB
3010

↓

Determine, in an acknowledgment codebook, locations of acknowledgment information of the TBs based on starting times of the downlink time slots
3020

↓

Receive the acknowledgment codebook
3030

FIG. 30

HYBRID AUTOMATIC REPEAT REQUEST ACKNOWLEDGEMENT CODEBOOK DETERMINATION

CROSS-REFERENCE TO RELATED APPLICATIONS

This application is a continuation of International Application No. PCT/US2020/040475, filed Jul. 1, 2020, which claims the benefit of U.S. Provisional Application No. 62/870,640, filed Jul. 3, 2019, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 30 is a flow diagram of an aspect of an example embodiment of the present disclosure.

DETAILED DESCRIPTION OF EMBODIMENTS

Figure 1:
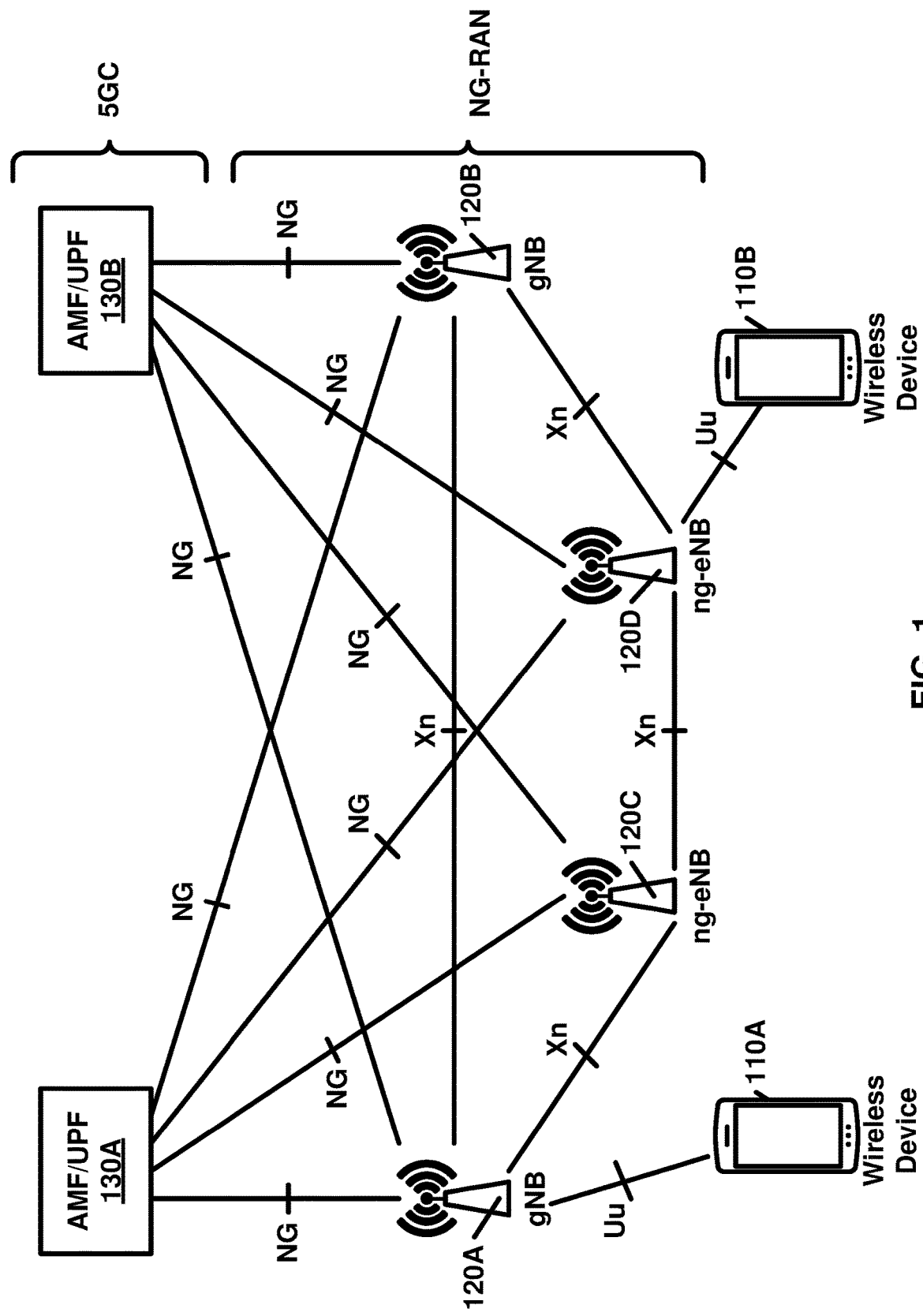
FIG. 1 is a diagram of an example RAN architecture as per an aspect of an embodiment of the present disclosure.

Example embodiments of the present disclosure enable operation of a hybrid automatic repeat request acknowledgement codebook determination. Embodiments of the technology disclosed herein may be employed in the technical field of multicarrier communication systems. More particularly, the embodiments of the technology disclosed herein may relate to a hybrid automatic repeat request acknowledgement codebook determination in a multicarrier communication system.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
STAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QOS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
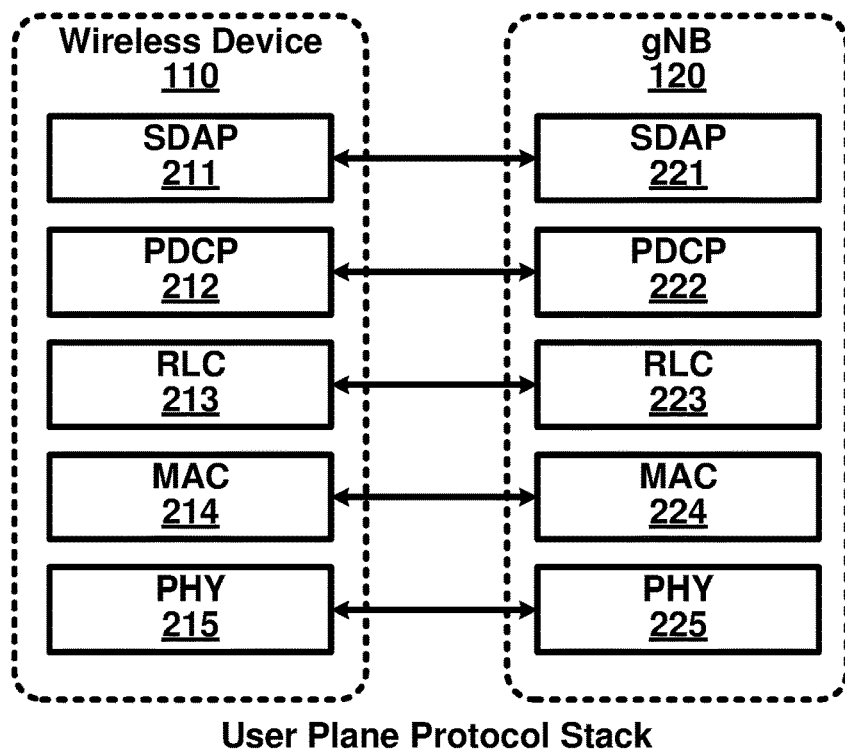
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
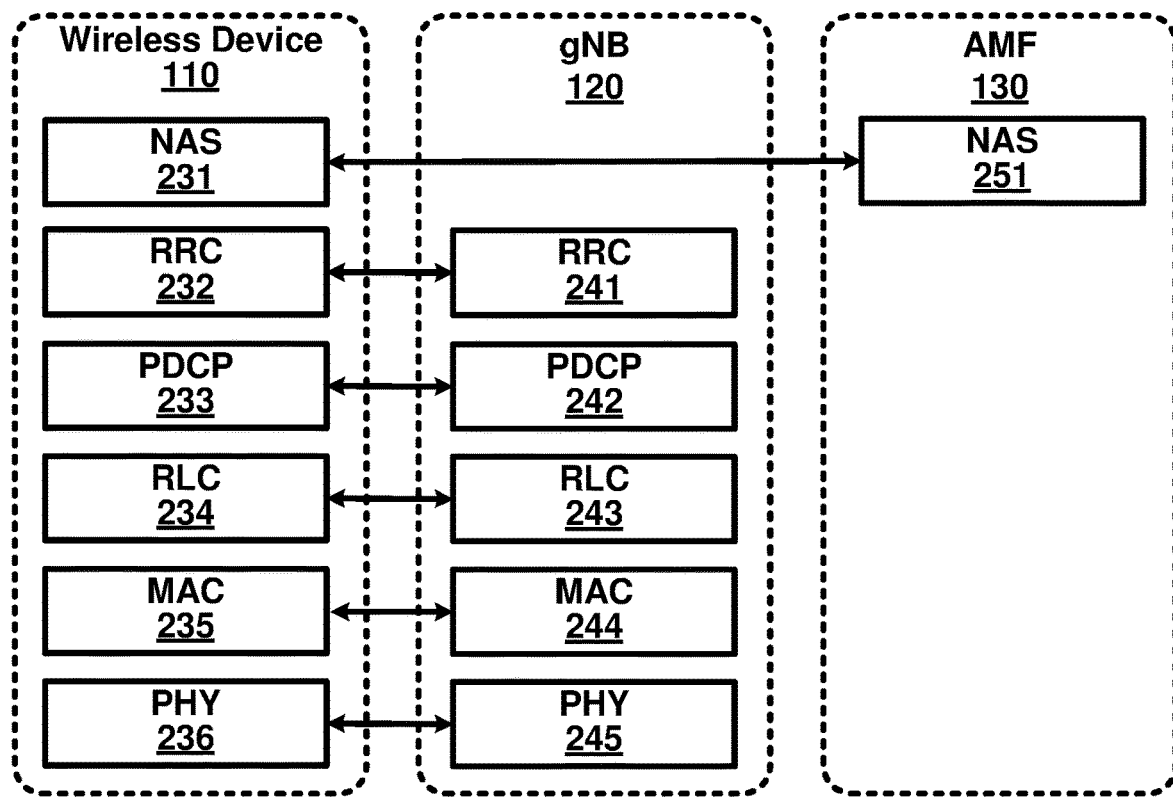
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
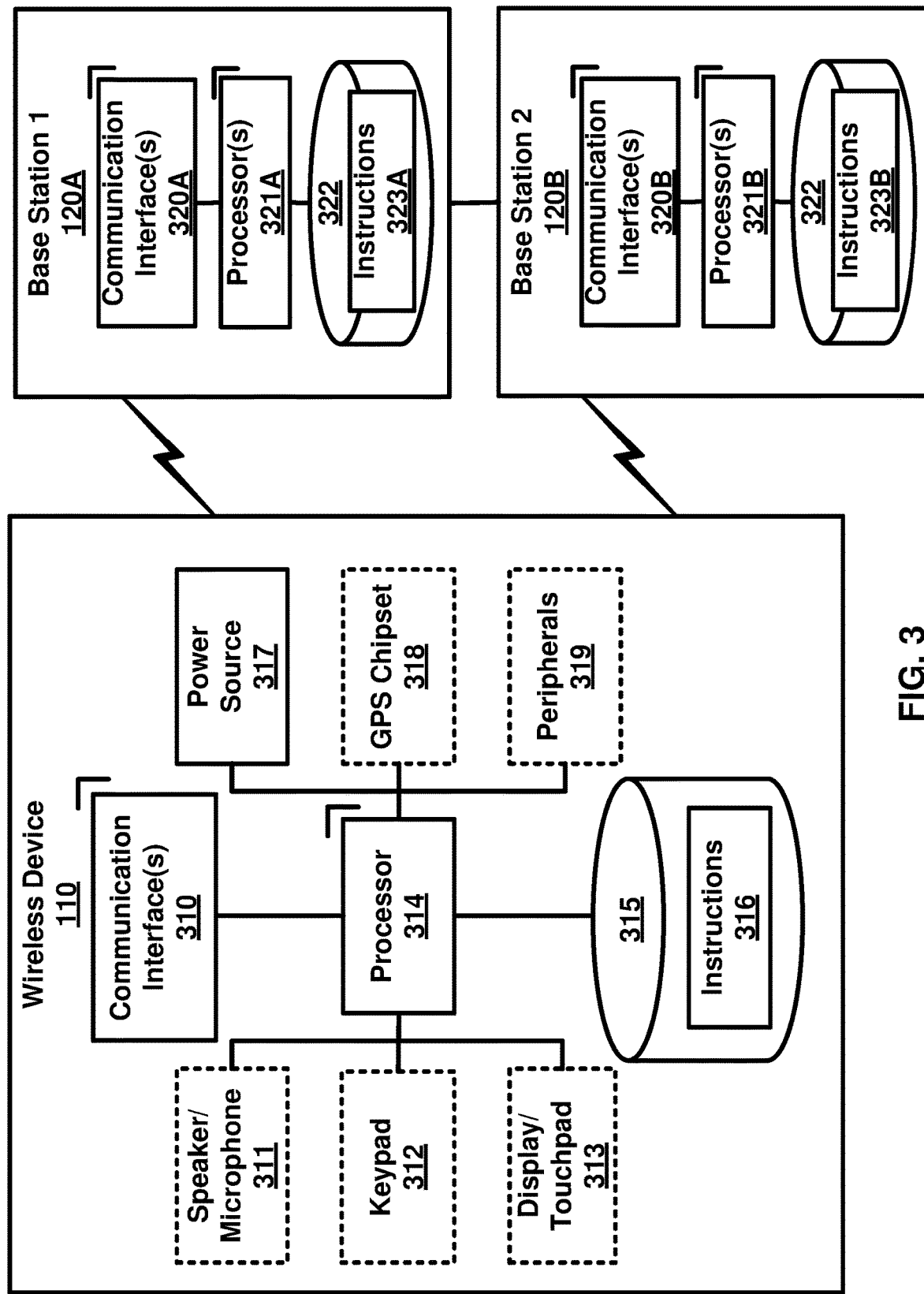
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area IDentifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signalling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signalling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

Figure 4A:
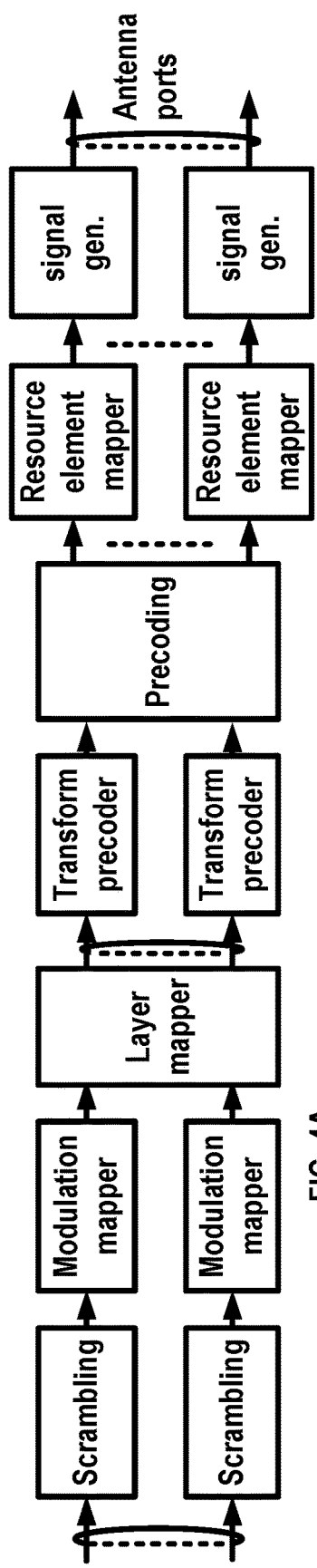
FIG. 4A, FIG. 4B, FIG. 4C and FIG. 4D are example diagrams for uplink and downlink signal transmission as per an aspect of an embodiment of the present disclosure.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

Figure 4B:
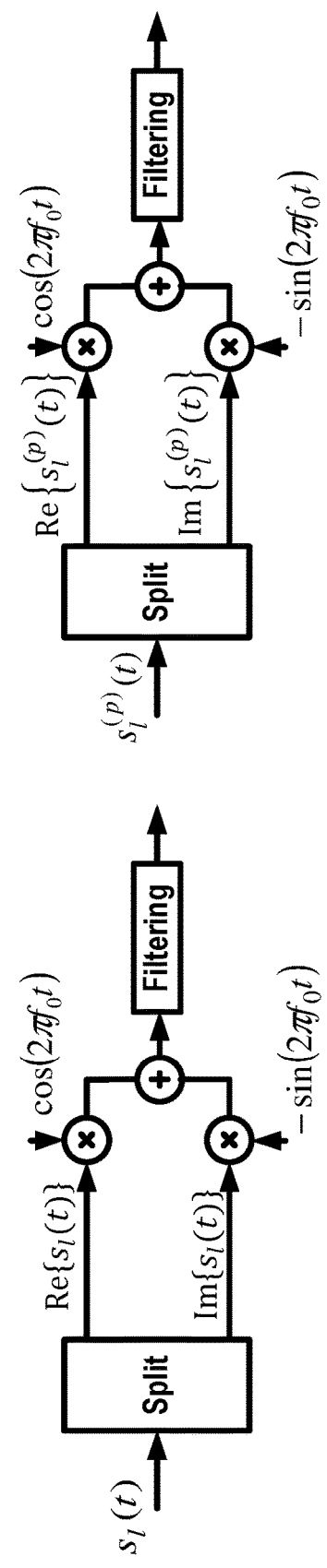

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

Figure 4D:
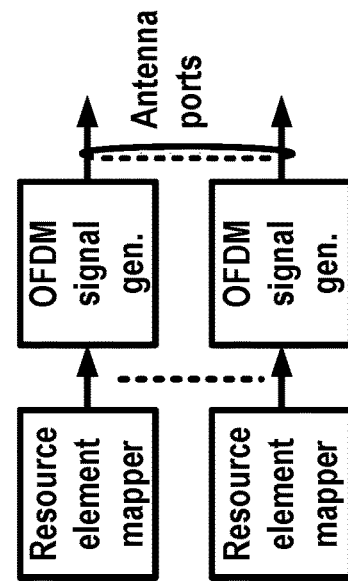
Figure 4C:
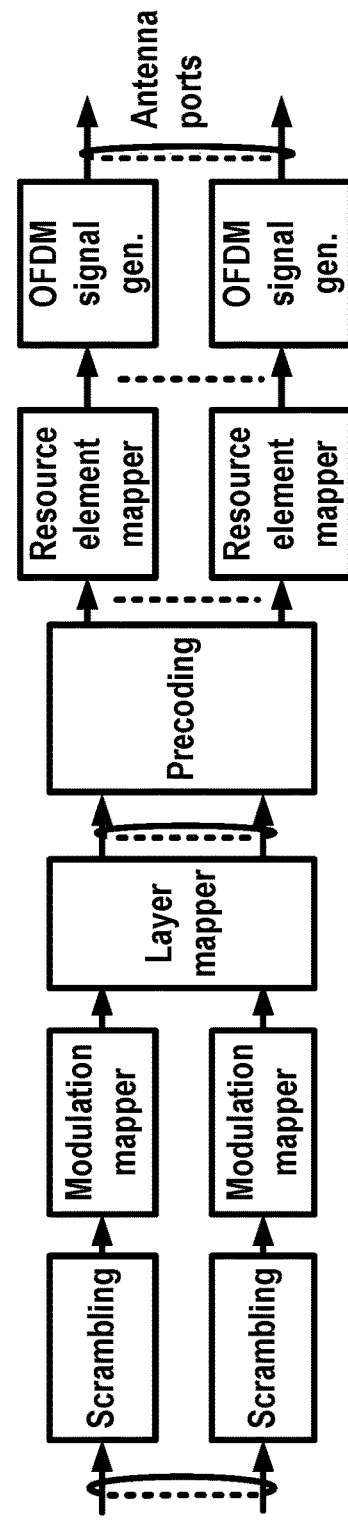

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
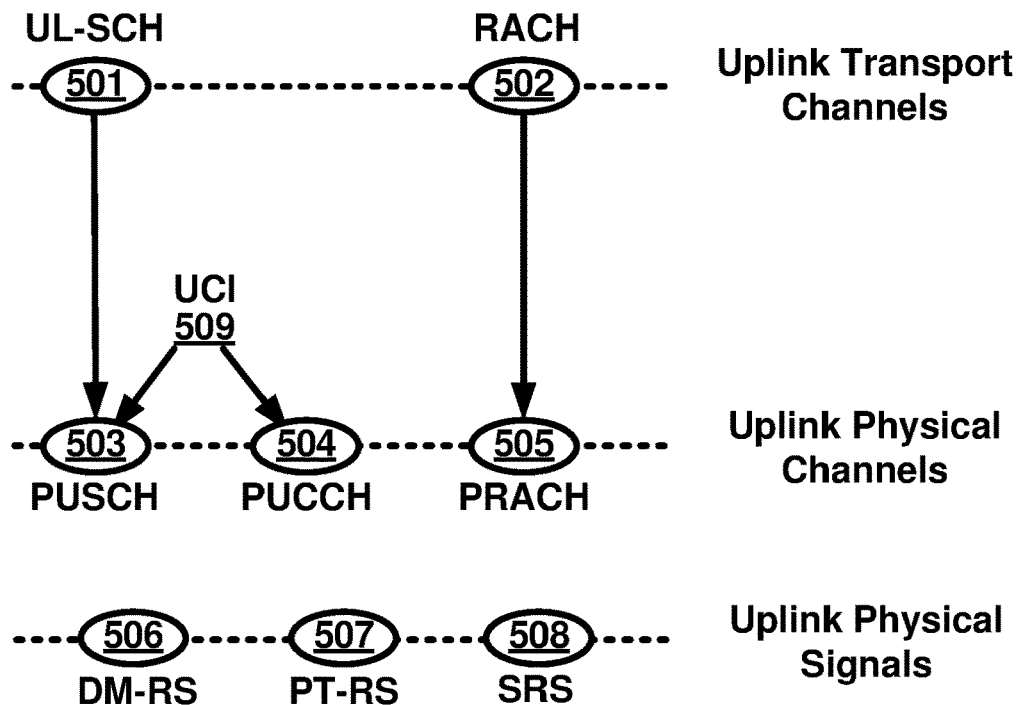
FIG. 5A is a diagram of an example uplink channel mapping and example uplink physical signals as per an aspect of an embodiment of the present disclosure.
Figure 5B:
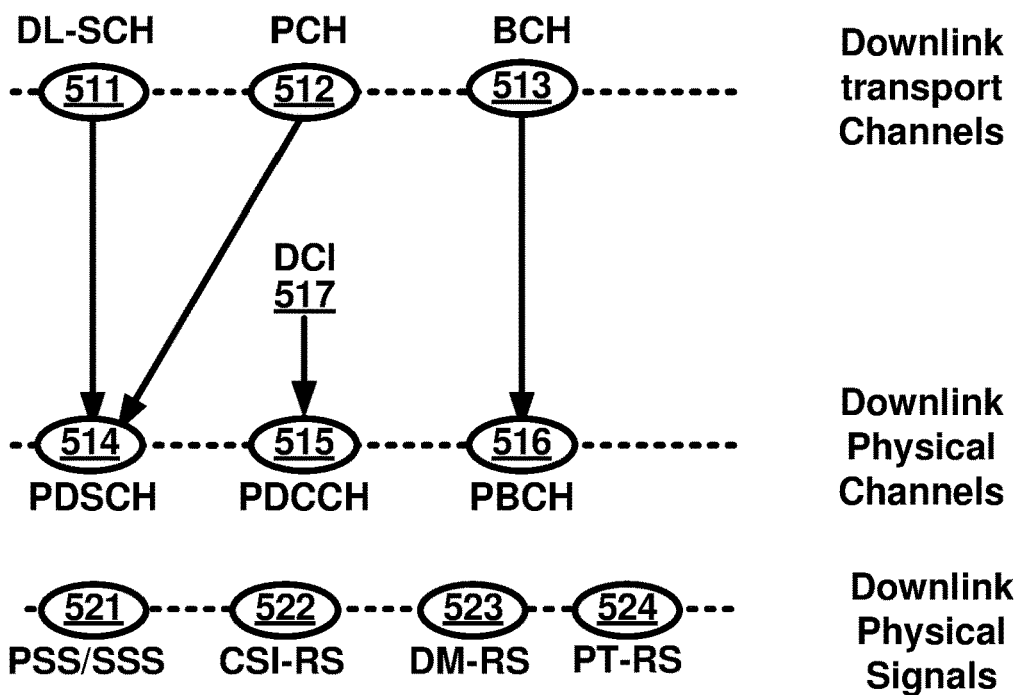
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants.

In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type I may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SS/PBCH blocks when the downlink CSI-RS 522 and SS/PBCH blocks are spatially quasi co-located and resource elements associated with the downlink CSI-RS 522 are the outside of PRBs configured for SS/PBCH blocks.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
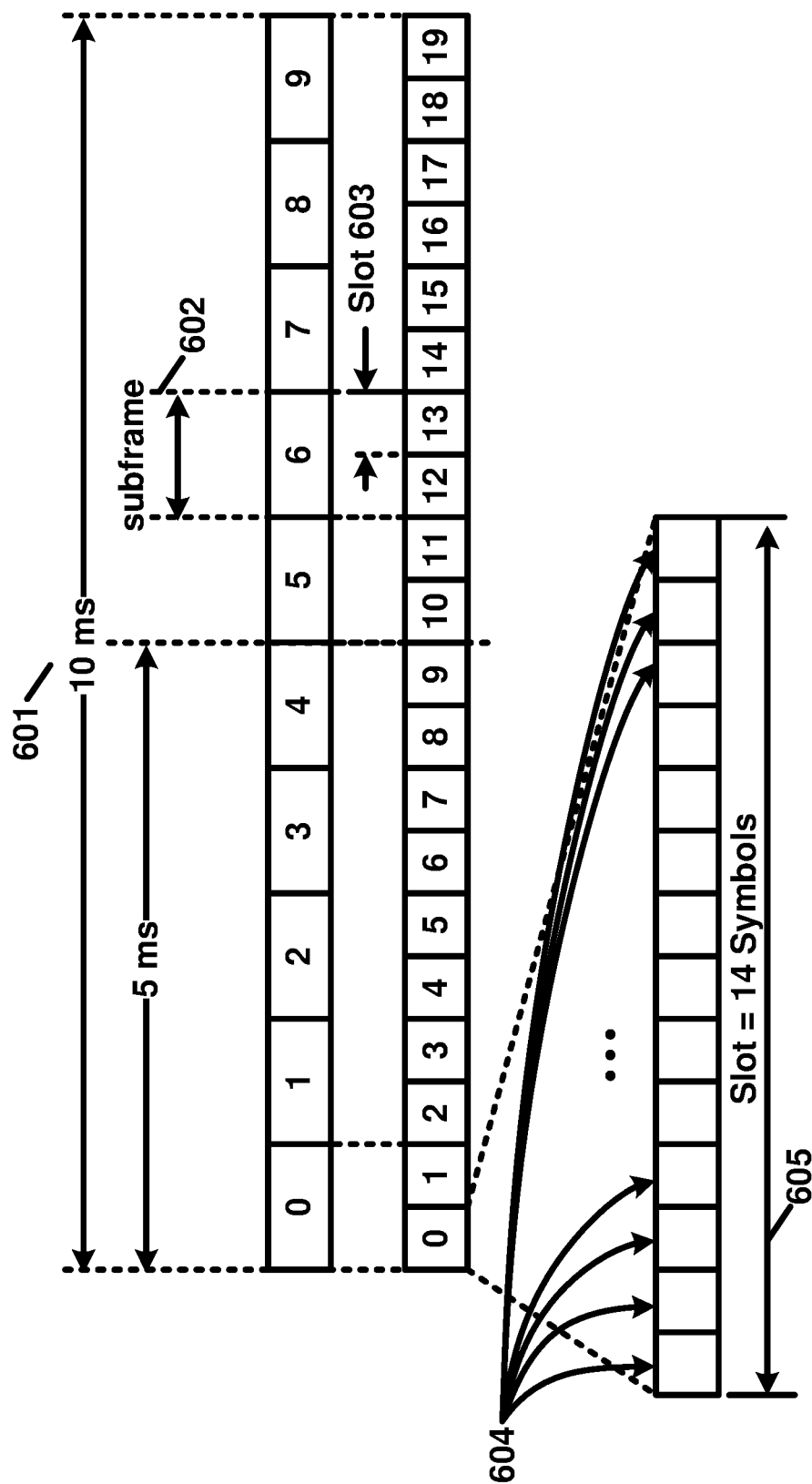
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
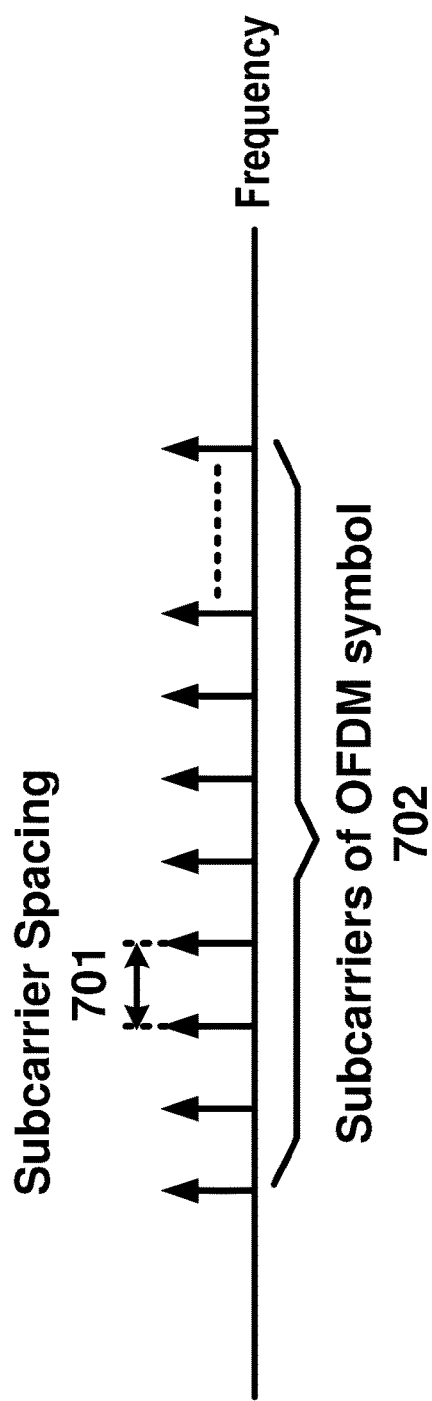
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
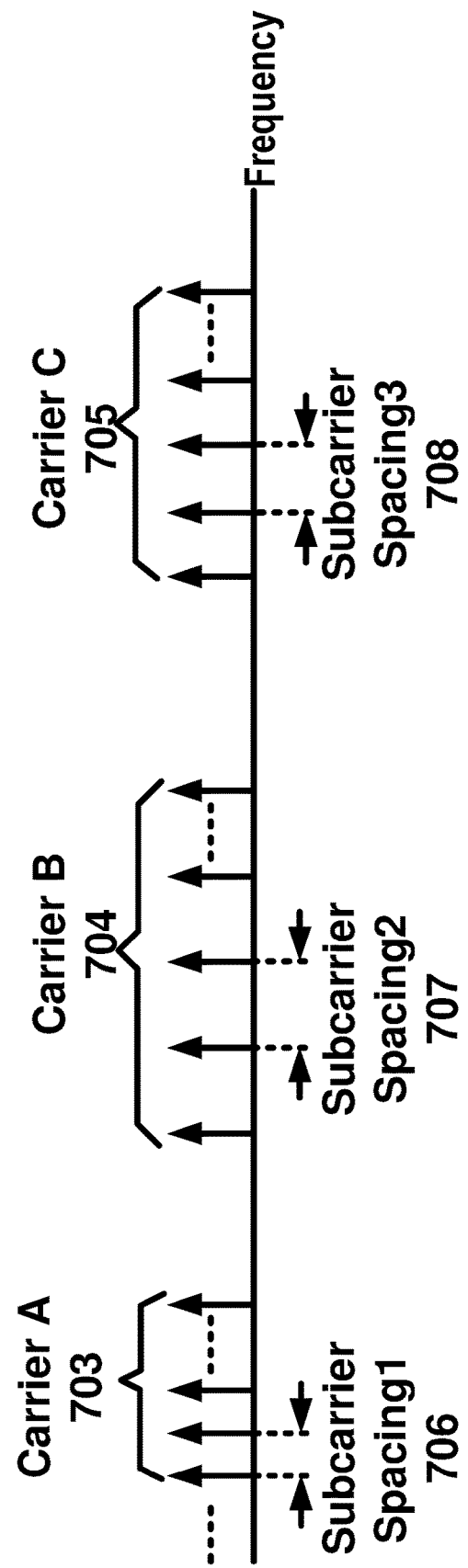

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
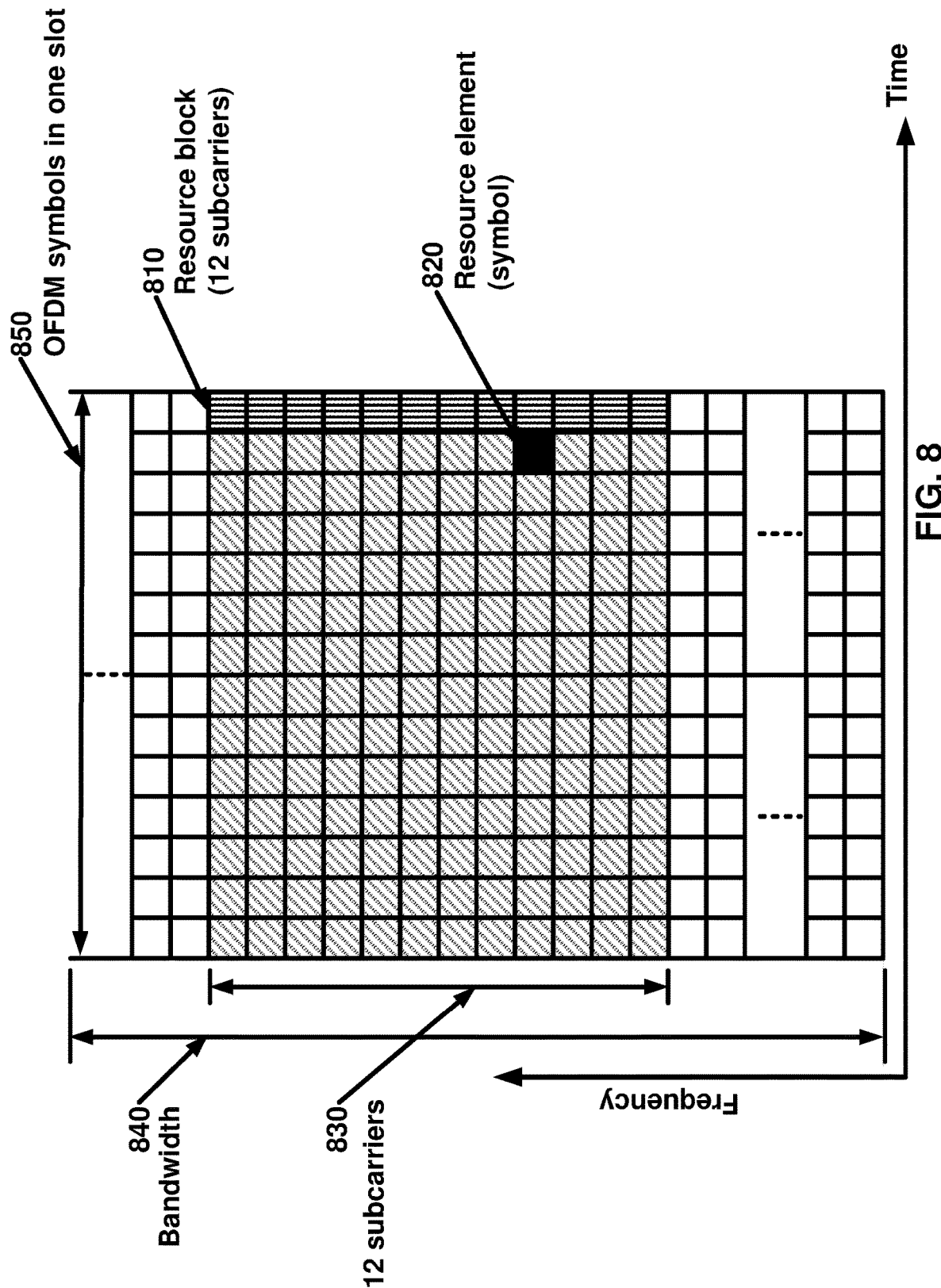
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
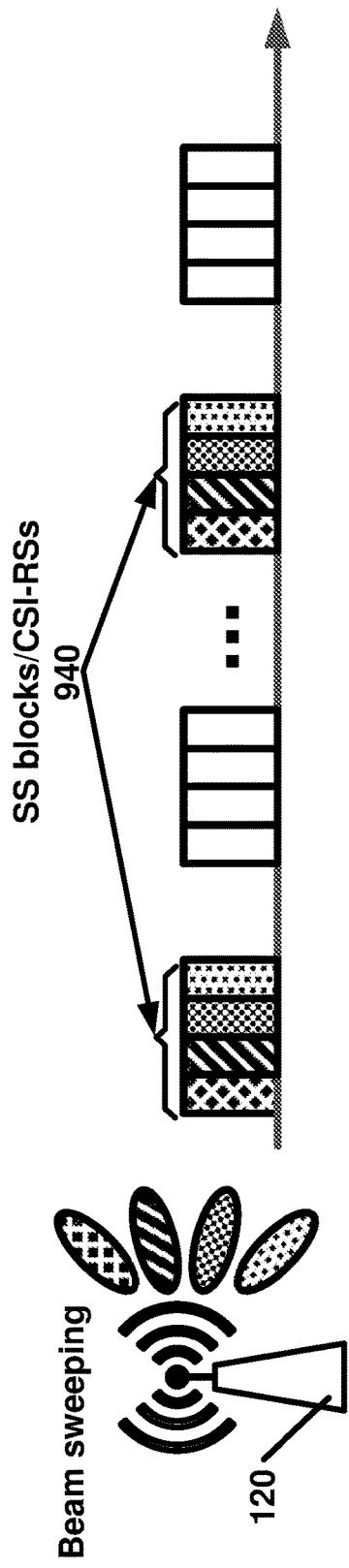
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
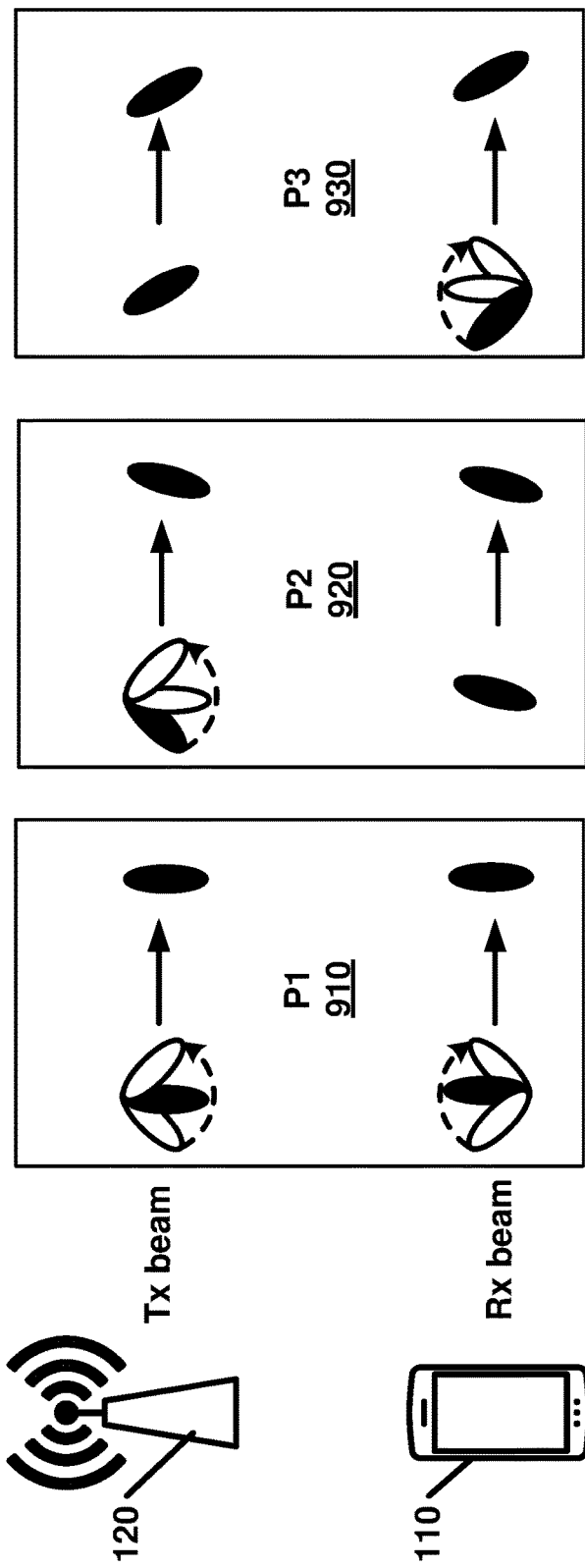
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
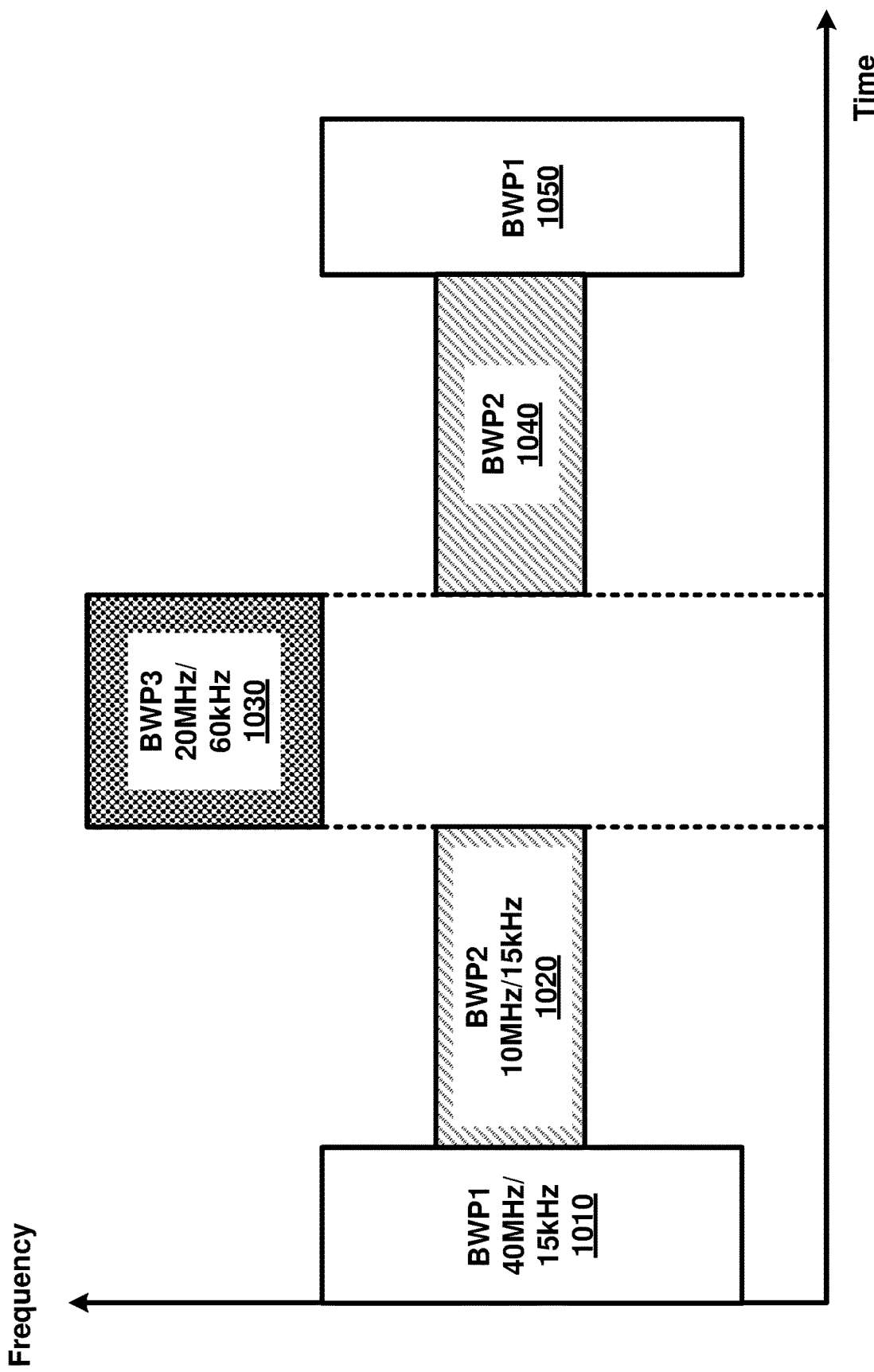
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 KHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base station may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
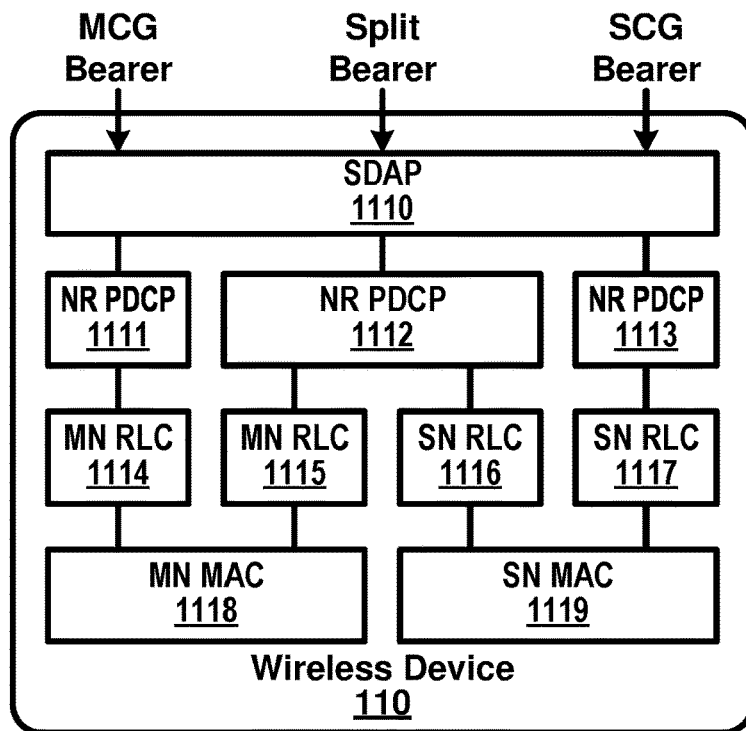
FIG. 11A, and FIG. 11B are diagrams of an example multi connectivity as per an aspect of an embodiment of the present disclosure.
Figure 11B:
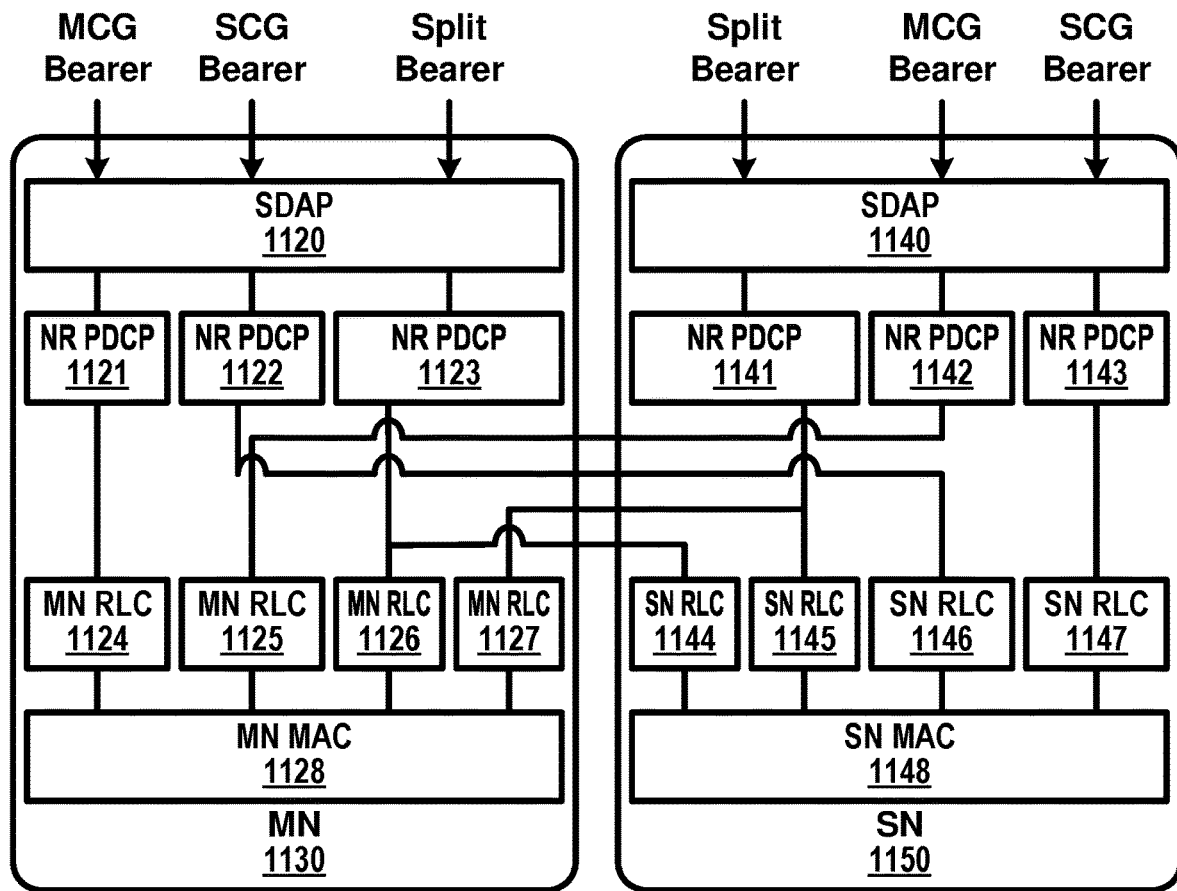

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment.

The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
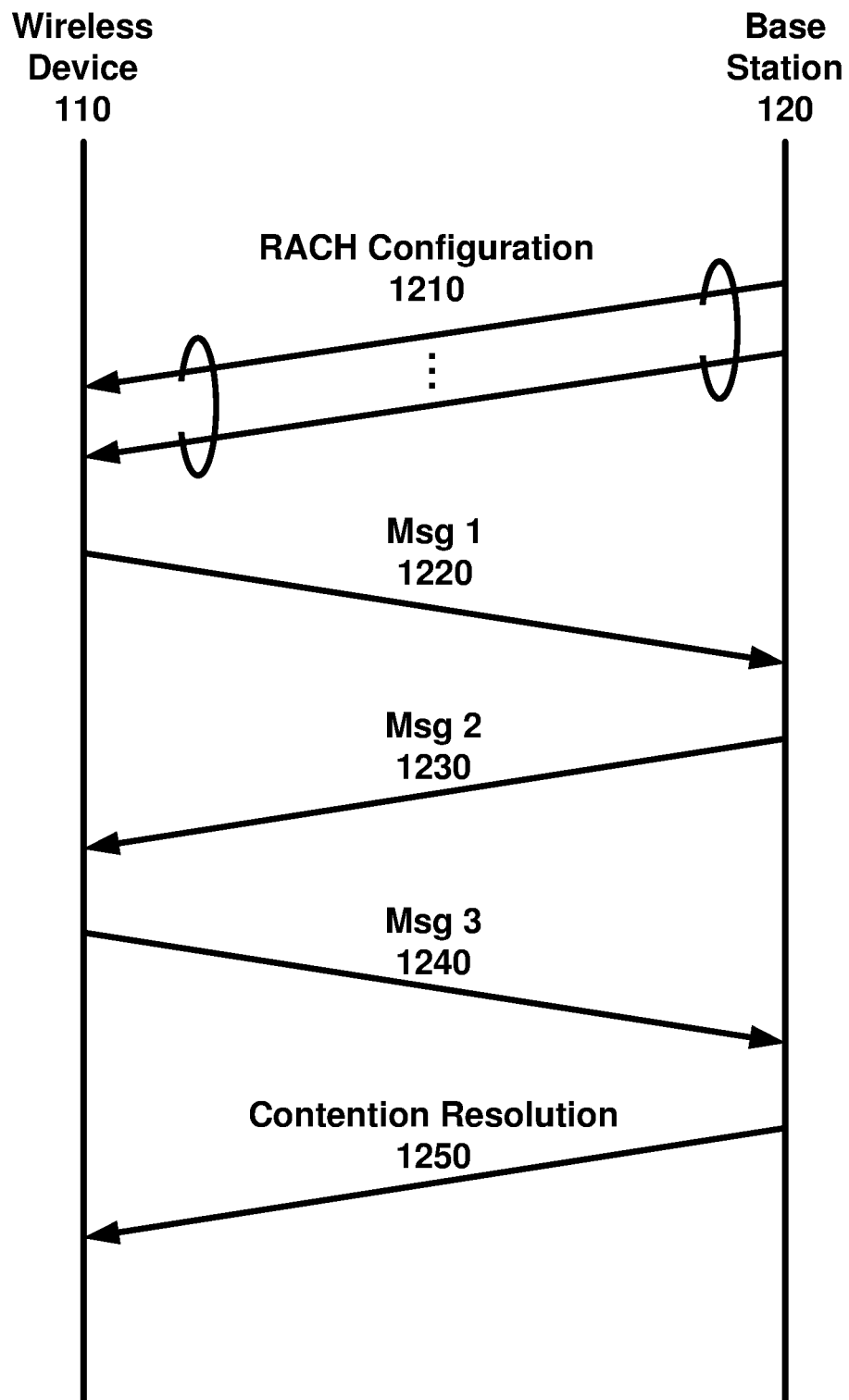
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg1 1220 transmissions, one or more Msg2 1230 transmissions, one or more Msg3 1240 transmissions, and contention resolution 1250. For example, a contention free random access procedure may comprise one or more Msg1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg3 1240.

In an example, multiple UEs may perform Msg1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
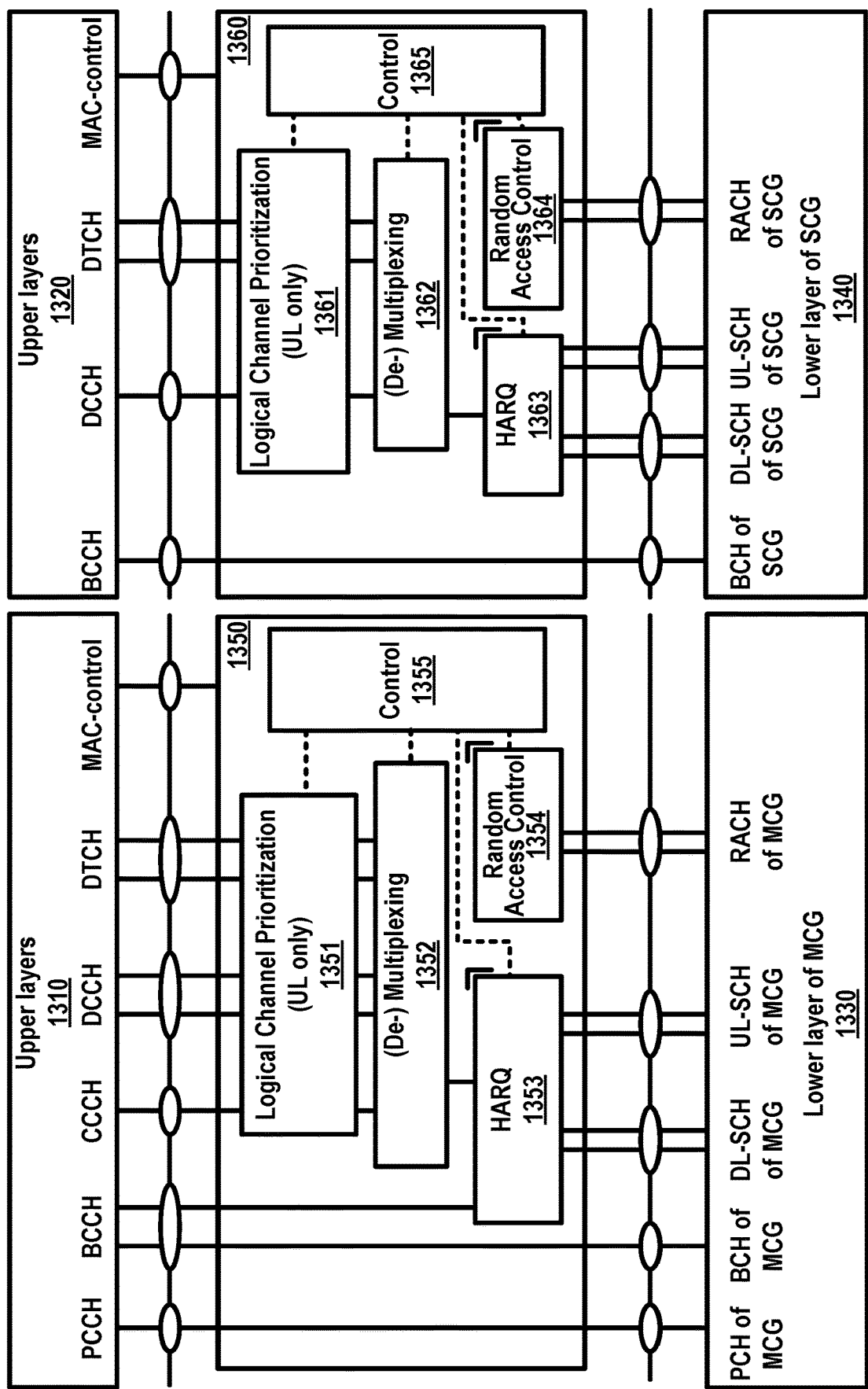
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
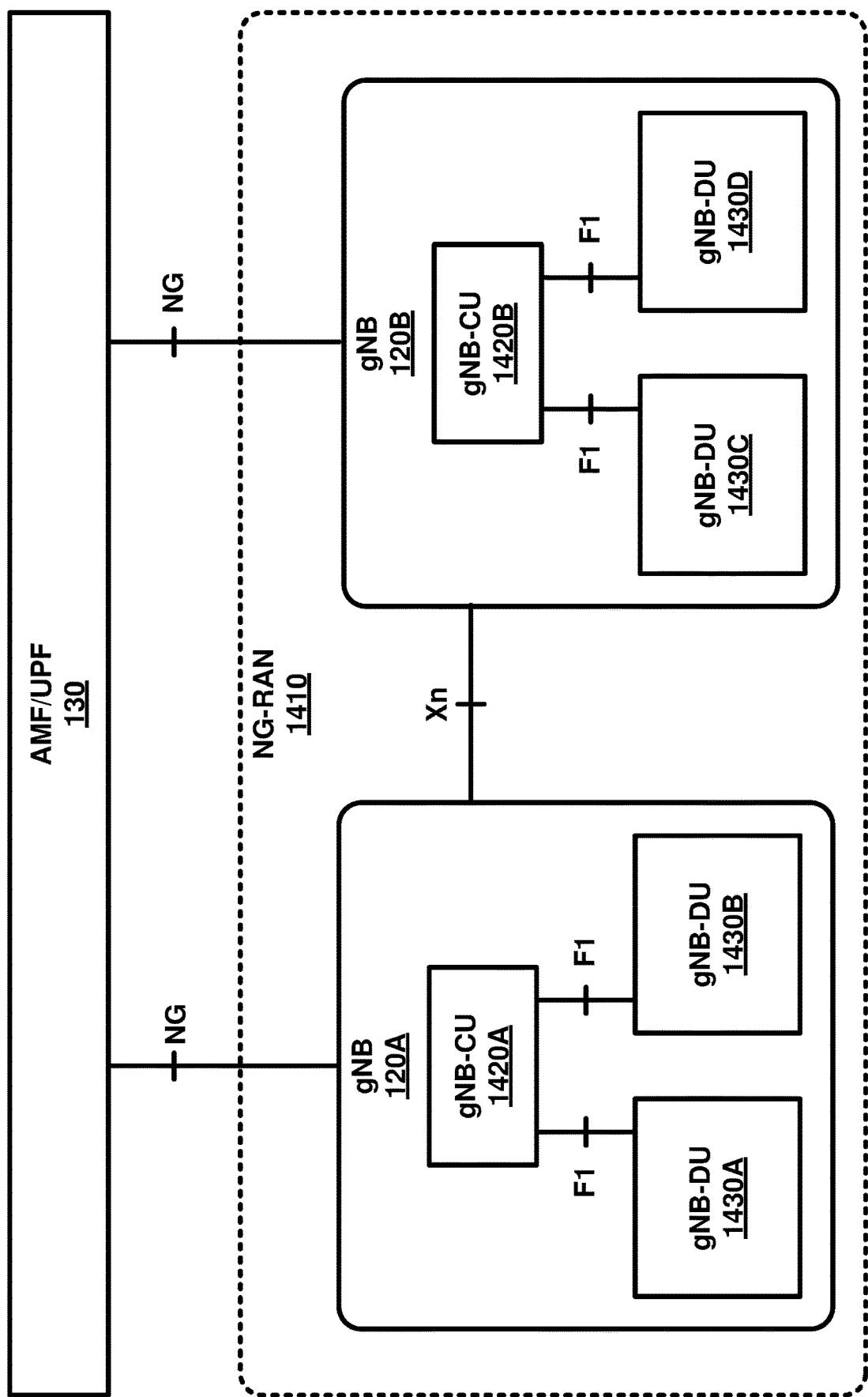
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
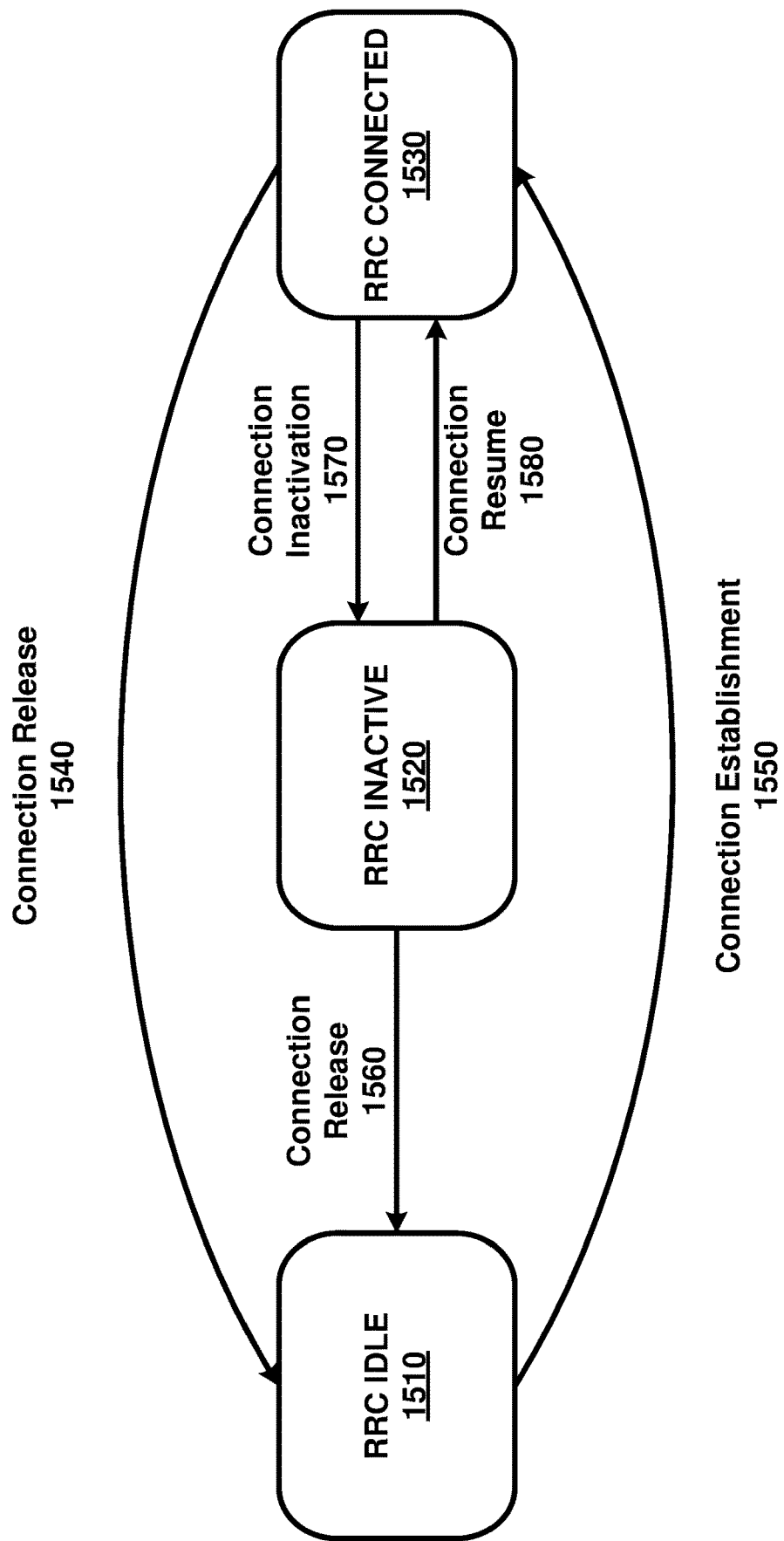
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment 1550) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

Example of PDCCH

In an example, a wireless device may be configured, by a base station, with one or more serving cells. In an example, the base station may activate one or more second serving cells of the one or more serving cells. In an example, the base station may configure each activated serving cell of the one or more second serving cells with a respective PDCCH monitoring. In an example, the wireless device may monitor a set of PDCCH candidates in one or more coresets on an active DL BWP of each activated serving cell configured with the respective PDCCH monitoring. In an example, the wireless device may monitor the set of PDCCH candidates in the one or more coresets according to corresponding search space sets. In an example, the monitoring may comprise decoding each PDCCH candidate of the set of PDCCH candidates according to monitored DCI formats.

In an example, a set of PDCCH candidates for a wireless device to monitor may be defined in terms of PDCCH search space sets. In an example, a search space set may be a common search space (CSS) set or a UE specific search space (USS) set.

In an example, one or more PDCCH monitoring occasions may be associated with a SS/PBCH block. In an example, the SS/PBCH block may be quasi-co-located with a CSI-RS. In an example, a TCI state of an active BWP may comprise the CSI-RS. In an example, the active BWP may comprise a coreset identified with index being equal to zero (e.g., Coreset zero). In an example, the wireless device may determine the TCI state by the most recent of: an indication by a MAC CE activation command or a random-access procedure that is not initiated by a PDCCH order that triggers a non-contention based random access procedure. In an example, for a DCI format with CRC scrambled by a C-RNTI, a wireless device may monitor corresponding PDCCH candidates at the one or more PDCCH monitoring occasions in response to the one or more PDCCH monitoring occasions being associated with the SS/PBCH block.

In an example, a base station may configure a wireless device with one or more DL BWPs in a serving cell. In an example, for a DL BWP of the one or more DL BWPs, the wireless device may be provided by a higher layer signaling with one or more (e.g., 2, 3) control resource sets (coresets). For a coreset of the one or more coresets, the base station may provide the wireless device, by a higher layer parameter ControlResourceSet, at least one of: a coreset index (e.g., provided by higher layer parameter controlResourceSetId), a DMRS scrambling sequence initialization value (e.g., provided by a higher layer parameter pdcch-DMRS-ScramblingID); a number of consecutive symbols (e.g., provided by a higher layer parameter duration), a set of resource blocks (e.g., provided by higher layer parameter frequencyDomainResources), CCE-to-REG mapping parameters (e.g., provided by higher layer parameter cce-REG-MappingType), an antenna port quasi co-location (e.g., from a set of antenna port quasi co-locations provided by a first higher layer parameter tci-StatesPDCCH-ToAddList and a second higher layer parameter tci-StatesPDCCH-ToReleaseList), and an indication for a presence or absence of a transmission configuration indication (TCI) field for a DCI format (e.g., DCI format 1_1) transmitted by a PDCCH in the coreset (e.g., provided by higher layer parameter TCI-PresentInDCI). In an example, the antenna port quasi co-location may indicate a quasi co-location information of one or more DM-RS antenna ports for a PDCCH reception in the coreset. In an example, the coreset index may be unique among the one or more DL BWPs of the serving cell. In an example, when the higher layer parameter TCI-PresentInDCI is absent, the wireless device may consider that a TCI field is absent/disabled in the DCI format.

In an example, a first higher layer parameter tci-StatesPDCCH-ToAddList and a second higher layer parameter tci-StatesPDCCH-ToReleaseList may provide a subset of TCI states defined in pdsch-Config. In an example, the wireless device may use the subset of the TCI states to provide one or more QCL relationships between one or more RS in a TCI state of the subset of the TCI states and one or more DM-RS ports of a PDCCH reception in the coreset.

In an example, a base station may configure a coreset for a wireless device. In an example, a coreset index (e.g., provided by higher layer parameter controlResourceSetId) of the coreset may be non-zero. In an example, the base station may not provide the wireless device with a configuration of one or more TCI states, by a first higher layer parameter tci-StatesPDCCH-ToAddList and/or a second higher layer parameter tci-StatesPDCCH-ToReleaseList, for the coreset. In an example, in response to not being provided with the configuration of the one or more TCI states for the coreset, the wireless device may assume that one or more DMRS antenna ports for a PDCCH reception in the coreset is quasi co-located with an RS (e.g., SS/PBCH block). In an example, the wireless device may identify the RS during an initial access procedure.

In an example, a base station may configure a coreset for a wireless device. In an example, a coreset index (e.g., provided by higher layer parameter controlResourceSetId) of the coreset may be non-zero. In an example, the base station may provide the wireless device with an initial configuration of at least two TCI states, by a first higher layer parameter tci-StatesPDCCH-ToAddList and/or a second higher layer parameter tci-StatesPDCCH-ToReleaseList, for the coreset. In an example, the wireless device may receive the initial configuration of the at least two TCI states from the base station. In an example, the wireless device may not receive a MAC CE activation command for at least one of the at least two TCI states for the coreset. In an example, in response to being provided with the initial configuration for the coreset and not receiving the MAC CE activation command for the coreset, the wireless device may assume that one or more DMRS antenna ports for a PDCCH reception in the coreset is quasi co-located with an RS (e.g., SS/PBCH block). In an example, the wireless device may identify the RS during an initial access procedure.

In an example, a base station may configure a coreset for a wireless device. In an example, a coreset index (e.g., provided by higher layer parameter controlResourceSetId) of the coreset may be equal to zero. In an example, the wireless device may not receive a MAC CE activation command for a TCI state for the coreset. In response to not receiving the MAC CE activation command, the wireless device may assume that one or more DMRS antenna ports for a PDCCH reception in the coreset is quasi co-located with an RS (e.g., SS/PBCH block). In an example, the wireless device may identify the RS during an initial access procedure. In an example, the wireless device may identify the RS from a most recent random-access procedure. In an example, the wireless device may not initiate the most recent random-access procedure in response to receiving a PDCCH order triggering a non-contention based random-access procedure.

In an example, a base station may provide a wireless device with a single TCI state for a coreset. In an example, the base station may provide the single TCI state by a first higher layer parameter tci-StatesPDCCH-ToAddList and/or a second higher layer parameter tci-StatesPDCCH-ToReleaseList. In response to being provided with the single TCI state for the coreset, the wireless device may assume that one or more DM-RS antenna ports for a PDCCH reception in the coreset is quasi co-located with one or more DL RSs configured by the single TCI state.

In an example, a base station may configure a coreset for a wireless device. In an example, the base station may provide the wireless device with a configuration of at least two TCI states, by a first higher layer parameter tci-StatesPDCCH-ToAddList and/or a second higher layer parameter tci-StatesPDCCH-ToReleaseList, for the coreset. In an example, the wireless device may receive the configuration of the at least two TCI states from the base station. In an example, the wireless device may receive a MAC CE activation command for at least one of the at least two TCI states for the coreset. In response to the receiving the MAC CE activation command for the at least one of the at least two TCI states, the wireless device may assume that one or more DM-RS antenna ports for a PDCCH reception in the coreset is quasi co-located with one or more DL RSs configured by the at least one of the at least two TCI states.

In an example, a base station may configure a coreset for a wireless device. In an example, a coreset index (e.g., provided by higher layer parameter controlResourceSetId) of the coreset may be equal to zero. In an example, the base station may provide the wireless device with a configuration of at least two TCI states for the coreset. In an example, the wireless device may receive the configuration of the at least two TCI states from the base station. In an example, the wireless device may receive a MAC CE activation command for at least one of the at least two TCI states for the coreset. In an example, in response to the coreset index being equal to zero, the wireless device may expect that a QCL type (e.g., QCL-TypeD) of a first RS (e.g., CSI-RS) in the at least one of the at least two TCI states is provided by a second RS (e.g., SS/PBCH block). In an example, in response to the coreset index being equal to zero, the wireless device may expect that a QCL type (e.g., QCL-TypeD) of a first RS (e.g., CSI-RS) in the at least one of the at least two TCI states is spatial QCL-ed with a second RS (e.g., SS/PBCH block).

In an example, a wireless device may receive a MAC CE activation command for at least one of at least two TCI states for a coreset. In an example, a PDSCH may provide the MAC CE activation command. In an example, the wireless device may transmit a HARQ-ACK information for the PDSCH in a slot. In an example, when the wireless device receives the MAC CE activation command for the at least one of the at least two TCI states for the coreset, in response to the transmitting HARQ-ACK information in the slot, the wireless device may apply the MAC CE activation command X msec (e.g., 3 msec, 5 msec) after the slot. In an example, when the wireless device applies the MAC CE activation command in a second slot, a first BWP may be active in the second slot. In response to the first BWP being active in the second slot, the first BWP may be an active BWP.

In an example, a base station may configure a wireless device with one or more DL BWPs in a serving cell. In an example, for a DL BWP of the one or more DL BWPs, the wireless device may be provided by higher layers with one or more (e.g., 3, 5, 10) search space sets. In an example, for a search space set of the one or more search space sets, the wireless device may be provided, by a higher layer parameter SearchSpace, at least one of: a search space set index (e.g., provided by higher layer parameter searchSpaceId), an association between the search space set and a coreset (e.g., provided by a higher layer parameter controlResourceSetId); a PDCCH monitoring periodicity of a first number of slots and a PDCCH monitoring offset of a second number of slots (e.g., provided by a higher layer parameter monitoringSlotPeriodicityAndOffset); a PDCCH monitoring pattern within a slot, indicating first symbol(s) of the coreset within the slot for PDCCH monitoring, (e.g., provided by a higher layer parameter monitoringSymbolsWithinSlot); a duration of a third number of slots (e.g., provided by a higher layer parameter duration); a number of PDCCH candidates; an indication that the search space set is either a common search space set or a UE-specific search space set (e.g., provided by a higher layer parameter searchSpaceType). In an example, the duration may indicate a number of slots that the search space set may exist.

In an example, a wireless device may not expect two PDCCH monitoring occasions on an active DL BWP, for a same search space set or for different search space sets, in a same CORESET to be separated by a non-zero number of symbols that is smaller than the CORESET duration.

In an example, the wireless device may determine a PDCCH monitoring occasion on an active DL BWP based on the PDCCH monitoring periodicity, the PDCCH monitoring offset, and the PDCCH monitoring pattern within a slot. In an example, for the search space set, the wireless device may determine that a PDCCH monitoring occasion exists in a slot. In an example, the wireless device may monitor at least one PDCCH for the search space set for the duration of third number of slots (consecutive) starting from the slot.

In an example, a wireless device may monitor one or more PDCCH candidates in a USS set on an active DL BWP of a serving cell. In an example, a base station may not configure the wireless device with a carrier indicator field. In response to not being configured with the carrier indicator field, the wireless device may monitor the one or more PDCCH candidates without the carrier indicator field.

In an example, a wireless device may monitor one or more PDCCH candidates in a USS set on an active DL BWP of a serving cell. In an example, a base station may configure the wireless device with a carrier indicator field. In response to being configured with the carrier indicator field, the wireless device may monitor the one or more PDCCH candidates with the carrier indicator field.

In an example, a base station may configure a wireless device to monitor one or more PDCCH candidates with a carrier indicator field in a first cell. In an example, the carrier indicator field may indicate a second cell. In an example, the carrier indicator field may correspond to a second cell. In response to monitoring the one or more PDCCH candidates, in the first cell, with the carrier indicator field indicating the second cell, the wireless device may not expect to monitor the one or more PDCCH candidates on an active DL BWP of the second cell.

In an example, a wireless device may monitor one or more PDCCH candidates on an active DL BWP of a serving cell. In response to the monitoring the one or more PDCCH candidates on the active DL BWP of the serving cell, the wireless device may monitor the one or more PDCCH candidates for the serving cell.

In an example, a wireless device may monitor one or more PDCCH candidates on an active DL BWP of a serving cell. In response to the monitoring the one or more PDCCH candidates on the active DL BWP of the serving cell, the wireless device may monitor the one or more PDCCH candidates at least for the serving cell. In an example, the wireless device may monitor the one or more PDCCH candidates for the serving cell and at least a second serving cell.

In an example, a base station may configure a wireless device with one or more cells. In an example, when a number of the one or more cells is one, the base station may configure the wireless device for a single-cell operation. In an example, when a number of the one or more cells is more than one, the base station may configure the wireless device for an operation with a carrier aggregation in a same frequency band (e.g., intra-band).

In an example, the wireless device may monitor one or more PDCCH candidates in overlapping PDCCH monitoring occasions in a plurality of coresets on active DL BWP(s) of the one or more cells. In an example, the plurality of the coresets may have a different QCL-TypeD property.

In an example, a first PDCCH monitoring occasion in a first coreset, of the plurality of coresets, of a first cell of the one or more cells may overlap with a second PDCCH monitoring occasion in a second coreset, of the plurality of coresets, of the first cell. In an example, the wireless device may monitor at least one first PDCCH candidate in the first PDCCH monitoring occasion on an active DL BWP, of the active DL BWP(s), of the first cell. In an example, the wireless device may monitor at least one second PDCCH candidate in the second PDCCH monitoring occasion on the active DL BWP, of the active DL BWP(s), of the first cell.

In an example, a first PDCCH monitoring occasion in a first coreset, of the plurality of coresets, of a first cell of the one or more cells may overlap with a second PDCCH monitoring occasion in a second coreset, of the plurality of coresets, of a second cell of the one or more cells. In an example, the wireless device may monitor at least one first PDCCH candidate in the first PDCCH monitoring occasion on a first active DL BWP, of the active DL BWP(s), of the first cell. In an example, the wireless device may monitor at least one second PDCCH candidate in the second PDCCH monitoring occasion on a second active DL BWP, of the active DL BWP(s), of the second cell.

In an example, a first QCL type property (e.g., QCL-TypeD) of the first coreset may be different from a second QCL type property (e.g., QCL-TypeD) of the second coreset.

In an example, in response to the monitoring the one or more PDCCH candidates in the overlapping PDCCH monitoring occasions in the plurality of coresets and the plurality of the coresets having the different QCL-TypeD property, for a coreset determination rule, the wireless device may determine a selected coreset, of the plurality of the coresets, of a cell of the one or more cells. In an example, in response to the determining, the wireless device may monitor at least one PDCCH candidate, in the overlapping PDCCH monitoring occasions, in the selected coreset on an active DL BWP of the cell. In an example, the selected coreset may be associated with a search space set (e.g., association provided by a higher layer parameter controlResourceSetId).

In an example, one or more coresets of the plurality of coresets may be associated with a CSS set. In an example, the one or more coresets of the plurality of coresets being associated with the CSS set may comprise that at least one search space set of a coreset (e.g., association between the at least one search space set and the coreset provided by a higher layer parameter controlResourceSetId) of the one or more coresets has at least one PDCCH candidate in the overlapping PDCCH monitoring occasions and/or is a CSS set.

In an example, the first coreset may be associated with a first CSS set. In an example, the first coreset may be associated with a first USS set. In an example, the second coreset may be associated with a second CSS set. In an example, the second coreset may be associated with a second USS set. In an example, a coreset (e.g., the first coreset, the second coreset) being associated with a CSS set (e.g., first CSS set, second CSS set) may comprise that at least one search space of the coreset is the CSS set. In an example, a coreset (e.g., the first coreset, the second coreset) being associated with an USS set (e.g., first USS set, second USS set) may comprise that at least one search space of the coreset is the USS set.

In an example, when the first coreset is associated with the first CSS set and the second coreset is associated with the second CSS set, the one or more coresets may comprise the first coreset and the second coreset.

In an example, when the one or more coresets comprises the first coreset and the second coreset, the one or more selected cells may comprise the first cell and the second cell in response to the first coreset being configured in the first cell and the second coreset being configured in the second cell.

In an example, when the one or more coresets comprises the first coreset and the second coreset, the one or more selected cells may comprise the first cell in response to the first coreset being configured in the first cell and the second coreset being configured in the first cell. In an example, the at least one coreset may comprise the first coreset and the second coreset. In an example, a first search space set of the first coreset of the at least one coreset may be identified by a first search space set specific index (e.g., provided by a higher layer parameter searchSpaceId). In an example, the wireless device may monitor the at least one first PDCCH candidate in the first PDCCH monitoring occasion in the first coreset associated with the first search space set (e.g., association provided by a higher layer parameter controlResourceSetId). In an example, a second search space set of the second coreset of the at least one coreset may be identified by a second search space set specific index (e.g., provided by a higher layer parameter searchSpaceId). In an example, the wireless device may monitor the at least one second PDCCH candidate in the second PDCCH monitoring occasion in the second coreset associated with the second search space set (e.g., association provided by a higher layer parameter controlResourceSetId). In an example, the first search space set specific index may be lower than the second search space set specific index. In response to the first search space set specific index being lower than the second search space set specific index, for a coreset determination rule, the wireless device may select the first search space set. In an example, in response to the selecting, for the coreset determination rule, the wireless device may monitor the at least one first PDCCH candidate in the first PDCCH monitoring occasion in the first coreset on the active DL BWP of the first cell. In an example, in response to the selecting, for the coreset determination rule, the wireless device may stop monitoring the at least one second PDCCH candidate in the second PDCCH monitoring occasion in the second coreset on the active DL BWP of the first cell. In an example, in response to the selecting, the wireless device may drop monitoring the at least one second PDCCH candidate in the second PDCCH monitoring occasion in the second coreset on the active DL BWP of the first cell.

In an example, the first cell may be identified by a first cell-specific index. In an example, the second cell may be identified by a second cell-specific index. In an example, the first cell-specific index may be lower than the second cell-specific index. In an example, when the one or more selected cells comprises the first cell and the second cell, the wireless device may select the first cell in response to the first cell-specific index being lower than the second cell-specific index.

In an example, when the first coreset is associated with the first CSS set and the second coreset is associated with the second USS set, the one or more coresets may comprise the first coreset. In an example, when the one or more coresets comprises the first coreset, the one or more selected cells may comprise the first cell in response to the first coreset being configured in the first cell.

In an example, when the first coreset is associated with the first USS set and the second coreset is associated with the second CSS set, the one or more coresets may comprise the second coreset. In an example, when the one or more coresets comprises the second coreset, the one or more selected cells may comprise the first cell in response to the second coreset being configured in the first cell. In an example, when the one or more coresets comprises the second coreset, the one or more selected cells may comprise the second cell in response to the second coreset being configured in the second cell.

In an example, the wireless device may determine that the one or more coresets are associated with one or more selected cells of the one or more cells. In an example, the base station may configure a first coreset of the one or more coresets in a first cell of the one or more selected cells. In an example, the base station may configure a second coreset of the one or more coresets in the first cell. In an example, the base station may configure a third coreset of the one or more coresets in a second cell of the one or more selected cells. In an example, the first cell and the second cell may be different.

In an example, the wireless device may receive, from the base station, one or more configuration parameters. The one or more configuration parameters may indicate cell-specific indices (e.g., provided by a higher layer parameter servCellIndex) for the one or more cells. In an example, each cell of the one or more cells may be identified by a respective one cell-specific index of the cell-specific indices. In an example, a cell-specific index of a cell of the one or more selected cells may be lowest among the cell-specific indices of the one or more selected cells.

In an example, when the wireless device determines that the one or more coresets are associated with the one or more selected cells of the one or more cells, for the coreset determination rule, the wireless device may select the cell in response to the cell-specific index of the cell being lowest among the cell-specific indices of the one or more selected cells.

In an example, the base station may configure at least one coreset of the one or more coresets in the (selected) cell. In an example, at least one search space set of the at least one coreset may have at least one PDCCH candidate in the overlapping PDCCH monitoring occasions and/or may be a CSS set.

In an example, the one or more configuration parameters may indicate search space set specific indices (e.g., provided by a higher layer parameter searchSpaceId) for the at least one search space set of the cell. In an example, each search space set of the at least one search space set may be identified by a respective one search space set specific index of the search space set specific indices. In an example, the wireless device may determine that a search space specific index of a search space set of the at least one search space set may be the lowest among the search space set specific indices of the at least one search space set. In response to the determining that the search space specific index of the search space set specific index being the lowest among the search space set specific indices of the at least one search space set, for the coreset determination rule, the wireless device may select the search space set. In an example, the search space set may be associated with a selected coreset of the at least one coreset (e.g., association provided by a higher layer parameter controlResourceSetId).

In an example, when the wireless device monitors the one or more PDCCH candidates in the overlapping PDCCH monitoring occasions in the plurality of coresets and the plurality of the coresets have the different QCL-TypeD property, the wireless device may monitor at least one PDCCH in the selected coreset of the plurality of the coresets on an active DL BWP of the cell of the one or more cells in response to the selecting the cell and/or the selecting the search space set associated with the selected coreset. In an example, the wireless device may select the selected coreset associated with the search space set and the cell for the coreset determination rule.

In an example, the selected coreset may have a first QCL-TypeD property. In an example, a second coreset of the plurality of the coresets may have a second QCL-TypeD property. In an example, the selected coreset and the second coreset may be different.

In an example, the first QCL-TypeD property and the second QCL-TypeD property may be the same. In an example, the wireless device may monitor at least one second PDCCH candidate (in the overlapping PDCCH monitoring occasions) in the second coreset of the plurality of the coresets in response to the first QCL-TypeD property of the selected coreset and the second QCL-TypeD property of the second coreset being the same.

In an example, the first QCL-TypeD property and the second QCL-TypeD property may be different. In an example, the wireless device may stop monitoring at least one second PDCCH candidate (in the overlapping PDCCH monitoring occasions) in the second coreset of the plurality of the coresets in response to the first QCL-TypeD property of the selected coreset and the second QCL-TypeD property of the second coreset being different. In an example, the wireless device may drop monitoring at least one second PDCCH candidate (in the overlapping PDCCH monitoring occasions) in the second coreset of the plurality of the coresets in response to the first QCL-TypeD property of the selected coreset and the second QCL-TypeD property of the second coreset being different.

In an example, for the coreset determination rule, a wireless device may consider that a first QCL type (e.g., QCL TypeD) property of a first RS (e.g., SS/PBCH block) is different from a second QCL type (e.g., QCL TypeD) property of a second RS (CSI-RS)

In an example, for the coreset determination rule, a first RS (e.g., CSI-RS) may be associated (e.g., QCL-ed) with an RS (e.g., SS/PBCH block) in a first cell. In an example, a second RS (e.g., CSI-RS) may be associated (e.g., QCL-ed) with the RS in a second cell. In response to the first RS and the second RS being associated with the RS, the wireless device may consider that a first QCL type (e.g., QCL TypeD) property of the first RS and a second QCL type (e.g., QCL TypeD) property of the second RS are the same.

In an example, the wireless device may determine a number of active TCI states from the plurality of coresets.

In an example, a wireless device may monitor multiple search space sets associated with different CORESETs for one or more cells (e.g., for a single cell operation or for an operation with carrier aggregation in a same frequency band). In an example, at least two monitoring occasions of at least two search space sets of the multiple search space sets may overlap in time (e.g., at least one symbol, at least one slot, subframe, etc.). In an example, the at least two search space sets may be associated with at least two first coresets. The at least two first coresets may have different QCL-TypeD properties. In an example, for the coreset determination rule, the wireless device may monitor at least one search space set associated with a selected coreset in an active DL BWP of a cell. In an example, the at least one search space set may be a CSS set. In an example, a cell-specific index of the cell may be lowest among cell-specific indices of the one or more cells comprising the cell. In an example, at least two second coresets of the cell may comprise a CSS set. In response to the at least two second coresets of the cell comprising the CSS set, the wireless device may select a selected coreset of the at least two second coresets in response to a search space specific index of a search space set associated with the selected coreset being the lowest among search space specific indices of search space sets associated with the at least two second coresets. In an example, the wireless device monitors the search space set in the at least two monitoring occasions.

In an example, the wireless device may determine that the at least two first coresets may not be associated with a CSS set. In an example, the wireless device may determine that each coreset of the at least two first coresets may not be associated with a CSS set. In an example, for the coreset determination rule, in response to the determining, the wireless device may monitor at least one search space set associated with a selected coreset in an active DL BWP of a cell. In an example, the at least one search space set may be a USS set. In an example, a cell-specific index of the cell may be lowest among cell-specific indices of the one or more cells comprising the cell. In an example, at least two second coresets of the cell may comprise a USS set. In response to the at least two second coresets of the cell comprising the USS set, the wireless device may select a selected coreset of the at least two second coresets in response to a search space specific index of a search space set associated with the selected coreset being the lowest among search space specific indices of search space sets associated with the at least two second coresets. In an example, the wireless device monitors the search space set in the at least two monitoring occasions.

An information element ControlResourceSet may be used to configure a time/frequency control resource set (CORESET) in which to search for downlink control information.

An information element SearchSpace may define how/where to search for PDCCH candidates in a search space. The search space may be identified by a searchSpaceId field in the information element SearchSpace. Each search space may be associated with a control resource set (e.g., ControlResourceSet). The control resource set may be identified by a controlResourceSetId field in the information element SearchSpace. The controlResourceSetId field may indicate the control resource set (CORESET) applicable for the SearchSpace.

Background HARQ

In an example, a wireless device may determine monitoring occasions for PDCCH with DCI format 1_0 or DCI format 1_1 for scheduling PDSCH receptions or SPS PDSCH release on an active DL BWP of a serving cell c and for which the UE transmits HARQ-ACK information in a same PUCCH in slot n based on: PDSCH-to-HARQ_feedback timing values for PUCCH transmission with HARQ-ACK information in slot n in response to PDSCH receptions or SPS PDSCH release slot offsets $K_0$ provided by time domain resource assignment field in DCI format 1_0 or DCI format 1_1 for scheduling PDSCH receptions or SPS PDSCH release and by pdsch-AggregationFactor, when provided.

In an example, a set of PDCCH monitoring occasions for DCI format 1_0 or DCI format 1_1 for scheduling PDSCH receptions or SPS PDSCH release is defined as a union of PDCCH monitoring occasions across active DL BWPs of configured serving cells, ordered in ascending order of start time of the search space set associated with a PDCCH monitoring occasion. The cardinality of the set of PDCCH monitoring occasions defines a total number M of PDCCH monitoring occasions.

In an example, a value of a counter downlink assignment indicator (DAI) field in DCI format 1_0 or DCI format 1_1 may denote the accumulative number of {serving cell, PDCCH monitoring occasion}-pair(s) in which PDSCH reception(s) or SPS PDSCH release associated with DCI format 1_0 or DCI format 1_1 is present, up to the current serving cell and current PDCCH monitoring occasion, first in ascending order of serving cell index and then in ascending order of PDCCH monitoring occasion index m, where 0≤m<M.

In an example, ae value of the total DAI, when present, in DCI format 1_1 may denote the total number of {serving cell, PDCCH monitoring occasion}-pair(s) in which PDSCH reception(s) or SPS PDSCH release associated with DCI format 1_0 or DCI format 1_1 is present, up to the current PDCCH monitoring occasion m and is updated from PDCCH monitoring occasion to PDCCH monitoring occasion.

In an example, a wireless device may first determine HARQ-ACK feedback corresponding to PDSCH receptions and SPS PDSCH release DCIs. In an example, a wireless device may transmit HARQ-ACK information in a PUCCH in slot n and for any PUCCH format, the wireless device may determine the $\tilde{o}_0^{ACK}, \tilde{o}_1^{ACK}, \ldots, \tilde{o}_{O^{ACK}-1}^{ACK}$, for a total number of $O_{ACK}$ HARQ-ACK information bits.

In an example, if SPS PDSCH reception is activated for the wireless device and the wireless device is configured to receive SPS PDSCH in a slot n-$K_{1,c}$ for serving cell c, where $K_{1,c}$ is the PDSCH-to-HARQ-feedback timing value for SPS PDSCH on serving cell c, $O^{ACK}=O^{ACK}+1$, and $o_{O^{ACK}-1}^{ACK}$=HARQ-ACK information bit associated with the SPS PDSCH reception.

In an example, a wireless device may transmit one or more PUCCH with HARQ-ACK information in a slot. For DCI format 1_0, the PDSCH-to-HARQ-timing-indicator field values may map to {1, 2, 3, 4, 5, 6, 7, 8}. For DCI format 1_1, if present, the PDSCH-to-HARQ-timing-indicator field values may map to values for a set of number of slots provided by RRC parameter dl-DataToUL-ACK.

In an example, for a SPS PDSCH reception ending in slot n, a wireless device may transmit the PUCCH in slot n+k where k is provided by the PDSCH-to-HARQ-timing-indicator field in DCI format 1_0 or, if present, in DCI format 1_1 activating the SPS PDSCH reception.

In an example, if a wireless device detects a DCI format 1_1 that does not include a PDSCH-to-HARQ-timing-indicator field and schedules a PDSCH reception or activates a SPS PDSCH reception ending in slot n, the wireless device may provide corresponding HARQ-ACK information in a PUCCH transmission within slot n+k where k is provided by dl-DataToUL-ACK.

In an example, if a wireless device detects a DCI format 1_0 or a DCI format 1_1 scheduling a PDSCH reception ending in slot n or if the wireless device detects a DCI format 1_0 indicating a SPS PDSCH release through a PDCCH reception ending in slot n, the wireless device may provide corresponding HARQ-ACK information in a PUCCH transmission within slot n+k, where k is a number of slots and is indicated by the PDSCH-to-HARQ-timing-indicator field in the DCI format, if present, or provided by dl-DataToUL-ACK. In an example, k=0 may correspond to a last slot of the PUCCH transmission that overlaps with the PDSCH reception or with the PDCCH reception in case of SPS PDSCH release.

In an example, for a PUCCH transmission with HARQ-ACK information, a UE determines a PUCCH resource after determining a set of PUCCH resources for $O_{UCI}$ HARQ-ACK information bits. The PUCCH resource determination may be based on a PUCCH resource indicator field in a last DCI format 1_0 or DCI format 1_1, among the DCI formats 1_0 or DCI formats 1_1 that have a value of a PDSCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats may be first indexed in an ascending order across serving cells indexes for a same PDCCH monitoring occasion and may then be indexed in an ascending order across PDCCH monitoring occasion indexes.

In an example, PUCCH resource indicator field values map to values of a set of PUCCH resource indexes provided by RRC parameter ResourceList for PUCCH resources from a set of PUCCH resources provided by PUCCH-Resource-Set with a maximum of eight PUCCH resources.

In an example, if a UE detects a first DCI format 1_0 or DCI format 1_1 indicating a first resource for a PUCCH transmission with corresponding HARQ-ACK information in a slot and also detects at a later time a second DCI format 1_0 or DCI format 1_1 indicating a second resource for a PUCCH transmission with corresponding HARQ-ACK information in the slot, the UE may not expect to multiplex HARQ-ACK information corresponding to the second DCI format in a PUCCH resource in the slot if the PDCCH reception that includes the second DCI format is not earlier than $N_3$ symbols from a first symbol of the first resource for PUCCH transmission in the slot where, for wireless device processing capability 1 and SCS configuration μ, $N_3$=8 for μ=0, $N_3$=10 for μ=1, $N_3$=17 for μ=2, $N_3$=20 for μ=3, and for UE processing capability 2 and SCS configuration μ, $N_3$=3 for μ=0, $N_3$=4.5 for μ=1, $N_3$=9 for μ=2.

In an example, if a wireless device transmits HARQ-ACK information corresponding only to a PDSCH reception without a corresponding PDCCH, a PUCCH resource for corresponding PUCCH transmission with HARQ-ACK information is provided by RRC parameter n1PUCCH-AN.

In an example, DCI format 1_0 may be used for the scheduling of PDSCH in a DL cell. In an example, the DCI format 1_0 may comprise a PDSCH-to-HARQ_feedback timing indicator indicating a timing between a PDSCH and its corresponding HARQ feedback.

In an example, a DCI format 1_1 may be used for the scheduling of PDSCH in a cell. In an example, the DCI format 1_1 may comprise a PDSCH-to-HARQ_feedback timing indicator indicating a timing between a PDSCH and its corresponding HARQ feedback.

In an example, a wireless device may indicate HARQ feedback (e.g., a positive or negative acknowledgement (ACK or NACK respectively)) for a downlink reception (e.g., dynamically scheduled PDSCH or semi-persistently scheduled PDSCH or a DCI indicating release of downlink SPS). The wireless device creates a HARQ-ACK codebook comprising a plurality of acknowledgements corresponding to the plurality of downlink receptions.

In an example, a wireless device may receive a plurality of DCIs. The plurality of DCIs may schedule a plurality of transport blocks (TBs). For example, each DCI of the plurality of DCIs may schedule a respective TB (e.g., PDSCH, PUSCH) of the plurality of TBs.

In an example, each DCI of the plurality of DCIs may indicate a (same) slot for a PUCCH transmission of an HARQ-ACK information/feedback corresponding to (or for) the respective TB.

In an example, the wireless device may transmit a limited number of PUCCH transmissions in a slot (e.g. per a serving cell, across all serving cells of the wireless device). For example, the wireless device may transmit one PUCCH transmission per a serving cell. For example, the wireless device may transmit one PUCCH transmission across all serving cells of the wireless device. In an example, the wireless device may not be capable (e.g., power limited, RF/hardware limited, etc.) of transmitting more than one PUCCH in a slot.

In an example, based on transmitting a limited number of PUCCH transmissions (e.g., at most one PUCCH transmission) in the slot, the wireless device may not transmit, in the (same) slot, HARQ-ACK information/feedback corresponding to the plurality of TBs scheduled by the plurality of DCIs separately. In an example, based on transmitting at most one PUCCH transmission in the slot, the wireless device may multiplex the HARQ-ACK information/feedback corresponding to the plurality of TBs in a HARQ-ACK codebook. In an example, based on transmitting at most one PUCCH transmission in the slot, the wireless device may multiplex the HARQ-ACK information/feedback corresponding to each TB of the plurality of TBs in a HARQ-ACK codebook.

In an example, the wireless device may determine, in the HARQ-ACK codebook, a (respective) location/position of a HARQ-ACK information/feedback corresponding to each TB of the plurality of TBs based on cell indices of serving cells that the plurality of DCIs is received. In an example, the wireless device may determine, in the HARQ-ACK codebook, a (respective) location/position of a HARQ-ACK information/feedback corresponding to each TB of the plurality of TBs based on PDCCH monitoring occasions that the plurality of DCIs is received.

In an example, based on the determining, in the HARQ-ACK codebook, the (respective) location/position of the HARQ-ACK information/feedback corresponding to each TB of the plurality of TBs, the wireless device may include/record the HARQ-ACK information/feedback corresponding to each TB of the plurality of TBs in the respective location/position in the HARQ-ACK codebook.

In an example, the wireless device may transmit the HARQ-ACK codebook (e.g., multiplexed HARQ-ACK information). In an example, the wireless device may transmit the HARQ-ACK codebook (e.g., multiplexed HARQ-ACK information) based on the including/recording the HARQ-ACK information/feedback corresponding to each TB of the plurality of TBs in the respective location/position in the HARQ-ACK codebook. In an example, the wireless device may transmit the HARQ-ACK codebook in the (same) slot via a PUCCH resource indicated by at least one DCI of the plurality of DCIs. In an example, the base station may monitor the PUCCH resource to detect/receive the HARQ-ACK codebook (e.g., multiplexed HARQ-ACK information/feedback) in the (same) slot. In an example, the base station may detect/receive the HARQ-ACK codebook. The base station may determine the HARQ-ACK information/feedback corresponding to each TB of the plurality of TBs based on the respective location/position of the HARQ-ACK information/feedback in the HARQ-ACK codebook.

In existing systems, the wireless device may receive at most one DCI (e.g., unicast DCI), in/via a PDCCH monitoring occasion of a scheduling cell, scheduling a transport block (TB, e.g., PDSCH, PUSCH). In 5G new radio (NR), the wireless device may receive a plurality of DCIs (e.g., unicast DCIs), in/via a PDCCH monitoring occasion of a scheduling cell, scheduling a plurality of TBs (or PDSCHs or PUSCHs) for a scheduled cell. In an example, as described in FIG. 17-FIG. 18, the wireless device may receive a plurality of DCIs via a PDCCH monitoring occasion of a scheduling cell with a first numerology (e.g., subcarrier spacing) to schedule a scheduled cell with a second numerology that is higher than the first numerology.

In an example, a wireless device may receive/detect a plurality of DCIs in a PDCCH monitoring occasion of a cell. The plurality of DCIs may schedule a plurality of transport blocks (TBs). For example, each DCI of the plurality of DCIs may schedule a respective TB (e.g., PDSCH, PUSCH) of the plurality of TBs. In an example, each DCI of the plurality of DCIs may indicate a (same) slot for a PUCCH transmission of an HARQ-ACK information/feedback corresponding to a respective TB of the plurality of TBs. Implementation of existing DCI processes based on determining, in an HARQ-ACK codebook, a (respective) location/position of an HARQ-ACK information/feedback corresponding to each TB of the plurality of TBs based on cell indices of serving cells and/or based on PDCCH monitoring occasions that the plurality of DCIs is received, to transmit the HARQ-ACK codebook (e.g., multiplexed HARQ-ACK information) may not distinguish the HARQ-ACK information/feedback corresponding to the plurality of TBs. Receiving/detecting the plurality of DCIs in a same PDCCH monitoring occasion of a same cell may result in a tie among the plurality of DCIs. This may lead to a misalignment in HARQ-ACK codebook determination (e.g., the location/position of HARQ-ACK information/feedback) between the base station and the wireless device. An example embodiment implements an enhanced DCI selection process that determines, in the HARQ-ACK codebook, a (respective) location/position of an HARQ-ACK information/feedback corresponding to each TB of the plurality of TB when multiple DCIs are received in a PDCCH monitoring occasion of a same cell.

In an example, when a wireless device receives/detects a plurality of DCIs in a PDCCH monitoring occasion of a cell, a first DCI of the plurality of DCIs may indicate a first PUCCH resource for a first PUCCH transmission of a first HARQ-ACK information/feedback of a first TB scheduled by the first DCI. A second DCI of the plurality of DCIs may indicate a second PUCCH resource for a second PUCCH transmission of a second HARQ-ACK information/feedback of a second TB scheduled by the second DCI. In an example, the first DCI may indicate a first slot for the first PUCCH transmission. In an example, the second DCI may indicate a second slot, for the second PUCCH transmission, that is the same as the first slot.

In an example, determining a first location/position of the first HARQ-ACK information/feedback and a second location/position of the second HARQ-ACK information/feedback in the HARQ-ACK codebook, based on serving cell indices and/or PDCCH monitoring occasions may not be enough to distinguish the first HARQ-ACK information/feedback and the second HARQ-ACK information/feedback in the HARQ-ACK codebook. In an example, determining a first location/position of the first HARQ-ACK information/ feedback and a second location/position of the second HARQ-ACK information/feedback in the HARQ-ACK codebook, based on serving cell indices and/or PDCCH monitoring occasions may not be enough to distinguish the first location/position of the first HARQ-ACK information/feedback and the second location/position of the second HARQ-ACK information/feedback in the HARQ-ACK codebook. In an example, it may not be enough to distinguish by the base station. In an example, the wireless device may receive the first DCI and the second DCI via a same PDCCH monitoring occasion of a same serving cell. In an example, a wireless device may process the plurality of the DCIs, each indicating a downlink resource assignment. The wireless device may receive the plurality of TBs based on the downlink resource assignment indicated by the plurality of DCIs. The wireless device may determine ACK/NACK for the received plurality of TBs. In an example, the wireless device may include/record the first HARQ-ACK information/feedback in the $1^{st}$ position and the second HARQ-ACK information/feedback in the $2^{nd}$ position in the HARQ-ACK codebook (e.g., a multiplexed HARQ-ACK information/feedback of the first HARQ-ACK information/feedback and the second HARQ-ACK information/feedback). In an example, the wireless device may transmit the HARQ-ACK codebook based on the including/recording via an uplink channel (e.g., PUCCH resource, PUSCH resource). In an example, the base station may receive/detect the HARQ-ACK codebook. In an example, the base station may determine/assume the first HARQ-ACK information/feedback in the $2^{nd}$ position and the second HARQ-ACK information/feedback in the $1^{st}$ position in the HARQ-ACK codebook. This may result in incorrect detection/reception of the multiplexed HARQ-ACK information/feedback by the base station. This may result in the detection/reception, by the base station, of a wrong/incorrect/mismatched HARQ-ACK information/feedback (e.g., the first HARQ-ACK information/feedback for the second TB and the second HARQ-ACK information/feedback for the first TB). This may result in retransmission of the first TB and the second TB. In an example, the base station may transmit new DCIs for the retransmission of the first TB and the second TB, increasing the power consumption at the base station and increasing the downlink interference to other wireless devices/cells. In an example, the wireless device may monitor, for the new DCIs, downlink control channels increasing the power consumption at the wireless device. The wireless device may transmit a new HARQ-ACK codebook for the retransmission, resulting in increased uplink interference to other cells/users. In an example, retransmissions may increase the delay/latency of a successful communication. There is a need to implement an enhanced procedure for an HARQ-ACK codebook determination when a plurality of DCIs is received in a PDCCH monitoring occasion of a cell.

Example embodiments implements an enhanced HARQ-ACK codebook determination, for example, when a plurality of DCIs is received in a same PDCCH monitoring occasion of a same cell. A wireless device may determine, in a HARQ-ACK codebook, a (respective) location/position of a HARQ-ACK information/feedback corresponding to each TB of the plurality of TBs based on search space sets that the plurality of DCIs is received. A wireless device may determine, in a HARQ-ACK codebook, a (respective) location/position of a HARQ-ACK information/feedback corresponding to each TB of the plurality of TBs based on control resource sets (coresets) that the plurality of DCIs is received. A wireless device may determine, in a HARQ-ACK codebook, a (respective) location/position of a HARQ-ACK information/feedback corresponding to each TB of the plurality of TBs based on time slots that the plurality of TBs are received/transmitted. A wireless device may determine, in a HARQ-ACK codebook, a (respective) location/position of a HARQ-ACK information/feedback corresponding to each TB of the plurality of TBs based on priority parameters that the plurality of DCIs indicates. This enhanced process improves uplink control signaling, reduces uplink overhead and interference, reduces wireless device and base station battery power consumption, and reduces delay/latency of communication.

Figure 16:
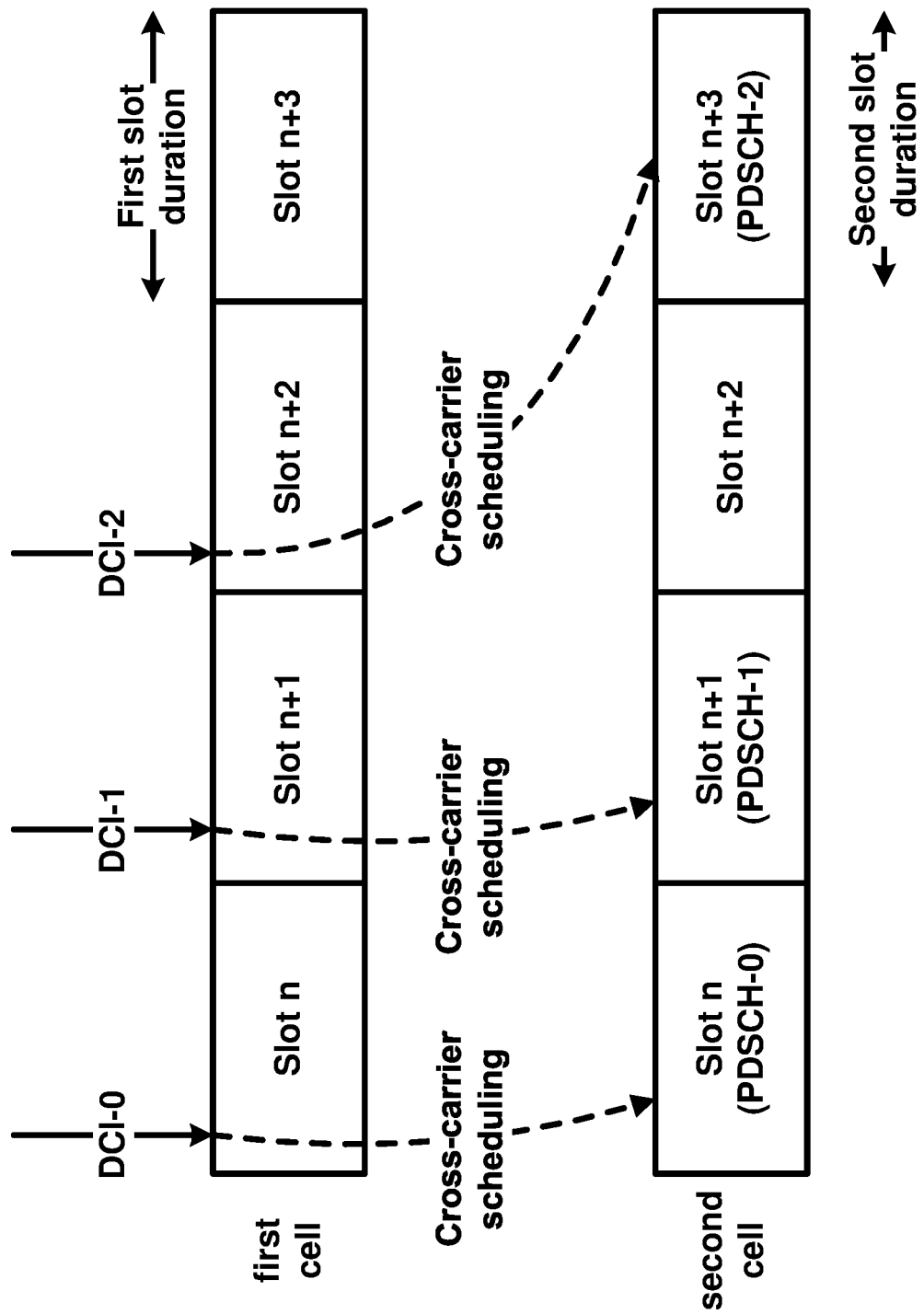
FIG. 16 is an example of cross-carrier scheduling as per an aspect of an embodiment of the present disclosure.
Figure 17:
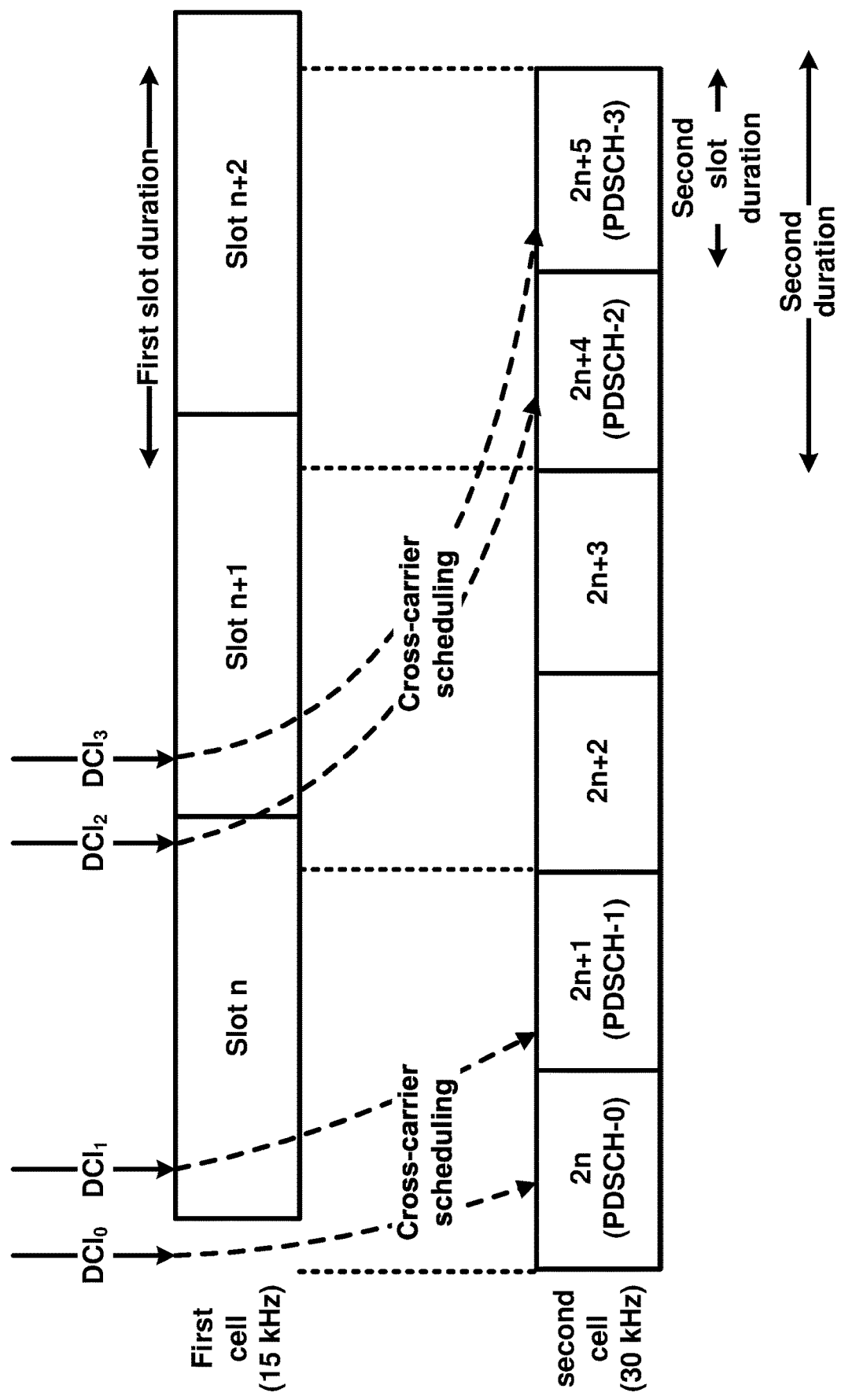
FIG. 17 is an example of cross-carrier scheduling as per an aspect of an embodiment of the present disclosure.
Figure 18:
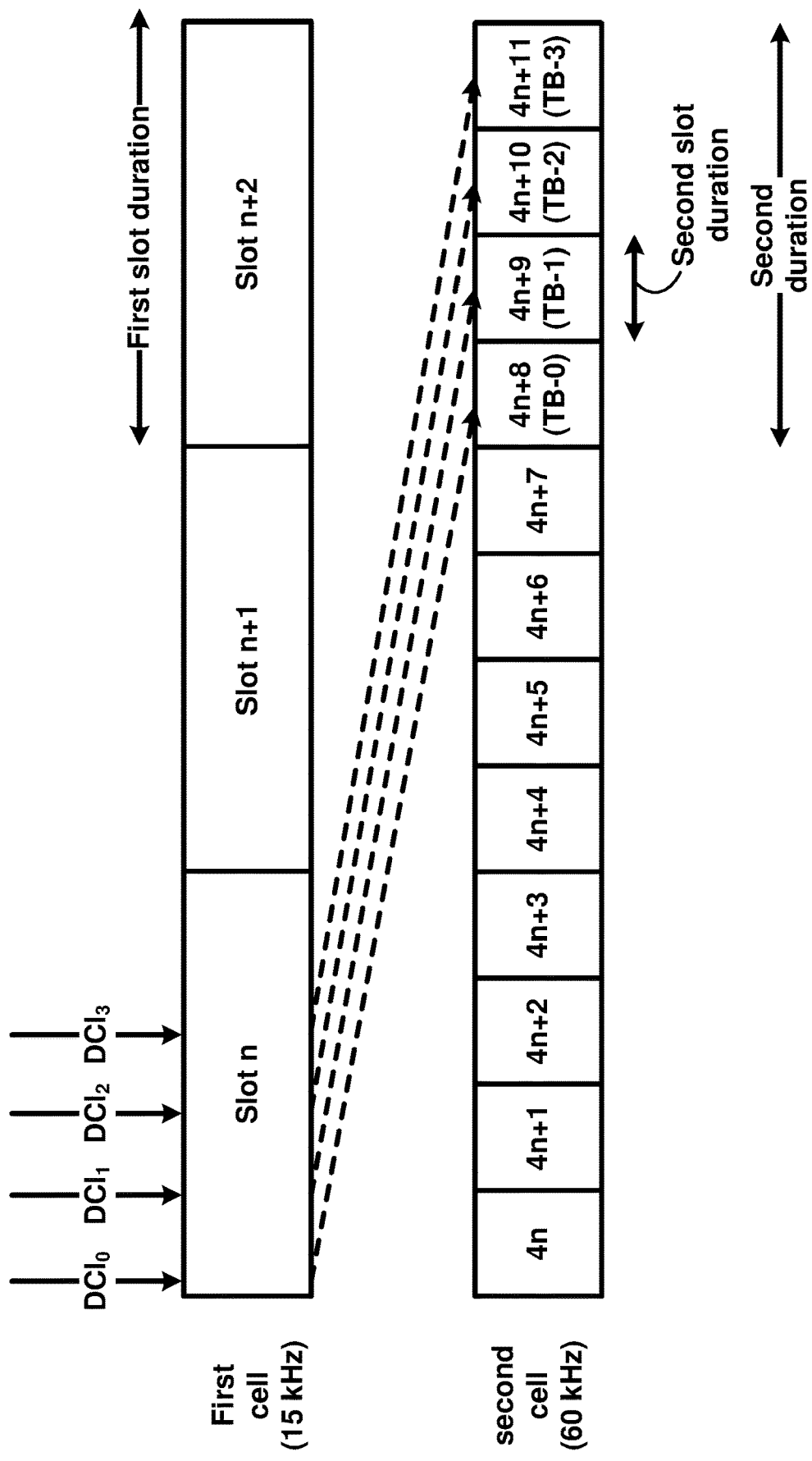
FIG. 18 is an example of cross-carrier scheduling as per an aspect of an embodiment of the present disclosure.

FIG. 16, FIG. 17 and FIG. 18 are examples of a cross-carrier scheduling as per an aspect of an embodiment of the present disclosure.

In an example, a wireless device may receive, from a base station, one or more messages. The one or more messages may comprise one or more configuration parameters for one or more cells. The one or more cells may comprise a first cell (e.g., first cell in FIG. 16, FIG. 17 and FIG. 18). The one or more cells may comprise a second cell (e.g., second cell in FIG. 16, FIG. 17 and FIG. 18).

In an example, the one or more cells may further comprise a third cell and a fourth cell.

In an example, the one or more configuration parameters may indicate cell-specific indices (e.g., provided by a higher layer parameter servCellIndex) for the one or more cells. In an example, each cell of the one or more cells may be identified by a respective cell-specific index of the cell-specific indices. In an example, the first cell (e.g., first cell in FIG. 16, FIG. 17 and FIG. 18) may be identified by a first cell-specific index of the cell-specific indices. In an example, the second cell (e.g., second cell in FIG. 16, FIG. 17 and FIG. 18) may be identified by a second cell-specific index of the cell-specific indices.

In an example, the third cell may be identified by a third cell-specific index of the cell-specific indices. In an example, the fourth cell may be identified by a fourth cell-specific index of the cell-specific indices.

In an example, the first cell-specific index and the second cell-specific index may be different.

In an example, the first cell-specific index and the second cell-specific index may be the same.

In an example, a higher layer parameter may comprise an RRC layer parameter.

In an example, a higher layer parameter may comprise a MAC layer parameter.

In an example, the one or more cells may comprise a plurality of BWPs (e.g., downlink BWPs and/or uplink BWPs). The plurality of BWPs may comprise a first plurality of BWPs of the first cell. The plurality of BWPs may comprise a second plurality of BWPs for the second cell. The first cell may comprise the first plurality of BWPs (e.g., uplink BWPs and/or downlink BWPs). The second cell may comprise the second plurality of BWPs (e.g., uplink BWPs and/or downlink BWPs).

In an example, a BWP (e.g., of the first plurality of BWPs, of the second plurality of BWPs) may be in one of an active state and an inactive state. In an example, the active state of a downlink BWP (e.g., of the first plurality of BWPs, of the second plurality of BWPs) may comprise monitoring a downlink channel/signal (e.g., PDCCH, DCI, CSI-RS, PDSCH) on/for the downlink BWP. In an example, the inactive state of a downlink BWP (e.g., of the first plurality of BWPs, of the second plurality of BWPs) may comprise not monitoring a downlink channel/signal (e.g., PDCCH, DCI, CSI-RS, PDSCH) on/for the downlink BWP. In an example, the active state of an uplink BWP (e.g., of the first plurality of BWPs, of the second plurality of BWPs) may comprise transmitting an uplink signal/channel (e.g., PUCCH, preamble, PUSCH, PRACH, SRS, etc.) via the uplink BWP. In an example, the inactive state of an uplink BWP (e.g., of the first plurality of BWPs, of the second plurality of BWPs) may comprise not transmitting an uplink signal/channel (e.g., PUCCH, preamble, PUSCH, PRACH, SRS, etc.) via the uplink BWP.

In an example, the wireless device may activate a first BWP (e.g., a first downlink/uplink BWP) of the first plurality of BWPs of the first cell. In an example, the activating the first BWP may comprise that the wireless device sets the first BWP as a first active (downlink/uplink) BWP of the first cell. In an example, the activating the first BWP may comprise that the wireless device sets the first BWP in the active state. In an example, the activating the first BWP may comprise switching the first BWP from the inactive state to the active state.

In an example, the wireless device may activate a second BWP (e.g., a second downlink/uplink BWP) of the second plurality of BWPs of the second cell. In an example, the activating the second BWP may comprise that the wireless device sets the second BWP as a second active (downlink/uplink) BWP of the second cell. In an example, the activating the second BWP may comprise that the wireless device sets the second BWP in the active state. In an example, the activating the second BWP may comprise switching the second BWP from the inactive state to the active state.

In an example, the one or more configuration parameters may indicate BWP-specific numerologies (or subcarrier spacings) (e.g., provided by a higher layer parameter SubcarrierSpacing in information element BWP) for the plurality of BWPs. In an example, each BWP of the plurality of BWPs may be identified by a respective BWP-specific numerology of the BWP-specific numerologies. In an example, the first BWP may have a first BWP-specific numerology (e.g., 15 kHz, 30 kHz) of the BWP-specific numerologies. In an example, the second BWP may have a second BWP-specific numerology (e.g., 15 kHz, 60 kHz, 120 kHz) of the BWP-specific numerologies.

In an example, the first BWP-specific numerology and the second BWP-specific numerology may be the same.

In an example, the first BWP-specific numerology and the second BWP-specific numerology may be different.

In an example, the one or more configuration parameters may indicate one or more control resource sets (coresets) for the first BWP of the first cell (e.g., by a higher layer parameter ControlResourceSet). In an example, the one or more configuration parameters may indicate one or more control resource sets (coresets) for the first cell (e.g., by a higher layer parameter ControlResourceSet).

In an example, when the first BWP is in the active state, the wireless device may monitor PDCCH candidates, for a downlink control information (DCI), in the one or more coresets. In an example, when the first BWP is in the active state, the wireless device may monitor PDCCH candidates, for a DCI, in PDCCH monitoring occasions of the one or more coresets. In an example, the monitoring for the DCI may comprise attempting to detect the DCI in the one or more coresets.

In an example, the one or more configuration parameters may indicate coreset indices for the one or more coresets (e.g., provided by a higher layer parameter controlResourceSetId). In an example, each coreset of the one or more coresets may be identified by a respective coreset index of the coreset indices. In an example, a first coreset of the one or more coresets may be identified by a first coreset index (e.g., zero, one, eight, ten, etc.) of the coreset indices. In an example, a second coreset of the one or more coresets may be identified by a second coreset index of the coreset indices. In an example, a third coreset of the one or more coresets may be identified by a third coreset index of the coreset indices.

In an example, the one or more configuration parameters may indicate one or more search space sets for the first BWP of the first cell (e.g., by a higher layer parameter SearchSpace). In an example, the one or more configuration parameters may indicate one or more search space sets for the first cell (e.g., by a higher layer parameter SearchSpace).

In an example, the one or more configuration parameters may indicate search space set indices for the one or more search space sets (e.g., provided by a higher layer parameter searchSpaceId). In an example, each search space set of the one or more search space sets may be identified by a respective search space set index of the search space set indices. In an example, a first search space set of the one or more search space sets may be identified by a first search space set index of the search space set indices. In an example, a second search space set of the one or more search space sets may be identified by a second search space set index of the search space set indices. In an example, a third search space set of the one or more search space sets may be identified by a third search space set index of the search space set indices. In an example, a fourth search space set of the one or more search space sets may be identified by a fourth search space set index of the search space set indices.

In an example, a search space set of the one or more search space sets may be associated with (or linked to) a coreset of the one or more coresets. In an example, the one or more configuration parameters may indicate the coreset (or coreset index of the coreset) for the search space set (e.g., provided by a higher layer parameter controlResourceSetId in the higher layer parameter SearchSpace). In an example, the association (or the linkage) may be one-to-one. The being one-to-one may comprise that the search space set associated with (or linked to) the coreset may not be associated (or linked to) a second coreset different from the coreset.

In an example, the one or more configuration parameters may indicate the coreset indices for the one or more search space sets (e.g., provided by a higher layer parameter controlResourceSetId in the higher layer parameter SearchSpace). In an example, each search space set of the one or more search space sets may be associated with (or linked to) a coreset, of the one or more coresets, identified by a respective coreset index of the coreset indices. In an example, the one or more configuration parameters may indicate the first coreset index of the first coreset for the first search space set. Based on the one or more configuration parameters indicating the first coreset index of the first coreset for the first search space set, the first search space set may be associated with (or linked to) the first coreset. In an example, the one or more configuration parameters may indicate the first coreset index of the first coreset for the second search space set. Based on the one or more configuration parameters indicating the first coreset index of the first coreset for the second search space set, the second search space set may be associated with (or linked to) the first coreset. In an example, the one or more configuration parameters may indicate the second coreset index of the second coreset for the third search space set. Based on the one or more configuration parameters indicating the second coreset index of the second coreset for the third search space set, the third search space set may be associated with (or linked to) the second coreset, and so on. In an example, the one or more configuration parameters may indicate the third coreset index of the third coreset for the fourth search space set. Based on the one or more configuration parameters indicating the third coreset index of the third coreset for the fourth search space set, the fourth search space set may be associated with (or linked to) the third coreset, and so on.

In an example, based on the search space set being associated with (or linked to) the coreset, the wireless device may monitor PDCCH candidates, for a downlink control signal/channel (e.g., DCI, PDCCH, RS, GC-PDCCH, DMRS, etc.), in PDCCH monitoring occasions for the search space set associated with (or linked to) the coreset.

In an example, the one or more configuration parameters may indicate PDCCH monitoring periodicities for the one or more search space sets (e.g., provided by a higher layer parameter monitoringSlotPeriodicityAndOffset). In an example, each search space set of the one or more search space sets may be associated (or configured or monitored) with a respective PDCCH monitoring periodicity of the PDCCH monitoring periodicities. In an example, the first search space set may be associated (or configured or monitored) with a first PDCCH monitoring periodicity. In an example, the second search space set may be associated (or configured or monitored) with a second PDCCH monitoring periodicity. In an example, the third search space set may be associated (or configured or monitored) with a third PDCCH monitoring periodicity. In an example, the fourth search space set may be associated (or configured or monitored) with a fourth PDCCH monitoring periodicity.

In an example, PDCCH monitoring occasions may be associated with the one or more search space sets. In an example, the wireless device may determine PDCCH monitoring occasions for the one or more coresets based on the PDCCH monitoring periodicities of the one or more search space sets. In an example, based on the determining, the wireless device may monitor PDCCH candidates, for a downlink control signal/channel (e.g., DCI, PDCCH, RS, GC-PDCCH, DMRS, etc.), in the PDCCH monitoring occasions for search space sets associated with (or linked to) the one or more coresets. In an example, the wireless device may monitor first PDCCH candidates, for a downlink control signal/channel, in first PDCCH monitoring occasions for the first search space set associated with (or linked to) the first coreset. In an example, the first PDCCH monitoring occasions may be associated with the first search space set. In an example, the wireless device may monitor second PDCCH candidates, for a downlink control signal/channel, in second PDCCH monitoring occasions for the second search space set associated with (or linked to) the first coreset. In an example, the second PDCCH monitoring occasions may be associated with the second search space set. In an example, the wireless device may monitor third PDCCH candidates, for a downlink control signal/channel, in third PDCCH monitoring occasions for the third search space set associated with (or linked to) the second coreset. In an example, the third PDCCH monitoring occasions may be associated with the third search space set. In an example, the wireless device may monitor fourth PDCCH candidates, for a downlink control signal/channel, in fourth PDCCH monitoring occasions for the fourth search space set associated with (or linked to) the third coreset. In an example, the fourth PDCCH monitoring occasions may be associated with the fourth search space set.

In an example, PDCCH monitoring occasions being associated with a search space set may comprise that the wireless device monitors PDCCH candidates, for a DCI, in the PDCCH monitoring occasions for the search space set. The wireless device may determine PDCCH monitoring occasions based on the search space set (e.g., PDCCH monitoring periodicities, etc.).

In an example, the first cell may be a scheduling cell. In an example, the second cell may be a scheduled cell. Based on the first cell being the scheduling cell and the second cell being the scheduled cell, the first cell may cross-carrier schedule the second cell. The first cell cross-carrier scheduling the second cell may comprise that the wireless device monitors, for a DCI and for the second cell, PDCCH candidates in PDCCH monitoring occasions for the one or more coresets of the first BWP of the first cell. In an example, the wireless device may receive/detect the DCI based on the monitoring.

In an example, the DCI may schedule a transport block (TB) for the second cell. In an example, the DCI may schedule a PDSCH for the second cell. Based on the DCI scheduling the TB (or the PDSCH), the wireless device may receive the TB (or the PDSCH) via the second cell. In an example, the DCI may schedule a PUSCH for the second cell. Based on the scheduling the TB (or the PUSCH), the wireless device may transmit the TB (or the PUSCH) via the second cell.

In an example, the DCI may schedule a transport block (TB) for the second BWP of the second cell. In an example, the DCI may schedule a PDSCH for the second BWP of the second cell. Based on the DCI scheduling the TB (or the PDSCH), the wireless device may receive the TB (or the PDSCH) via the second BWP of the second cell. In an example, the DCI may schedule a PUSCH for the second BWP of the second cell. Based on the DCI scheduling the TB (or the PUSCH), the wireless device may transmit the TB (or the PUSCH) via the second BWP of the second cell.

In an example, the first cell may be a scheduling cell. In an example, the second cell may be a scheduled cell. In an example, the first cell and the second cell may be the same. Based on the first cell and the second cell being the same, the first cell may self-schedule the second cell (or the first cell, which are the same). The first cell self-scheduling the second cell may comprise that the wireless device monitors, for a DCI and for the second cell (or the first cell, which are the same), PDCCH candidates in PDCCH monitoring occasions for the one or more coresets of the first BWP of the first cell. In an example, the wireless device may receive/detect the DCI based on the monitoring.

In an example, in FIG. 16, the first BWP-specific numerology and the second BWP-specific numerology are the same. Based on the first BWP-specific numerology and the second BWP-specific numerology being the same, a first slot duration (e.g., 1 ms, 5 ms) of a first slot of the first BWP of the first cell may be equal to a second slot duration of a second slot of the second BWP of the second cell. The first slot duration being equal to the second slot duration may comprise that, for example in FIG. 16, the first slot of the first cell may correspond to the second slot of the second cell. For example, slot n of the first cell may correspond to (or associated with) slot n of the second cell. For example, slot n+1 of the first cell may correspond to slot n+1 of the second cell. For example, slot n+2 of the first cell may correspond to slot n+2 of the second cell and so on. In an example, the correspondence (or the association) may be one-to-one. The first slot corresponding to the second slot may comprise that the first slot duration and the second slot duration are the same. The first slot corresponding to the second slot may comprise that the first slot and the second slot start at the same time (e.g. simultaneously). The first slot corresponding to the second slot may comprise that the first slot and the second slot end at the same time (e.g. simultaneously).

In an example, based on the first slot duration of the first BWP of the first cell being equal to the second slot duration of the second BWP of the second cell, the wireless device may receive a single DCI via the first cell in the first slot. The single DCI may schedule a transport block (e.g., PDSCH, PUSCH) for the second slot of the second cell. In an example, the second slot may be at most one slot of the second cell. For example, in FIG. 16, DCI-0 in slot n (e.g., the first slot) of the first cell schedules PDSCH-0 in slot n (e.g., the second slot) of the second cell; DCI-1 (e.g., the first slot) in slot n+1 of the first cell schedules PDSCH-1 in slot n+1 (e.g., the second slot) of the second cell; and DCI-2 in slot n+2 (e.g., the first slot) of the first cell schedules PDSCH-2 in slot n+3 (e.g., the second slot) of the second cell.

In an example, based on the first slot duration of the first BWP of the first cell being equal to the second slot duration of the second BWP of the second cell, the base station may transmit a single DCI (e.g., DCI-0 or DCI-1 or DCI-2) via the first cell in the first slot to schedule a transport block (e.g., PDSCH, PUSCH) for the second slot of the second cell.

In an example, based on the first slot duration of the first BWP of the first cell being equal to the second slot duration of the second BWP of the second cell, the base station may transmit a single DCI (e.g., DCI-0 or DCI-1 or DCI-2) via the first cell in the first slot to schedule a single transport block (e.g., PDSCH-0 or PDSCH-1 or PDSCH-2) for the second slot of the second cell.

In an example, the wireless device may receive a single DCI in a first slot of the first BWP of the first cell. In an example, the wireless device may not be capable of receiving plurality of DCIs in a first slot of the first BWP.

In an example, in FIG. 17 and FIG. 18, the first BWP-specific numerology (e.g., 15 kHz in FIG. 17 and FIG. 18) and the second BWP-specific numerology (30 kHz in FIG. 17 and 60 kHz in FIG. 18) are different. In an example, the first BWP-specific numerology may be lower than the second BWP-specific numerology. Based on the first BWP-specific numerology being lower than the second BWP-specific numerology, a first slot duration (e.g., 1 ms, 5 ms) of a first slot of the first BWP of the first cell may be equal to a second duration (e.g., Second duration in FIG. 17) of a plurality of second slot durations of a plurality of second slots of the second BWP of the second cell. Based on the first BWP-specific numerology being lower than the second BWP-specific numerology, a first slot of the first BWP of the first cell may correspond to (or associated with) a plurality of second slots of the second BWP of the second cell.

In an example, in FIG. 17, the first slot of the first cell may correspond to two second slots of the second cell. For example, slot n of the first cell may correspond to (or associated with) slot 2n and slot 2n+1 of the second cell. For example, slot n+1 of the first cell may correspond to slot 2n+2 and slot 2n+3 of the second cell. For example, slot n+2 of the first cell may correspond to slot 2n+4 and slot 2n+5 of the second cell and so on. In an example, the correspondence (or the association) may be one-to-many (e.g., one-to-two in FIG. 17). For example, in FIG. 17, the first slot duration of the first cell may be equal to the second duration of the two second slots of the second cell.

In an example, in FIG. 18, the first slot of the first cell may correspond to four second slots of the second cell. For example, slot n of the first cell may correspond to (or associated with) slot 4n, slot 4n+1, slot 4n+2 and slot 4n+3 of the second cell. For example, slot n+1 of the first cell may correspond to slot 4n+4, slot 4n+5, slot 4n+6 and slot 4n+7 of the second cell. For example, slot n+2 of the first cell may correspond to slot 4n+8, slot 4n+9, slot 4n+10 and slot 4n+11 of the second cell and so on. In an example, the correspondence (or the association) may be one-to-many, (e.g., one-to-four in FIG. 18). For example, in FIG. 18, the first slot duration of the first cell may be equal to the second duration of the four second slots of the second cell.

In an example, based on the first slot duration of the first slot of the first BWP of the first cell being equal to the second duration of the plurality of second slots of the second BWP of the second cell, the wireless device may receive a plurality of DCIs via the first cell in the first slot. In an example, a first number of the plurality of second slots and a second number of the plurality of DCIs may be the same. For example, in FIG. 17, the second number is two (e.g., DCI-0 and DCI-1 or DCI-2 and DCI-3). For example, in FIG. 18, the second number is four (e.g., DCI-0, DCI-1, DCI-2 and DCI-3). The plurality of DCIs may schedule a plurality of transport blocks (e.g., PDSCH, PUSCH) for the plurality of second slots of the second cell. For example, each DCI of the plurality of DCIs may schedule, in a second slot of the plurality of second slots of the second cell, a TB of the plurality of TBs. For example, in FIG. 17, DCI-0 and DCI-1 received/detected in slot n of the first cell schedules PDSCH-0 and PDSCH-1 in slot 2n and slot 2n+1 of the second cell, respectively. For example, in FIG. 17, DCI-2 and DCI-3 received/detected in slot n+1 of the first cell schedules PDSCH-2 and PDSCH-3 in slot 2n+4 and slot 2n+5 of the second cell, respectively. For example, in FIG. 18, DCI-0, DCI-1, DCI-2 and DCI-3 received/detected in slot n of the first cell schedules PDSCH-0, PDSCH-1, PDSCH-2 and PDSCH-3 in slot 4n+8, slot 4n+9, slot 4n+10, slot 4n+11 of the second cell, respectively.

FIG. 19, FIG. 20, FIG. 21, FIG. 22 and FIG. 23 are examples of a hybrid automatic repeat request acknowledgement (HARQ-ACK) codebook determination as per an aspect of an embodiment of the present disclosure.

In an example, a wireless device may receive (or detect) a plurality of downlink control information (DCIs) (e.g., DCI-1, DCI-2, DCI-3, DCI-4 in FIG. 19-FIG. 23).

In an example, the plurality of DCIs may be unicast DCIs. In an example, each DCI of the plurality of DCIs may be a unicast DCI.

Figure 19:
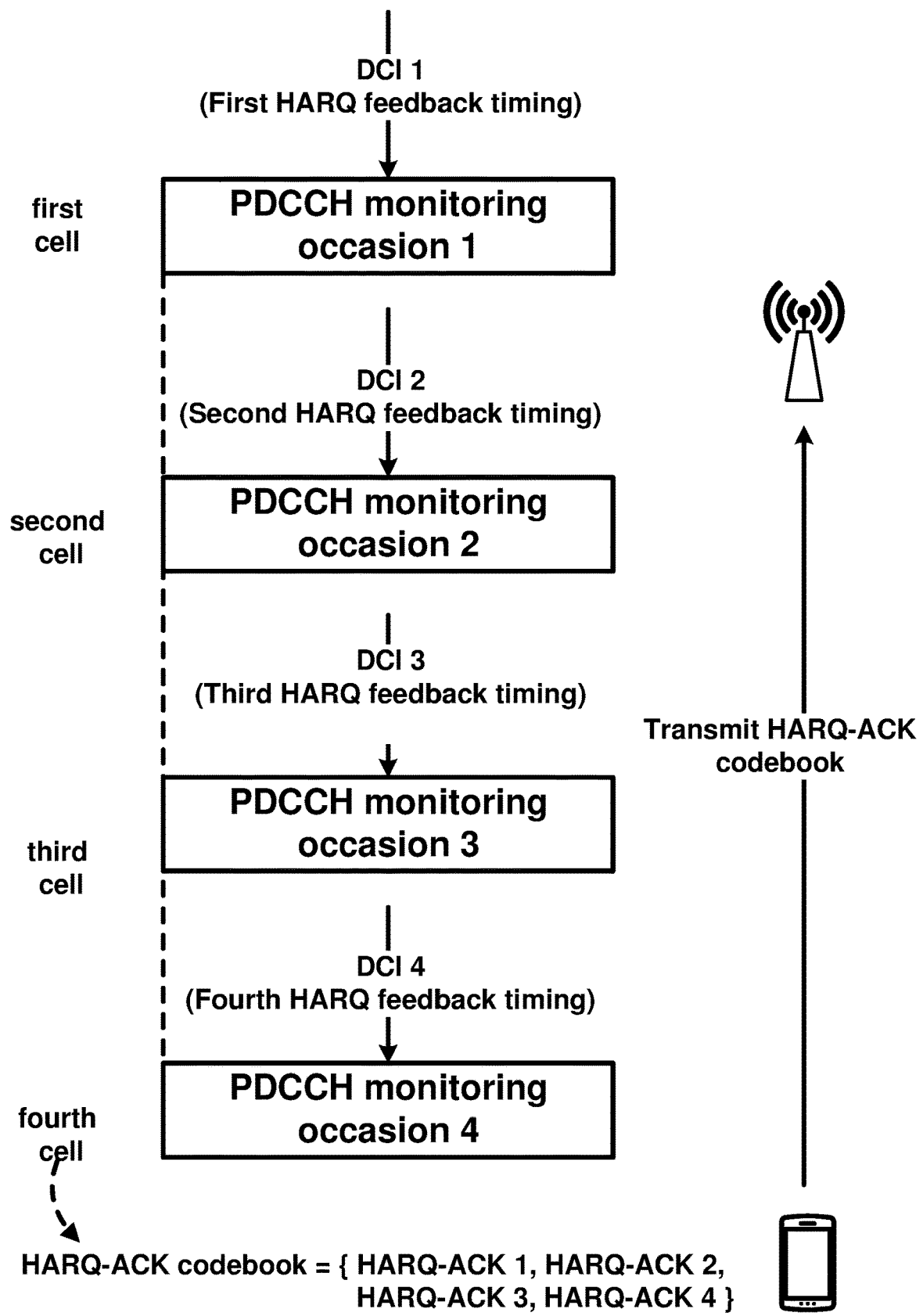
FIG. 19 is an example of a hybrid automatic repeat request acknowledgement (HARQ-ACK) codebook determination as per an aspect of an embodiment of the present disclosure.

In an example, the wireless device may receive the plurality of DCIs in respective cells (e.g., first cell, second cell, third cell and fourth cell in FIG. 19) associated with respective cell-specific indices (e.g., indicated by the one or more configuration parameters). In an example, the wireless device may receive each DCI of the plurality of DCIs in a respective cell (e.g., first cell, second cell, third cell and fourth cell in FIG. 19).

Figure 23:
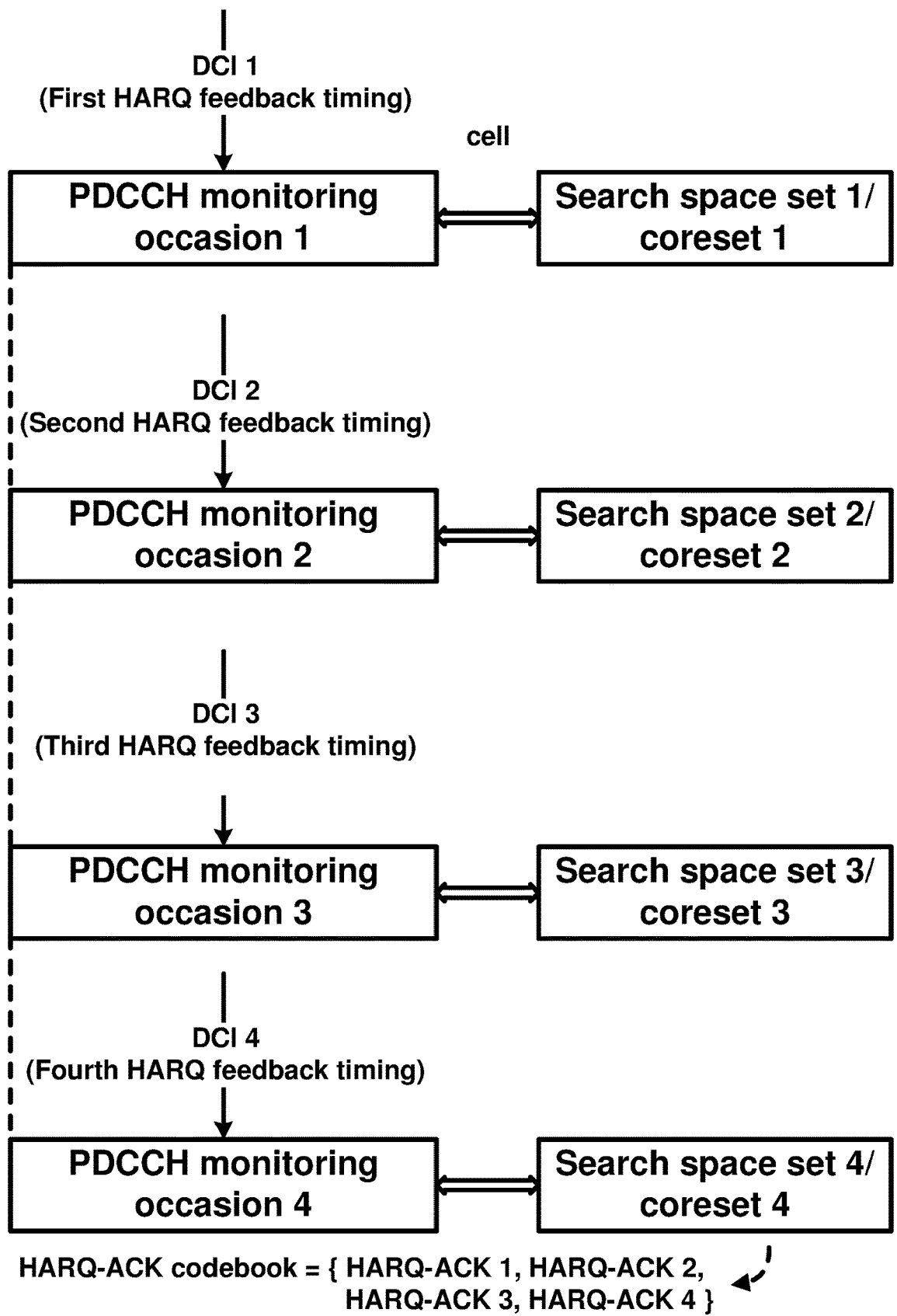
FIG. 23 is an example of a HARQ-ACK codebook determination as per an aspect of an embodiment of the present disclosure.

In an example, the wireless device may receive each DCI of the plurality of DCIs in a respective PDCCH monitoring occasion (e.g., PDCCH monitoring occasion n, n=1, 2, 3, 4 in FIG. 19, FIG. 20 and FIG. 23) associated with a respective search space set (e.g., FIG. 23). In an example, the wireless device may receive the plurality of DCIs in respective PDCCH monitoring occasions (e.g., PDCCH monitoring occasion n, n=1, 2, 3, 4 in FIG. 19, FIG. 20 and FIG. 23) associated with respective search space sets (e.g., search space set n, n=1, 2, 3, 4 in FIG. 23).

In an example, the respective search space set may be associated with (or linked to) a respective coreset (as discussed for FIG. 16-FIG. 18). In an example, the one or more configuration parameters may indicate the respective coreset (or respective coreset index of the respective coreset) for the respective search space set (e.g., provided by a higher layer parameter controlResourceSetId in the higher layer parameter SearchSpace). In an example, the wireless device may receive each DCI of the plurality of DCIs in a respective PDCCH monitoring occasion (e.g., PDCCH monitoring occasion n, n=1, 2, 3, 4 in FIG. 19, FIG. 20 and FIG. 23) associated with a respective coreset (e.g., FIG. 23). In an example, the wireless device may receive each DCI of the plurality of DCIs in a respective PDCCH monitoring occasion of a respective search space set associated with a respective coreset (e.g., FIG. 23). In an example, the wireless device may receive the plurality of DCIs in respective PDCCH monitoring occasions (e.g., PDCCH monitoring occasion n, n=1, 2, 3, 4 in FIG. 19, FIG. 20 and FIG. 23) associated with respective coresets (e.g., coreset n, n=1, 2, 3, 4 in FIG. 23).

Figure 21:
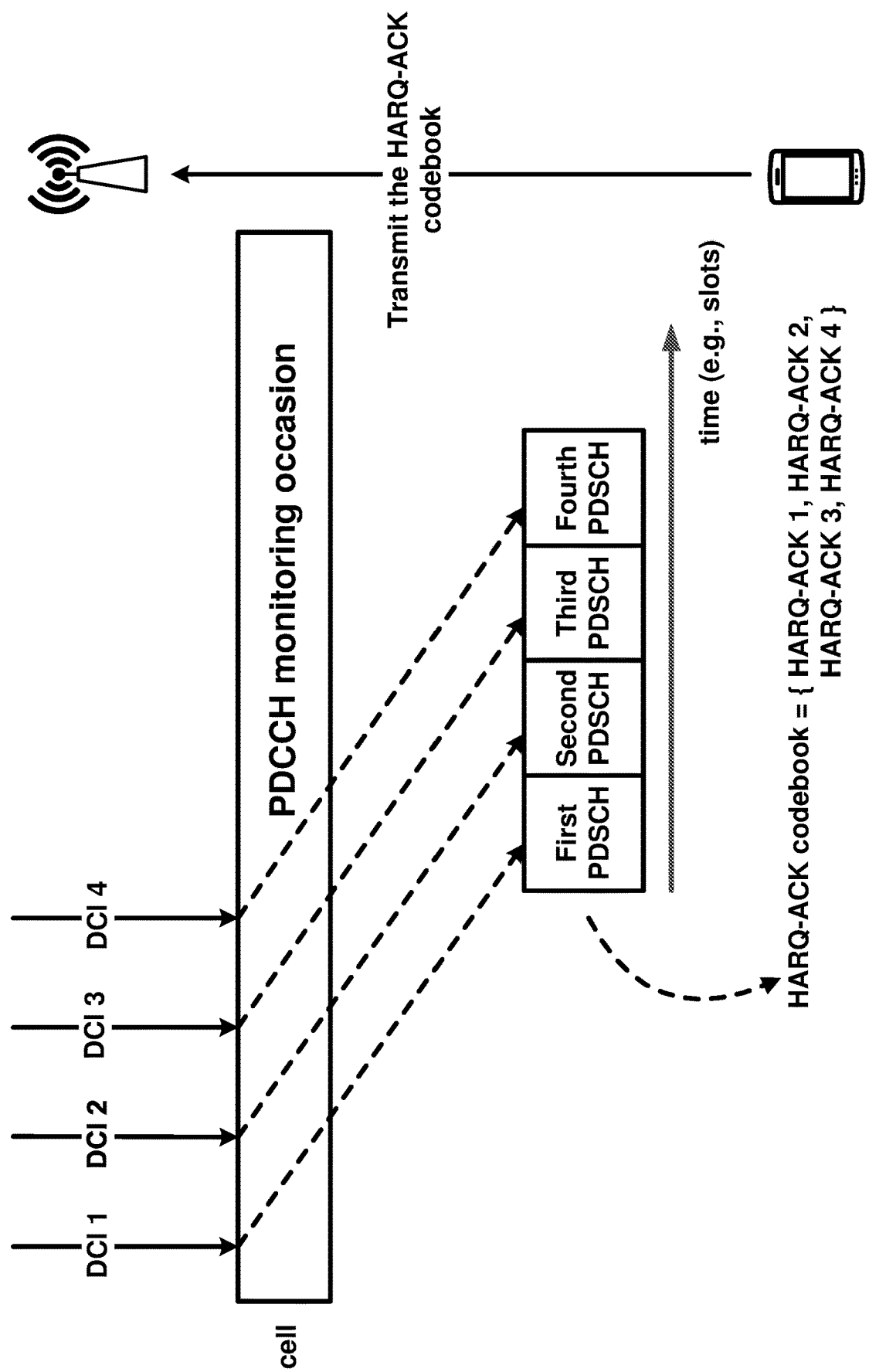
FIG. 21 is an example of a HARQ-ACK codebook determination as per an aspect of an embodiment of the present disclosure.

In an example, each DCI of the plurality of DCIs may schedule a respective TB in a respective time slot (e.g., FIG. 21). In an example, the plurality of DCIs may schedule respective TBs in respective time slots (e.g., FIG. 21). In an example, the wireless device may receive (or transmit) the respective TB in the respective time slot.

Figure 20:
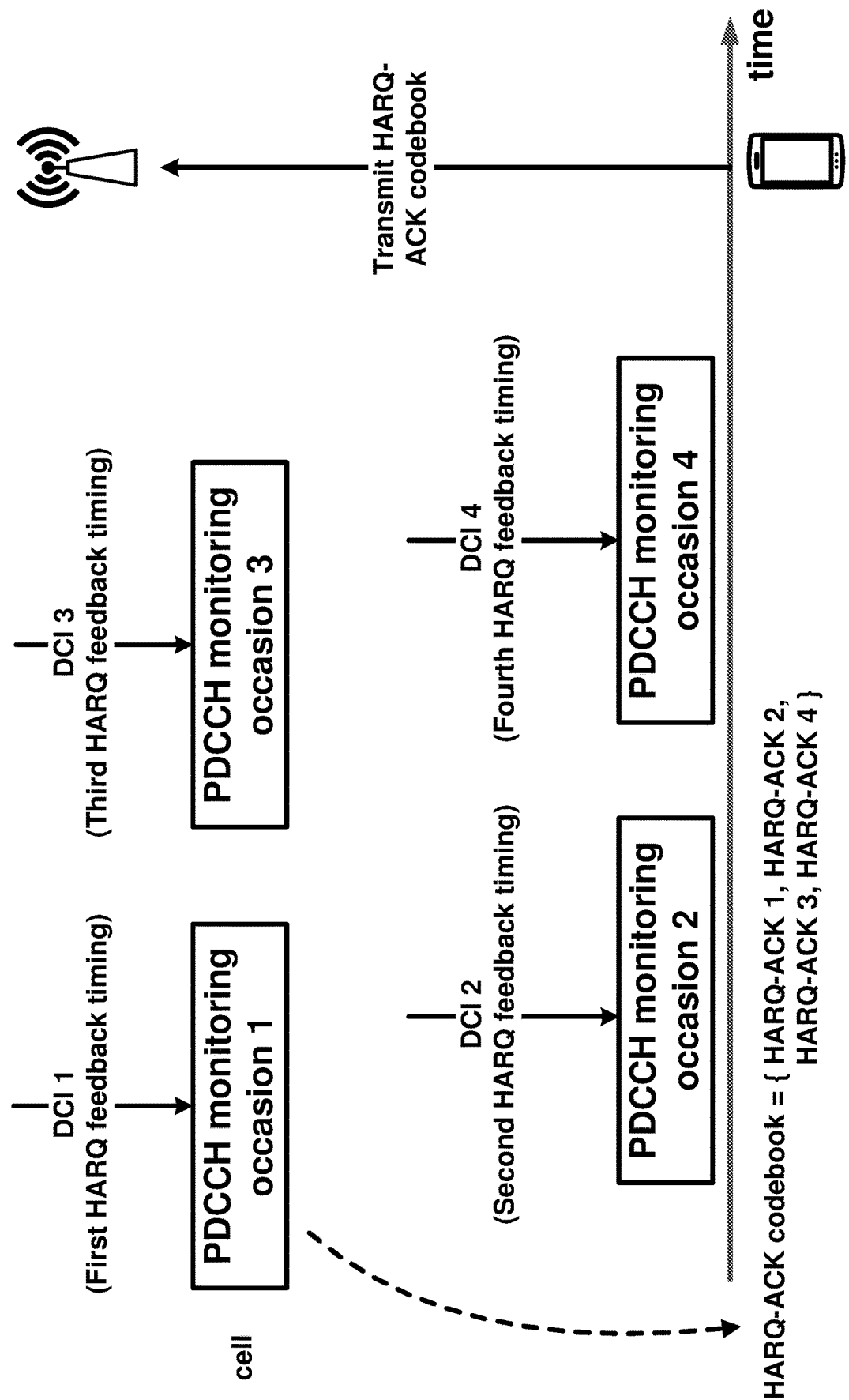
FIG. 20 is an example of a HARQ-ACK codebook determination as per an aspect of an embodiment of the present disclosure.

In an example, each DCI of the plurality of DCIs may comprise (or have) a PDSCH-to-HARQ feedback timing indicator field (e.g., First HARQ feedback timing, Second HARQ feedback timing, Third HARQ feedback timing, Fourth HARQ feedback timing in FIG. 19, FIG. 20 and FIG. 23) with a respective value indicating a respective slot (for example, same slot) for a PUCCH transmission (e.g., of an HARQ-ACK information/feedback of a respective TB).

In an example, each DCI of the plurality of DCIs may comprise (or have) a PUCCH resource indicator field (e.g., First PUCCH resource, Second PUCCH resource, Third PUCCH resource, Fourth PUCCH resource) indicating a respective PUCCH resource.

In an example, the wireless device may transmit, in the respective slot indicated by the PDSCH-to-HARQ feedback timing indicator field, HARQ-ACK information/feedback of the respective TB in the PUCCH transmission via the respective PUCCH resource indicated by the PUCCH resource indicator field.

In an example, the wireless device may receive the plurality of DCIs in a slot (or mini-slot, or subframe) of a scheduling cell. In an example, the wireless device may receive the plurality of DCIs in a same slot (or mini-slot, or subframe) of a scheduling cell.

In an example, the scheduling cell may be different from the respective cells (e.g., the first cell, the second cell, the third cell, and the fourth cell). In an example, the scheduling cell may be different from at least one of the respective cells (e.g., the first cell, the second cell, the third cell, and the fourth cell).

In an example, the respective cells may be scheduling cells (e.g., the first cell discussed for FIG. 16-FIG. 18). In an example, the first cell, the second cell, the third cell, and the fourth cell may be scheduling cells.

In an example, the first cell, the second cell, the third cell, and the fourth cell may be scheduled cells. In an example, the respective cells may be scheduled cells.

In an example, the wireless device may receive the respective TBs in a scheduled cell (e.g., the second cell discussed in FIG. 16-FIG. 18). The scheduled cell may be different from the respective cells (e.g., the first cell, the second cell, the third cell, and the fourth cell in FIG. 19). In an example, the wireless device may receive the respective TBs in scheduled cells. The scheduled cells may be different from the respective cells (e.g., the first cell, the second cell, the third cell, and the fourth cell in FIG. 19).

In an example, in FIG. 19-FIG. 23, the plurality of DCIs may comprise a first DCI (e.g., DCI-1), a second DCI (DCI-2), a third DCI (DCI-3), and a fourth DCI (DCI-4).

In an example, the first DCI may schedule a first TB (e.g., First PDSCH in FIG. 21) in a first time slot (e.g., slot 4n+8 in FIG. 18). The wireless device may receive (or transmit) the first TB in the first time slot. The first DCI may comprise (or have) a first PDSCH-to-HARQ feedback timing indicator field (e.g., First HARQ feedback timing in FIG. 19, FIG. 20 and FIG. 23) with a first value indicating a first slot for a first PUCCH transmission. The first DCI may comprise (or have) a first PUCCH resource indicator field indicating a first PUCCH resource. In an example, the wireless device may transmit, in the first slot (indicated by the first PDSCH-to-HARQ feedback timing indicator field), a first HARQ-ACK information/feedback (e.g., ACK, NACK) of (or corresponding to) the first TB in the first PUCCH transmission via the first PUCCH resource (indicated by the first PUCCH resource indicator field). The wireless device may receive the first DCI in a first PDCCH monitoring occasion (e.g., PDCCH monitoring occasion 1 in FIG. 19, FIG. 20 and FIG. 23) associated with a first search space set (e.g., search space set 1 in FIG. 23) identified by a first search space set index (e.g., provided by a higher layer parameter searchSpaceId, indicated by the one or more configuration parameters). In an example, the first search space set may be associated with (or linked to) a first coreset (e.g., coreset 1 in FIG. 23) identified by a first coreset index (e.g., provided by a higher layer parameter controlResourceSetId, indicated by the one or more configuration parameters). The wireless device may receive/detect the first DCI in/via a first cell (e.g., first cell in FIG. 19) identified by a first cell-specific index (e.g., provided by a higher layer parameter servCellIndex, indicated by the one or more configuration parameters).

In an example, the second DCI may schedule a second TB (e.g., Second PDSCH in FIG. 21) in a second time slot (e.g., slot 4n+9 in FIG. 18). The wireless device may receive (or transmit) the second TB in the second time slot. The second DCI may comprise (or have) a second PDSCH-to-HARQ feedback timing indicator field (e.g., Second HARQ feedback timing in FIG. 19, FIG. 20 and FIG. 23) with a second value indicating a second slot for a second PUCCH transmission. The second DCI may comprise (or have) a second PUCCH resource indicator field indicating a second PUCCH resource. In an example, the wireless device may transmit, in the second slot (indicated by the second PDSCH-to-HARQ feedback timing indicator field), a second HARQ-ACK information/feedback (e.g., ACK, NACK) of (or corresponding to) the second TB in the second PUCCH transmission via the second PUCCH resource (indicated by the second PUCCH resource indicator field). The wireless device may receive the second DCI in a second PDCCH monitoring occasion (e.g., PDCCH monitoring occasion 2 in FIG. 19, FIG. 20 and FIG. 23) associated with a second search space set (e.g., search space set 2 in FIG. 23) identified by a second search space set index (e.g., provided by a higher layer parameter searchSpaceId, indicated by the one or more configuration parameters). In an example, the second search space set may be associated with (or linked to) a second coreset (e.g., coreset 2 in FIG. 23) identified by a second coreset index (e.g., provided by a higher layer parameter controlResourceSetId, indicated by the one or more configuration parameters). The wireless device may receive/detect the second DCI in/via a second cell (e.g., second cell in FIG. 19) identified by a second cell-specific index (e.g., provided by a higher layer parameter servCellIndex, indicated by the one or more configuration parameters).

In an example, the third DCI may schedule a third TB (e.g., Third PDSCH in FIG. 21) in a third time slot (e.g., slot 4n+10 in FIG. 18). The wireless device may receive (or transmit) the third TB in the third time slot. The third DCI may comprise (or have) a third PDSCH-to-HARQ feedback timing indicator field (e.g., Third HARQ feedback timing in FIG. 19, FIG. 20 and FIG. 23) with a third value indicating a third slot for a third PUCCH transmission. The third DCI may comprise (or have) a third PUCCH resource indicator field indicating a third PUCCH resource. In an example, the wireless device may transmit, in the third slot (indicated by the third PDSCH-to-HARQ feedback timing indicator field), a third HARQ-ACK information/feedback (e.g., ACK, NACK) of the third TB in the third PUCCH transmission via the third PUCCH resource (indicated by the third PUCCH resource indicator field). The wireless device may receive the third DCI in a third PDCCH monitoring occasion (e.g., PDCCH monitoring occasion 3 in FIG. 19, FIG. 20 and FIG. 23) associated with a third search space set (e.g., search space set 3 in FIG. 23) identified by a third search space set index (e.g., provided by a higher layer parameter searchSpaceId). In an example, the third search space set may be associated with (or linked to) a third coreset (e.g., coreset 3 in FIG. 23) identified by a third coreset index. The wireless device may receive/detect the third DCI in/via a third cell (e.g., third cell in FIG. 19) identified by a third cell-specific index.

In an example, the fourth DCI may schedule a fourth TB (e.g., Fourth PDSCH in FIG. 21) in a fourth time slot (e.g., slot 4n+11 in FIG. 18). The wireless device may receive (or transmit) the fourth TB in the fourth time slot. The fourth DCI may comprise (or have) a fourth PDSCH-to-HARQ feedback timing indicator field (e.g., Fourth HARQ feedback timing in FIG. 19, FIG. 20 and FIG. 23) with a fourth value indicating a fourth slot for a fourth PUCCH transmission. The fourth DCI may comprise (or have) a fourth PUCCH resource indicator field indicating a fourth PUCCH resource. In an example, the wireless device may transmit, in the fourth slot (indicated by the fourth PDSCH-to-HARQ feedback timing indicator field), a fourth HARQ-ACK information/feedback (e.g., ACK, NACK) of the fourth TB in the fourth PUCCH transmission via the fourth PUCCH resource (indicated by the fourth PUCCH resource indicator field). The wireless device may receive the fourth DCI in a fourth PDCCH monitoring occasion (e.g., PDCCH monitoring occasion 4 in FIG. 19, FIG. 20 and FIG. 23) associated with a fourth search space set (e.g., search space set 4 in FIG. 23) identified by a fourth search space set index (e.g., provided by a higher layer parameter searchSpaceId, indicated by the one or more configuration parameters). In an example, the fourth search space set may be associated with (or linked to) a fourth coreset (e.g., coreset 4 in FIG. 23) identified by a fourth coreset index. The wireless device may receive/detect the fourth DCI in/via a fourth cell (e.g., fourth cell in FIG. 19) identified by a fourth cell-specific index.

In an example, the first coreset, the second coreset, the third coreset and the fourth coreset may be different (e.g. in FIG. 19, FIG. 20 and FIG. 23). In an example, the first coreset and the second coreset being different may comprise that the first coreset index and the second coreset index are different. In an example, the first coreset and the second coreset being different may comprise that a first cell configured with the first coreset and a second cell configured with the second coreset are different.

Figure 22:
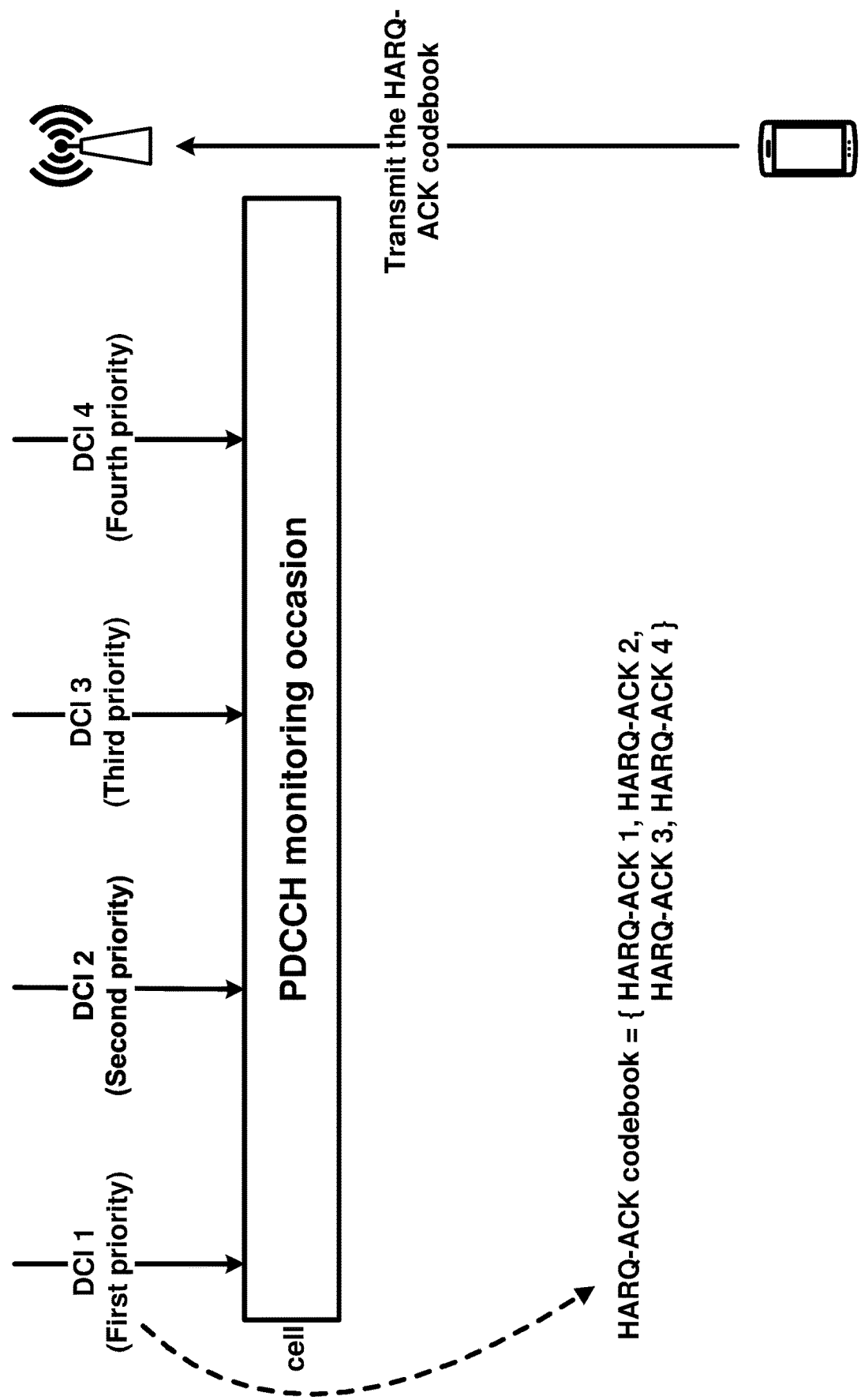
FIG. 22 is an example of a HARQ-ACK codebook determination as per an aspect of an embodiment of the present disclosure.

In an example, the first coreset, the second coreset, the third coreset and the fourth coreset may be the same (e.g., in FIG. 20, FIG. 21 and FIG. 22). The first coreset, the second coreset, the third coreset and the fourth coreset being the same may comprise that the first coreset index, the second coreset index, the third coreset index and the fourth coreset index are the same. The first coreset, the second coreset, the third coreset and the fourth coreset being the same may comprise that the first coreset, the second coreset, the third coreset and the fourth coreset are configured, by the base station, for the same cell (e.g., cell in FIG. 20, FIG. 21, FIG. 22).

In an example, the first search space set, the second search space set, the third search space set and the fourth search space set may be different (e.g. in FIG. 19, FIG. 20 and FIG. 23). In an example, the first search space set and the second search space set being different may comprise that the first search space set index and the second search space set index are different. In an example, the first search space set and the second search space set being different may comprise that a first cell configured with the first search space set and a second cell configured with the second search space set are different.

In an example, the first search space set, the second search space set, the third search space set and the fourth search space set may be the same (e.g., in FIG. 20, FIG. 21 and FIG. 22). The first search space set, the second search space set, the third search space set and the fourth search space set being the same may comprise that the first search space set index, the second search space set index, the third search space set index and the fourth search space set index are the same. The first search space set, the second search space set, the third search space set and the fourth search space set being the same may comprise that the first search space set, the second search space set, the third search space set and the fourth search space set are configured, by the base station, for the same cell (e.g., cell in FIG. 20, FIG. 21 and FIG. 22).

In an example, the respective value of the PDSCH-to-HARQ feedback timing indicator field of each DCI of the plurality of DCIs may indicate a same slot for the respective PUCCH transmission. In an example, the PDSCH-to-HARQ feedback timing indicator field, of each DCI of the plurality of DCIs, with the respective value may indicate the same slot for the (respective) PUCCH transmission. In an example, in FIG. 19-FIG. 23, the first slot for the first PUCCH transmission, the second slot for the second PUCCH transmission, the third slot for the third PUCCH transmission and the fourth slot for the fourth PUCCH transmission may be the same.

In an example, the wireless device may generate a HARQ-ACK codebook. In an example, based on the respective value of the PDSCH-to-HARQ feedback timing indicator field of each DCI of the plurality of DCIs indicating the same slot for the respective PUCCH transmission, the wireless device may generate the HARQ-ACK codebook. In an example, the wireless device may transmit the HARQ-ACK codebook via a PUCCH resource. In an example, the wireless device may transmit the HARQ-ACK codebook in the (same) slot (e.g., indicated by the PDSCH-to-HARQ feedback timing indicator field of each DCI). In an example, the HARQ-ACK codebook may comprise a respective HARQ-ACK information/feedback of each scheduled TB. In an example, the HARQ-ACK codebook may comprise a respective HARQ-ACK information/feedback of the respective TB (of the respective TBs scheduled by the plurality of DCIs). In an example, the HARQ-ACK codebook may comprise HARQ-ACK information/feedback of the respective TBs. In an example, the HARQ-ACK codebook may comprise the first HARQ-ACK information/feedback of the first TB, the second HARQ-ACK information/feedback of the second TB, the third HARQ-ACK information/feedback of the third TB, and the fourth HARQ-ACK information/feedback of the fourth TB. In an example, the wireless device may multiplex the first HARQ-ACK information/feedback of the first TB, the second HARQ-ACK information/feedback of the second TB, the third HARQ-ACK information/feedback of the third TB, and the fourth HARQ-ACK information/feedback in the HARQ-ACK codebook. In an example, at least one DCI of the plurality of DCIs may indicate the PUCCH resource (e.g., by a PUCCH resource indicator field of the at least one DCI).

In an example, the wireless device may determine, in the HARQ-ACK codebook, a respective location/position of an HARQ-ACK information/feedback associated with each scheduled TB (e.g., of the plurality of TBs). In an example, based on the respective value of the PDSCH-to-HARQ feedback timing indicator field of each DCI of the plurality of DCIs indicating the same slot for the respective PUCCH transmission, the wireless device may determine, in the HARQ-ACK codebook, a respective location/position of the HARQ-ACK information/feedback associated with each scheduled TB.

In an example, the wireless device may determine, in the HARQ-ACK codebook, a respective location/position of a respective HARQ-ACK information/feedback associated with the respective TB. In an example, based on the respective value of the PDSCH-to-HARQ feedback timing indicator field of each DCI of the plurality of DCIs indicating the same slot for the respective PUCCH transmission, the wireless device may determine, in the HARQ-ACK codebook, a respective location/position of a respective HARQ-ACK information/feedback associated with the respective TB. In an example, based on the PDSCH-to-HARQ feedback timing indicator field, of each DCI of the plurality of DCIs, with the respective value indicating the same slot for the (respective) PUCCH transmission, the wireless device may determine, in the HARQ-ACK codebook, a respective location/position of a respective HARQ-ACK information/feedback associated with the respective TB.

In an example, the wireless device may determine, in the HARQ-ACK codebook, a first location/position of the first HARQ-ACK information/feedback, a second location/position of the second HARQ-ACK information/feedback, a third location/position of the third HARQ-ACK information/feedback, and a fourth location/position of the fourth HARQ-ACK information/feedback. In an example, in FIG. 19-FIG. 23, based on the first slot for the first PUCCH transmission, the second slot for the second PUCCH transmission, the third slot for the third PUCCH transmission and the fourth slot for the fourth PUCCH transmission being the same, the wireless device may determine, in the HARQ-ACK codebook, a first location/position of the first HARQ-ACK information/feedback, a second location/position of the second HARQ-ACK information/feedback, a third location/position of the third HARQ-ACK information/feedback, and a fourth location/position of the fourth HARQ-ACK information/feedback.

In an example, the HARQ-ACK codebook may comprise the first HARQ-ACK information/feedback in the first location/position of the HARQ-ACK codebook, the second HARQ-ACK information/feedback in the second location/position of the HARQ-ACK codebook, the third HARQ-ACK information/feedback in the third location/position of the HARQ-ACK codebook, and the fourth HARQ-ACK information/feedback in the fourth location/position of the HARQ-ACK codebook. In an example, based on the determining the first location/position, the second location/position, the third location/position and the fourth location/position, the HARQ-ACK codebook may comprise the first HARQ-ACK information/feedback in the first location/position of the HARQ-ACK codebook, the second HARQ-ACK information/feedback in the second location/position of the HARQ-ACK codebook, the third HARQ-ACK information/feedback in the third location/position of the HARQ-ACK codebook, and the fourth HARQ-ACK information/feedback in the fourth location/position of the HARQ-ACK codebook. In an example, based on the determining the first location/position, the second location/position, the third location/position and the fourth location/position, the wireless device include/record, in the HARQ-ACK codebook, the first HARQ-ACK information/feedback in the first location/position of the HARQ-ACK codebook, the second HARQ-ACK information/feedback in the second location/position of the HARQ-ACK codebook, the third HARQ-ACK information/feedback in the third location/position of the HARQ-ACK codebook, and the fourth HARQ-ACK information/feedback in the fourth location/position of the HARQ-ACK codebook. In an example, in FIG. 19-FIG. 23, the first location/position of the first HARQ-ACK information/feedback in the HARQ-ACK codebook is 1st position. The second location/position of the second HARQ-ACK information/feedback in the HARQ-ACK codebook is 2nd position. The third location/position of the third HARQ-ACK information/feedback in the HARQ-ACK codebook is 3rd position. The fourth location/position of the fourth HARQ-ACK information/feedback in the HARQ-ACK codebook is 4th position.

In an example, the wireless device may transmit the HARQ-ACK codebook. In an example, the wireless device may transmit the HARQ-ACK codebook based on the determining, in the HARQ-ACK codebook, the respective location/position of the respective HARQ-ACK information/feedback associated with the respective TB. In an example, the wireless device may transmit the HARQ-ACK codebook based on the determining, in the HARQ-ACK codebook, the respective location/position of the HARQ-ACK information/feedback associated with each scheduled TB. In an example, the wireless device may transmit the HARQ-ACK codebook based on the determining the first location/position, the second location/position, the third location/position and the fourth location/position. In an example, the wireless device may transmit the HARQ-ACK codebook based on the including/recording the first HARQ-ACK information/feedback in the first location/position of the HARQ-ACK codebook, the second HARQ-ACK information/feedback in the second location/position of the HARQ-ACK codebook, the third HARQ-ACK information/feedback in the third location/position of the HARQ-ACK codebook, and the fourth HARQ-ACK information/feedback in the fourth location/position of the HARQ-ACK codebook. In an example, the wireless device may transmit the HARQ-ACK codebook via an uplink channel. The uplink channel may be a PUCCH resource. The uplink channel may be a PUSCH resource. The PUCCH resource may be a short PUCCH format. The PUCCH resource may be a long PUCCH format.

In an example, the HARQ-ACK codebook may comprise the (respective) HARQ-ACK information/feedback of each scheduled TB at the respective location/position.

FIG. 19 is an example of a HARQ-ACK codebook determination as per an aspect of an embodiment of the present disclosure.

In an example, in FIG. 19, a respective PDCCH monitoring occasion index of the respective PDCCH monitoring occasion that each DCI of the plurality of DCIs is received may be the same/equal. In an example, when the respective PDCCH monitoring occasion index of the respective PDCCH monitoring occasion that each DCI of the plurality of DCIs is received is the same/equal, the determining, in the HARQ-ACK codebook, the respective location/position of the respective HARQ-ACK information/feedback associated with the respective TB may be based on a respective cell that each DCI of the plurality of DCIs is received.

In an example, the determining, in the HARQ-ACK codebook, the respective location/position of the respective HARQ-ACK information/feedback associated with the respective TB may be based on a respective cell that each DCI of the plurality of DCIs is received. In an example, the determining, in the HARQ-ACK codebook, the respective location/position of the respective HARQ-ACK information/feedback associated with the respective TB may be based on a respective cell-specific index of a respective cell that each DCI of the plurality of DCIs is received. In an example, the determining, in the HARQ-ACK codebook, the respective location/position of the respective HARQ-ACK information/feedback associated with the respective TB may be based on an ascending (or descending) order of respective cell-specific indices of the respective cells that the plurality of DCIs is received.

In an example, in FIG. 19 and FIG. 23, a respective PDCCH monitoring occasion index of the respective PDCCH monitoring occasion that each DCI of the plurality of DCIs is received may be the same/equal. In an example, the respective PDCCH monitoring occasion index of the respective PDCCH monitoring occasion being the same/equal may comprise that the respective search space set associated with the respective PDCCH monitoring occasion that each DCI of the plurality of DCIs is received may start at the same time. In an example, in FIG. 19 and FIG. 23, a first time (e.g., defined as start time of the first search space set as discussed for FIG. 20), a second time (e.g., defined as start time of the second search space set), a third time (e.g., defined as start time of the third search space set) and a fourth time (e.g., defined as start time of the fourth search space set) are the same. Based on the first time, the second time, the third time and the fourth time being the same, the wireless device may determine that a first PDCCH monitoring occasion index of the first PDCCH monitoring occasion, a second PDCCH monitoring occasion index of the second PDCCH monitoring occasion, a third PDCCH monitoring occasion index of the third PDCCH monitoring occasion; and a fourth PDCCH monitoring occasion index of the fourth PDCCH monitoring occasion are the same/equal.

In an example, in FIG. 19, the wireless device may determine that the first cell-specific index of the first cell that the first DCI is received is lower (or higher) than the second cell-specific index of the second cell that the second DCI is received. In an example, the determining, in the HARQ-ACK codebook, the first location/position of the first HARQ-ACK information/feedback and the second location/position of the second HARQ-ACK information/feedback may be based on the first cell-specific index and the second cell-specific index. Based on the determining that the first cell-specific index being lower (or higher) than the second cell-specific index, the wireless device may include/record the first location/position of the first HARQ-ACK information/feedback before (or prior to, or earlier than) the second location/position of the second HARQ-ACK information/feedback in the HARQ-ACK codebook.

In an example, the including/recording the first location/position of the first HARQ-ACK information/feedback before (or prior to, or earlier than) the second location/position of the second HARQ-ACK information/feedback in the HARQ-ACK codebook may comprise that the first location/position of the of the first HARQ-ACK information/feedback in the HARQ-ACK codebook is earlier than (or before or lower than) the second location/position of the second HARQ-ACK information/feedback in the HARQ-ACK codebook. In an example, the including/recording the first location/position of the first HARQ-ACK information/feedback before (or prior to, or earlier than) the second location/position of the second HARQ-ACK information/feedback in the HARQ-ACK codebook may comprise that the first location/position has a lower bit position in the HARQ-ACK codebook than the second location/position of the second HARQ-ACK information/feedback. For example, in FIG. 19-FIG. 23, the first location/position ($1^{st}$ position) of the first HARQ-ACK information/feedback (e.g., HARQ-ACK 1) in the HARQ-ACK codebook (e.g., HARQ-ACK codebook in FIG. 19-FIG. 23) is earlier (or lower or before) than the second location/position (2nd position) of the second HARQ-ACK information/feedback (e.g., HARQ-ACK 2) in the HARQ-ACK codebook (e.g., HARQ-ACK codebook in FIG. 19-FIG. 23).

In an example, in FIG. 19, the wireless device may determine that the first cell-specific index of the first cell that the first DCI is received is lower (or higher) than the second cell-specific index of the second cell that the second DCI is received, the third cell-specific index of the third cell that the third DCI is received and the fourth cell-specific index of the fourth cell that the fourth DCI is received. In an example, the determining, in the HARQ-ACK codebook, the first location/position of the first HARQ-ACK information/feedback, the second location/position of the second HARQ-ACK information/feedback, the third location/position of the third HARQ-ACK information/feedback and the fourth location/position of the fourth HARQ-ACK information/feedback may be based on the first cell-specific index, the second cell-specific index, the third cell-specific index, and the fourth cell-specific index. Based on the determining that the first cell-specific index is lower (or higher) than the second cell-specific index, the third cell-specific index, and the fourth cell-specific index, the wireless device may include/record, in the HARQ-ACK codebook, the first location/position of the first HARQ-ACK information/feedback before (or prior to, or earlier than) the second location/position of the second HARQ-ACK information/feedback, the third location/position of the third HARQ-ACK information/feedback, and the fourth location/position of the fourth HARQ-ACK information/feedback. In an example, the wireless device may determine that the second cell-specific index is lower (or higher) than the third cell-specific index and the fourth cell-specific index. Based on the determining that the second cell-specific index is lower (or higher) than the third cell-specific index and the fourth cell-specific index, the wireless device may include/record, in the HARQ-ACK codebook, the second location/position of the second HARQ-ACK information/feedback before (or prior to, or earlier than) the third location/position of the third HARQ-ACK information/feedback and the fourth location/position of the fourth HARQ-ACK information/feedback. In an example, the wireless device may determine that the third cell-specific index is lower (or higher) than the fourth cell-specific index. In an example, based on the determining that the third cell-specific index is lower (or higher) than the fourth cell-specific index, the wireless device may include/record, in the HARQ-ACK codebook, the third location/position of the third HARQ-ACK information/feedback before (or prior to, or earlier than) and the fourth location/position of the fourth HARQ-ACK information/feedback.

In an example, based on an ascending (or descending) order of cell-specific indices of the respective cells that the plurality of DCIs is received, the wireless device may determine, in the HARQ-ACK codebook, the respective location/position of the respective HARQ-ACK information/feedback in an order of the first location/position of the first HARQ-ACK information/feedback, the second location/position of the second HARQ-ACK information/feedback, the third location/position of the third HARQ-ACK information/feedback and the fourth location/position of the fourth HARQ-ACK information/feedback (e.g., HARQ-ACK order={HARQ-ACK 1, HARQ-ACK 2, HARQ-ACK 3, HARQ-ACK 4} in FIG. 19).

FIG. 20 is an example of a HARQ-ACK codebook determination as per an aspect of an embodiment of the present disclosure.

In an example, a first PDCCH monitoring occasion associated with a first search space set may start at a first time (e.g., symbol, mini-slot, etc.) in a first slot (e.g., or subframe, or frame, or mini-slot) of a first cell. In an example, a second PDCCH monitoring occasion associated with a second search space set may start at a second time in a second slot of a second cell. In an example, the first slot and the second slot may be the same. In an example, the first slot and the second slot may be different. In an example, the first cell and the second cell may be the same. In an example, the first cell and the second cell may be different.

In an example, the first time and the second time may be the same. Based on the first time and the second time being the same, the first PDCCH monitoring occasion and the second PDCCH monitoring occasion may have a same PDCCH monitoring occasion index. In an example, based on the first time and the second time being the same, a first PDCCH monitoring occasion index of the first PDCCH monitoring occasion and a second PDCCH monitoring occasion index of the second PDCCH monitoring occasion may be the same.

In an example, the first time and the second time may be different. Based on the first time and the second time being different, the first PDCCH monitoring occasion and the second PDCCH monitoring occasion may have different PDCCH monitoring occasion indices. In an example, based on the first time and the second time being different, a first PDCCH monitoring occasion index of the first PDCCH monitoring occasion and a second PDCCH monitoring occasion index of the second PDCCH monitoring occasion may be different.

In an example, the first time (e.g., time T1) may be lower (or earlier) in time (e.g., T1<T2) than the second time (e.g., time T2). Based on the first time being lower (or earlier) in time than the second time, the first PDCCH monitoring occasion index may be lower than the second PDCCH monitoring occasion index.

In an example, the first time (e.g., time T1) may be higher (or later) in time (e.g., T1>T2) than the second time (at time T2). Based on the first time being higher (or later) in time than the second time, the first PDCCH monitoring occasion index may be higher than the second PDCCH monitoring occasion index.

In an example, the determining, in the HARQ-ACK codebook, the respective location/position of the respective HARQ-ACK information/feedback associated with the respective TB may be based on a respective PDCCH monitoring occasion that each DCI of the plurality of DCIs is received. In an example, the determining, in the HARQ-ACK codebook, the respective location/position of the respective HARQ-ACK information/feedback associated with the respective TB may be based on a respective PDCCH monitoring occasion index of a respective PDCCH monitoring occasion that each DCI of the plurality of DCIs is received. In an example, the determining, in the HARQ-ACK codebook, the respective location/position of the respective HARQ-ACK information/feedback associated with the respective TB may be based on an ascending (or descending) order of respective PDCCH monitoring occasion indices of the respective PDCCH monitoring occasions that the plurality of DCIs is received.

In an example, in FIG. 20, the respective cells that the plurality of DCIs is received may be the same (e.g., cell in FIG. 20 or the first cell discussed in FIG. 16-FIG. 18). In an example, the wireless device may receive the plurality of DCIs via a cell. In an example, the respective cell that the wireless device receives/detects each DCI of the plurality of DCIs may be the same. In an example, the first cell, the second cell, the third cell and the fourth cell may be the same. In an example, the first cell, the second cell, the third cell and the fourth cell being the same may comprise that the first cell-specific index, the second cell-specific index, the third cell-specific index, and the fourth cell-specific index are the same/equal.

In an example, the first PDCCH monitoring occasion associated with the first search space set may start at a first time. In an example, the second PDCCH monitoring occasion associated with the second search space set may start at a second time. In an example, the third PDCCH monitoring occasion associated with the third search space set may start at a third time. In an example, the fourth PDCCH monitoring occasion associated with the fourth search space set may start at a second time.

In an example, a PDCCH monitoring occasion associated with a search space set starting at a time may comprise that the search space set associated with the PDCCH monitoring occasion starts at the time. In an example, the wireless device may start monitoring, for a DCI, PDCCH candidates in the PDCCH monitoring occasion of the search space set at the time.

In an example, in FIG. 20, the wireless device may determine that a first PDCCH monitoring occasion index of the first PDCCH monitoring occasion that the first DCI is received is lower (or higher) than a second PDCCH monitoring occasion index of the second PDCCH monitoring occasion that the second DCI is received, a third PDCCH monitoring occasion index of the third PDCCH monitoring occasion that the third DCI is received and a fourth PDCCH monitoring occasion index of the fourth PDCCH monitoring occasion that the fourth DCI is received. In an example, the determining, in the HARQ-ACK codebook, the first location/position of the first HARQ-ACK information/feedback, the second location/position of the second HARQ-ACK information/feedback, the third location/position HARQ-ACK information/feedback and the fourth location/position of the fourth HARQ-ACK information/feedback may be based on the first PDCCH monitoring occasion index, the second PDCCH monitoring occasion index, the third PDCCH monitoring occasion index, and the fourth PDCCH monitoring occasion index. Based on the determining that the first PDCCH monitoring occasion index is lower (or higher) than the second PDCCH monitoring occasion index, the third PDCCH monitoring occasion index, and the fourth PDCCH monitoring occasion index, the wireless device may include/record, in the HARQ-ACK codebook, the first location/position of the first HARQ-ACK information/feedback before (or prior to, or earlier than) the second location/position of the second HARQ-ACK information/feedback, the third location/position of the third HARQ-ACK information/feedback, and the fourth location/position of the fourth HARQ-ACK information/feedback. In an example, the first PDCCH monitoring occasion index being lower (or higher) than the second PDCCH monitoring occasion index, the third PDCCH monitoring occasion index and the fourth PDCCH monitoring occasion index may comprise that the first time is earlier (or later) in time than the second time, the third time and the fourth time. In an example, the wireless device may determine that the second PDCCH monitoring occasion index is lower (or higher) than the third PDCCH monitoring occasion index and the fourth PDCCH monitoring occasion index. Based on the determining that the second PDCCH monitoring occasion index is lower (or higher) than the third PDCCH monitoring occasion index and the fourth PDCCH monitoring occasion index, the wireless device may include/record, in the HARQ-ACK codebook, the second location/position of the second HARQ-ACK information/feedback before (or prior to, or earlier than) the third location/position of the third HARQ-ACK information/feedback and the fourth location/position of the fourth HARQ-ACK information/feedback. In an example, the second PDCCH monitoring occasion index being lower (or higher) than the third PDCCH monitoring occasion index and the fourth PDCCH monitoring occasion index may comprise that the second time is earlier (or later) in time than the third time and the fourth time. In an example, the wireless device may determine that the third PDCCH monitoring occasion index is lower than the fourth PDCCH monitoring occasion index. In an example, based on the determining that the third PDCCH monitoring occasion index is lower than the fourth PDCCH monitoring occasion index, the wireless device may include/record, in the HARQ-ACK codebook, the third location/position of the third HARQ-ACK information/feedback before (or prior to, or earlier than) and the fourth location/position of the fourth HARQ-ACK information/feedback. In an example, the third PDCCH monitoring occasion index being lower (or higher) than the fourth PDCCH monitoring occasion index may comprise that the third time is earlier (or later) in time than the fourth time.

In an example, based on an ascending (or descending) order of respective PDCCH monitoring occasion indices of the respective PDCCH monitoring occasions that the plurality of DCIs is received, the wireless device may determine, in the HARQ-ACK codebook, the respective location/position of the respective HARQ-ACK information/feedback in an order of the first location/position of the first HARQ-ACK information/feedback, the second location/position of the second HARQ-ACK information/feedback, the third location/position of the third HARQ-ACK information/feedback and the fourth location/position of the fourth HARQ-ACK information/feedback (e.g., HARQ-ACK order={HARQ-ACK 1, HARQ-ACK 2, HARQ-ACK 3, HARQ-ACK 4} in FIG. 20).

A wireless device may receive/detect a plurality of DCIs (e.g., unicast DCIs). The plurality of DCIs may schedule a plurality of TBs (or PDSCHs or PUSCHs). In an example, each DCI of the plurality of DCIs may indicate a (same) time slot for a PUCCH transmission of an HARQ-ACK information/feedback corresponding to a respective TB of the plurality of TBs.

In an example, the wireless device may receive/detect the plurality of DCIs in a same PDCCH monitoring occasion of a same cell. In the implementation of the existing systems, the wireless device may determine, in an HARQ-ACK codebook, a (respective) location/position of an HARQ-ACK information/feedback corresponding to each TB of the plurality of TBs based on i) cell indexes of serving cells and/or ii) PDCCH monitoring occasions that the wireless device receives the plurality of DCIs. This may not be efficient when the wireless device receives the plurality of DCIs in the same PDCCH monitoring occasion of the same cell. Determining, in the HARQ-ACK codebook, a (respective) location/position of an HARQ-ACK information/feedback corresponding to each TB of the plurality of TBs based on i) cell indexes of serving cells and/or ii) PDCCH monitoring occasions may not be enough to distinguish when the wireless device receives the plurality of DCIs in the same PDCCH monitoring occasion of the same cell. This may lead to a misalignment in locations/positions of HARQ-ACK information/feedback in the HARQ-ACK codebook between the base station and the wireless device. The misalignment may result in incorrect detection/reception of the multiplexed HARQ-ACK information/feedback by the base station. This may result in the detection/reception, by the base station, of a wrong/incorrect/mismatched HARQ-ACK information/feedback (e.g., a first HARQ-ACK information/feedback for a second TB and a second HARQ-ACK information/feedback for a first TB). This may result in retransmission of the plurality of TBs. In an example, the base station may transmit new DCIs for the retransmission of the plurality of TBs, increasing the power consumption at the base station and increasing the downlink interference to other wireless devices/cells. In an example, the wireless device may monitor, for the new DCIs, downlink control channels increasing the power consumption at the wireless device. The wireless device may transmit a new HARQ-ACK codebook for the retransmission, resulting in increased uplink interference to other cells/users. In an example, retransmissions may increase the delay/latency of a successful communication. There is a need for an enhanced HARQ-ACK codebook determination when the wireless device receives the plurality of DCIs in the same PDCCH monitoring occasion of the same cell.

Example embodiments implements an enhanced HARQ-ACK codebook determination, for example, when a plurality of DCIs is received in a same PDCCH monitoring occasion of a same cell. A wireless device may determine, in a HARQ-ACK codebook, a (respective) location/position of a HARQ-ACK information/feedback corresponding to each TB of the plurality of TBs based on search space sets that the plurality of DCIs is received. A wireless device may determine, in a HARQ-ACK codebook, a (respective) location/position of a HARQ-ACK information/feedback corresponding to each TB of the plurality of TBs based on control resource sets (coresets) that the plurality of DCIs is received. A wireless device may determine, in a HARQ-ACK codebook, a (respective) location/position of a HARQ-ACK information/feedback corresponding to each TB of the plurality of TBs based on time slots that the plurality of TBs are received/transmitted. A wireless device may determine, in a HARQ-ACK codebook, a (respective) location/position of a HARQ-ACK information/feedback corresponding to each TB of the plurality of TBs based on priority parameters that the plurality of DCIs indicates. This enhanced process may improve uplink control signaling, reduce uplink overhead and interference, reduce wireless device and base station battery power consumption, and reduce delay/latency of communication.

FIG. 21 and FIG. 22 are examples of a HARQ-ACK codebook determination as per an aspect of an embodiment of the present disclosure.

In an example, in FIG. 21 and FIG. 22, a respective PDCCH monitoring occasion index of the respective PDCCH monitoring occasion that each DCI of the plurality of DCIs is received may be the same/equal. In an example, the respective PDCCH monitoring occasion index of the respective PDCCH monitoring occasion being the same/equal may comprise that the respective search space set associated with the respective PDCCH monitoring occasion may start at the same time for each DCI of the plurality of DCIs.

In an example, the respective PDCCH monitoring occasion that the wireless device receives/detects each DCI of the plurality of DCIs may be the same. The respective PDCCH monitoring occasion that the wireless device receives/detects each DCI of the plurality of DCIs being the same may comprise that the respective search space set associated with the respective PDCCH monitoring occasion that each DCI of the plurality of DCIs is received is the same. In an example, in FIG. 21 and FIG. 22, the wireless device may determine that the first PDCCH monitoring occasion, the second PDCCH monitoring occasion, the third PDCCH monitoring occasion; and the fourth PDCCH monitoring occasion may be the same. In an example, the wireless device may detect/receive the first DCI, the second DCI, the third DCI and the fourth DCI via/in a same PDCCH monitoring occasion (e.g., PDCCH monitoring occasion in FIG. 21 and FIG. 22).

In an example, in FIG. 21 and FIG. 22, the respective cells that the plurality of DCIs is received may be the same (e.g., cell in FIG. 21 and FIG. 22, the first cell discussed for FIG. 16-FIG. 18). In an example, the wireless device may receive the plurality of DCIs via a cell. In an example, the respective cell that the wireless device receives/detects each DCI of the plurality of DCIs may be the same. In an example, the first cell, the second cell, the third cell and the fourth cell may be the same. In an example, the first cell, the second cell, the third cell and the fourth cell being the same may comprise that the first cell-specific index, the second cell-specific index, the third cell-specific index, and the fourth cell-specific index are the same/equal.

In an example, the wireless device may detect/receive the first DCI, the second DCI, the third DCI and the fourth DCI via/in a same PDCCH monitoring occasion (e.g., PDCCH monitoring occasion in FIG. 21 and FIG. 22) of a same cell (e.g., the cell in FIG. 21 and FIG. 22).

In an example, the wireless device may receive/detect the plurality of DCIs in a same PDCCH monitoring occasion (e.g., PDCCH monitoring occasion in FIG. 21 and FIG. 22) of a same cell (e.g., cell in FIG. 21 and FIG. 22). In an example, the first PDCCH monitoring occasion of the first DCI, the second monitoring occasion of the second DCI, the third PDCCH monitoring occasion of the third DCI and the fourth monitoring occasion of the fourth DCI may be the same. In an example, the first cell, the second cell, the third cell and the fourth cell may be the same.

In an example, the determining, in the HARQ-ACK codebook, the respective location/position of the respective HARQ-ACK information/feedback associated with the respective TB may be based on the respective time slot (of the respective TB) that each DCI of the plurality of DCIs schedules. In an example, the determining, in the HARQ-ACK codebook, the respective location/position of the respective HARQ-ACK information/feedback associated with the respective TB may be based on an ascending/descending order of the respective time slots (of the respective TBs) that the plurality of DCIs schedule.

In an example, the wireless device may determine that the first time slot of the first TB (e.g., First PDSCH in FIG. 21) is earlier (or lower) in time than the second time slot of the second TB (e.g., Second PDSCH in FIG. 21). In an example, the determining, in the HARQ-ACK codebook, the first location/position of the first HARQ-ACK information/feedback and the second location/position of the second HARQ-ACK information/feedback may be based on the first time slot and the second time slot. Based on the determining that the first time slot is earlier (or lower) in time than the second time slot, the wireless device may include/record, in the HARQ-ACK codebook, the first location/position of the first HARQ-ACK information/feedback before (or prior to, or earlier than) the second location/position of the second HARQ-ACK information/feedback. In an example, the wireless device may determine that the first time slot of the first TB is later (or higher) in time than the second time slot of the second TB. Based on the determining that the first time slot is later (or higher) in time than the second time slot, the wireless device may include/record, in the HARQ-ACK codebook, the first location/position of the first HARQ-ACK information/feedback before (or prior to, or earlier than) the second location/position of the second HARQ-ACK information/feedback.

In an example, the determining, in the HARQ-ACK codebook, the first location/position of the first HARQ-ACK information/feedback, the second location/position of the second HARQ-ACK information/feedback, the third location/position of the third HARQ-ACK information/feedback and the fourth location/position of the fourth HARQ-ACK information/feedback may be based on the first time slot, the second time slot, the third time slot, and the fourth time slot. In an example, the wireless device may determine that the first time slot of the first TB (e.g., First PDSCH in FIG. 21) is earlier (or later) in time than the second time slot of the second TB (e.g., Second PDSCH in FIG. 21), the third time slot of the third TB (e.g., Third PDSCH in FIG. 21) and the fourth time slot of the fourth TB (e.g., Fourth PDSCH in FIG. 21). Based on the determining that the first time slot is earlier (or later) in time than the second time slot, the third time slot and the fourth time slot, the wireless device may include/record, in the HARQ-ACK codebook, the first location/position of the first HARQ-ACK information/feedback (for the first TB) before (or prior to, or earlier than) the second location/position of the second HARQ-ACK information/feedback (for the second TB), the third location/position of the third HARQ-ACK information/feedback (for the third TB), and the fourth location/position of the fourth HARQ-ACK information/feedback (for the fourth TB). In an example, the wireless device may determine that the second time slot is earlier (or later) in time than the third time slot and the fourth time slot. Based on the determining that the second time slot is earlier (or later) in time than the third time slot and the fourth time slot, the wireless device may include/record, in the HARQ-ACK codebook, the second location/position of the second HARQ-ACK information/feedback before (or prior to, or earlier than) the third location/position of the third HARQ-ACK information/feedback and the fourth location/position of the fourth HARQ-ACK information/feedback. In an example, the wireless device may determine that the third time slot is earlier (or later) in time than the fourth time slot. In an example, based on the determining that the third time slot is earlier (or later) in time than the fourth time slot, the wireless device may include/record, in the HARQ-ACK codebook, the third location/position of the third HARQ-ACK information/feedback before (or prior to, or earlier than) and the fourth location/position of the fourth HARQ-ACK information/feedback.

In an example, based on an ascending (or descending) order of the respective time slots (of the respective TBs) scheduled by the plurality of DCIs, the wireless device may determine, in the HARQ-ACK codebook, the respective location/position of the respective HARQ-ACK information/feedback in an order of the first location/position of the first HARQ-ACK information/feedback, the second location/position of the second HARQ-ACK information/feedback, the third location/position of the third HARQ-ACK information/feedback and the fourth location/position of the fourth HARQ-ACK information/feedback (e.g., HARQ-ACK order={HARQ-ACK 1, HARQ-ACK 2, HARQ-ACK 3, HARQ-ACK 4} in FIG. 21).

In an example, the plurality of DCIs may comprise (or have) a field with respective values indicating respective priority parameters. In an example, each DCI of the plurality of DCIs may comprise (or have) a field with a respective value indicating a respective priority parameter. In an example, the first DCI may comprise (or have) the field with a first value indicating a first priority parameter (e.g., First priority in FIG. 22). In an example, the second DCI may comprise (or have) the field with a second value indicating a second priority parameter (e.g., Second priority in FIG. 22). In an example, the third DCI may comprise (or have) the field with a third value indicating a third priority parameter (e.g., Third priority in FIG. 22). In an example, the fourth DCI may comprise (or have) the field with a fourth value indicating a fourth priority parameter (e.g., Fourth priority in FIG. 22).

In an example, a respective PDCCH monitoring occasion index of the respective PDCCH monitoring occasion that each DCI of the plurality of DCIs is received may be the same/equal.

In an example, a respective PDCCH monitoring occasion index of the respective PDCCH monitoring occasion that each DCI of the plurality of DCIs is received may be different.

In an example, the respective PDCCH monitoring occasion that the wireless device receives/detects each DCI of the plurality of DCIs may be the same (e.g., FIG. 21 and FIG. 22).

In an example, the respective PDCCH monitoring occasion that the wireless device receives/detects each DCI of the plurality of DCIs may be different (e.g., FIG. 23).

In an example, in FIG. 21-FIG. 23, the respective cells that the plurality of DCIs is received may be the same (e.g., cell in FIG. 21, FIG. 22 and FIG. 23). In an example, the respective cell that the wireless device receives/detects each DCI of the plurality of DCIs may be the same.

In an example, in FIG. 19, the respective cells that the plurality of DCIs is received may be different (e.g., first cell, second cell, third cell, fourth cell). In an example, the respective cell that the wireless device receives/detects each DCI of the plurality of DCIs may be different.

In an example, the determining, in the HARQ-ACK codebook, the respective location/position of the respective HARQ-ACK information/feedback associated with the respective TB may be based on a respective priority parameter that each DCI of the plurality of DCIs indicates. In an example, the determining, in the HARQ-ACK codebook, the respective location/position of the respective HARQ-ACK information/feedback associated with the respective TB may be based on an ascending (or descending) order of respective priority parameters that the plurality of DCIs indicates.

In an example, the wireless device may determine that the first priority parameter indicated by the first DCI is higher (or lower) than the second priority parameter indicated by the second DCI, the third priority parameter indicated by the third DCI and the fourth priority parameter indicated by the fourth DCI. In an example, the determining, in the HARQ-ACK codebook, the first location/position of the first HARQ-ACK information/feedback, the second location/position of the second HARQ-ACK information/feedback, the third location/position of the third HARQ-ACK information/feedback and the fourth location/position of the fourth HARQ-ACK information/feedback may be based on the first priority parameter, the second priority parameter, the third priority parameter, and the fourth priority parameter. Based on the determining that the first priority parameter is higher (or lower) than the second priority parameter, the third priority parameter and the fourth priority parameter, the wireless device may include/record, in the HARQ-ACK codebook, the first location/position of the first HARQ-ACK information/feedback (for the first TB) before (or prior to, or earlier than) the second location/position of the second HARQ-ACK information/feedback (for the second TB), the third location/position of the third HARQ-ACK information/feedback (for the third TB), and the fourth location/position of the fourth HARQ-ACK information/feedback (for the fourth TB). In an example, the wireless device may determine that the second priority parameter indicated by the second DCI is higher (or lower) than the third priority parameter indicated by the third DCI and the fourth priority parameter indicated by the fourth DCI. Based on the determining that the second priority parameter is higher (or lower) than the third priority parameter and the fourth priority parameter, the wireless device may include/record, in the HARQ-ACK codebook, the second location/position of the second HARQ-ACK information/feedback before (or prior to, or earlier than) the third location/position of the third HARQ-ACK information/feedback and the fourth location/position of the fourth HARQ-ACK information/feedback. In an example, the wireless device may determine that the third priority parameter indicated by the third DCI is higher (or lower) than the fourth priority parameter indicated by the fourth DCI. Based on the determining that the third priority parameter is higher (or lower) than the fourth priority parameter, the wireless device may include/record, in the HARQ-ACK codebook, the third location/position of the third HARQ-ACK information/feedback before (or prior to, or earlier than) and the fourth location/position of the fourth HARQ-ACK information/feedback.

In an example, based on an ascending (or descending) order of the respective priority parameters indicated by the plurality of DCIs, the wireless device may determine, in the HARQ-ACK codebook, the respective location/position of the respective HARQ-ACK information/feedback in an order of the first location/position of the first HARQ-ACK information/feedback, the second location/position of the second HARQ-ACK information/feedback, the third location/position of the third HARQ-ACK information/feedback and the fourth location/position of the fourth HARQ-ACK information/feedback (e.g., HARQ-ACK order={HARQ-ACK 1, HARQ-ACK 2, HARQ-ACK 3, HARQ-ACK 4} in FIG. 22).

In an example, the plurality of DCIs may indicate respective service types. In an example, each DCI of the plurality of DCIs may indicate a respective service type.

In an example, the plurality of DCIs indicating the respective service types may comprise that the plurality of DCIs comprises (or has) a field with respective values indicating the respective service types. In an example, each DCI of the plurality of DCIs indicating the respective service type may comprise that each DCI of the plurality of DCIs comprises (or has) a field with a respective value indicating the respective service type. In an example, the first DCI may comprise (or have) the field with a first value indicating a first service type. In an example, the second DCI may comprise (or have) the field with a second value indicating a second service type. In an example, the third DCI may comprise (or have) the field with a third value indicating a third service type. In an example, the fourth DCI may comprise (or have) the field with a fourth value indicating a fourth service type.

In an example, the plurality of DCIs indicating the respective service types may comprise that the plurality of DCIs are scrambled with respective RNTIs associated with the respective service types. In an example, each DCI of the plurality of DCIs indicating the respective service type may comprise that each DCI of the plurality of DCIs is scrambled with a respective RNTI (e.g., CS-RNTI, C-RNTI, RA-RNTI, MCS-C-RNTI, etc.) associated with the respective service type. In an example, the first DCI may be scrambled with a first RNTI indicating a first service type. In an example, the second DCI may be scrambled with a second RNTI indicating a second service type. In an example, the third DCI may be scrambled with a third RNTI indicating a third service type. In an example, the fourth DCI may be scrambled with a fourth RNTI indicating a fourth service type.

In an example, the respective service type may be one of a plurality of service types. In an example, the plurality of service types may comprise uRLLC, eMBB, and mMTC.

In an example, the determining, in the HARQ-ACK codebook, the respective location/position of the respective HARQ-ACK information/feedback associated with the respective TB may be based on a respective priority of a respective service type that each DCI of the plurality of DCIs indicates. In an example, the determining, in the HARQ-ACK codebook, the respective location/position of the respective HARQ-ACK information/feedback associated with the respective TB may be based on an ascending (or descending) order of respective priorities of the respective service types that the plurality of DCIs indicate.

In an example, the first RNTI (e.g., CS-RNTI, MCS-C-RNTI, RA-RNTI) may have a higher priority than the second RNTI. In an example, the first RNTI may be used for an uRLLC service. In an example, the first RNTI (e.g., RA-RNTI, TC-RNTI, etc.) may be used for a random-access procedure.

In an example, the first service type (e.g., uRLLC) may have a higher priority than the second service type (e.g., eMBB, mMTC).

In an example, the wireless device may determine that a first priority of the first service type indicated by the first DCI is higher (or lower) than a second priority of the second service type indicated by the second DCI, a third priority of the third service type indicated by the third DCI and a fourth priority of the fourth service type indicated by the fourth DCI. In an example, the determining, in the HARQ-ACK codebook, the first location/position of the first HARQ-ACK information/feedback, the second location/position of the second HARQ-ACK information/feedback, the third location/position of the third HARQ-ACK information/feedback and the fourth location/position of the fourth HARQ-ACK information/feedback may be based on the first priority of the first service type, the second priority of the second service type, the third priority of the third service type, and the fourth priority of the fourth service type. Based on the determining that the first priority of the first service type is higher (or lower) than the second priority of the second service type, the third priority of the third service type and the fourth priority of the fourth service type, the wireless device may include/record, in the HARQ-ACK codebook, the first location/position of the first HARQ-ACK information/feedback (for the first TB) before (or prior to, or earlier than) the second location/position of the second HARQ-ACK information/feedback (for the second TB), the third location/position of the third HARQ-ACK information/feedback (for the third TB), and the fourth location/position of the fourth HARQ-ACK information/feedback (for the fourth TB). In an example, the wireless device may determine that the second priority of the second service type indicated by the second DCI is higher (or lower) than the third priority of the third service type indicated by the third DCI and the fourth priority of the fourth service type indicated by the fourth DCI. Based on the determining that the second priority of the second service type is higher (or lower) than the third priority of the third service type and the fourth priority of the fourth service type, the wireless device may include/record, in the HARQ-ACK codebook, the second location/position of the second HARQ-ACK information/feedback before (or prior to, or earlier than) the third location/position of the third HARQ-ACK information/feedback and the fourth location/position of the fourth HARQ-ACK information/feedback. In an example, the wireless device may determine that the third priority of the third service type indicated by the third DCI is higher (or lower) than the fourth priority of the fourth service type indicated by the fourth DCI. Based on the determining that the third priority of the third service type is higher (or lower) than the fourth priority of the fourth service type, the wireless device may include/record, in the HARQ-ACK codebook, the third location/position of the third HARQ-ACK information/feedback before (or prior to, or earlier than) and the fourth location/position of the fourth HARQ-ACK information/feedback.

In an example, based on an ascending (or descending) order of the respective priorities of the respective service types indicated by the plurality of DCIs, the wireless device may determine, in the HARQ-ACK codebook, the respective location/position of the respective HARQ-ACK information/feedback in an order of the first location/position of the first HARQ-ACK information/feedback, the second location/position of the second HARQ-ACK information/feedback, the third location/position of the third HARQ-ACK information/feedback and the fourth location/position of the fourth HARQ-ACK information/feedback (e.g., HARQ-ACK order={HARQ-ACK 1, HARQ-ACK 2, HARQ-ACK 3, HARQ-ACK 4} in FIG. 22).

FIG. 23 is an example of a HARQ-ACK codebook determination as per an aspect of an embodiment of the present disclosure.

In an example, the determining, in the HARQ-ACK codebook, the respective location/position of the respective HARQ-ACK information/feedback associated with the respective TB may be based on the respective search space set (associated with the respective PDCCH monitoring occasion) that each DCI of the plurality of DCIs is received. In an example, the determining, in the HARQ-ACK codebook, the respective location/position of the respective HARQ-ACK information/feedback associated with the respective TB may be based on a respective search space set index of the respective search space set (associated with the respective PDCCH monitoring occasion) that each DCI of the plurality of DCIs is received. In an example, the determining, in the HARQ-ACK codebook, the respective location/position of the respective HARQ-ACK information/feedback associated with the respective TB may be based on an ascending (or descending) order of respective search space set indices of the respective search space sets that the plurality of DCIs is received.

In an example, in FIG. 23, the wireless device may determine that the first search space set index of the first search space set associated with the first PDCCH monitoring occasion that the first DCI is received is lower (or higher) than the second search space set index of the second search space set associated with the second PDCCH monitoring occasion that the second DCI is received, the third search space set index of the third search space set associated with the third PDCCH monitoring occasion that the third DCI is received and the fourth search space set index of the fourth search space set associated with the fourth PDCCH monitoring occasion that the fourth DCI is received. In an example, the determining, in the HARQ-ACK codebook, the first location/position of the first HARQ-ACK information/feedback, the second location/position of the second HARQ-ACK information/feedback, the third location/position of the third HARQ-ACK information/feedback and the fourth location/position of the fourth HARQ-ACK information/feedback may be based on the first search space set index, the second search space set index, the third search space set index, and the fourth search space set index. Based on the determining that the first search space set index is lower (or higher) than the second search space set index, the third search space set index and the fourth search space set index, the wireless device may include/record, in the HARQ-ACK codebook, the first location/position of the first HARQ-ACK information/feedback (for the first TB) before (or prior to, or earlier than) the second location/position of the second HARQ-ACK information/feedback (for the second TB), the third location/position of the third HARQ-ACK information/feedback (for the third TB), and the fourth location/position of the fourth HARQ-ACK information/feedback (for the fourth TB). In an example, in FIG. 23, the wireless device may determine that the second search space set index of the second search space set associated with the second PDCCH monitoring occasion is lower (or higher) than the third search space set index of the third search space set associated with the third PDCCH monitoring occasion and the fourth search space set index of the fourth search space set associated with the fourth PDCCH monitoring occasion. Based on the determining that the second search space set index is lower (or higher) than the third search space set index and the fourth search space set index, the wireless device may include/record, in the HARQ-ACK codebook, the second location/position of the second HARQ-ACK information/feedback before (or prior to, or earlier than) the third location/position of the third HARQ-ACK information/feedback and the fourth location/position of the fourth HARQ-ACK information/feedback. In an example, in FIG. 23, the wireless device may determine that the third search space set index of the third search space set associated with the third PDCCH monitoring occasion is lower (or higher) than the fourth search space set index of the fourth search space set associated with the fourth PDCCH monitoring occasion. Based on the determining that the third search space set index is lower (or higher) than the fourth search space set index, the wireless device may include/record, in the HARQ-ACK codebook, the third location/position of the third HARQ-ACK information/feedback before (or prior to, or earlier than) and the fourth location/position of the fourth HARQ-ACK information/feedback.

In an example, based on an ascending (or descending) order of respective search space set indices of the respective search space sets that the plurality of DCIs is received, the wireless device may determine, in the HARQ-ACK codebook, the respective location/position of the respective HARQ-ACK information/feedback in an order of the first location/position of the first HARQ-ACK information/feedback, the second location/position of the second HARQ-ACK information/feedback, the third location/position of the third HARQ-ACK information/feedback and the fourth location/position of the fourth HARQ-ACK information/feedback (e.g., HARQ-ACK order={HARQ-ACK 1, HARQ-ACK 2, HARQ-ACK 3, HARQ-ACK 4} in FIG. 23).

In an example, the determining, in the HARQ-ACK codebook, the respective location/position of the respective HARQ-ACK information/feedback associated with the respective TB may be based on the respective coreset (associated with the respective PDCCH monitoring occasion) that each DCI of the plurality of DCIs is received. In an example, the determining, in the HARQ-ACK codebook, the respective location/position of the respective HARQ-ACK information/feedback associated with the respective TB may be based on the respective coreset index of the respective coreset (associated with the respective PDCCH monitoring occasion) that each DCI of the plurality of DCIs is received. In an example, the determining, in the HARQ-ACK codebook, the respective location/position of the respective HARQ-ACK information/feedback associated with the respective TB may be based on an ascending (or descending) order of respective coreset indices of the respective coresets that the plurality of DCIs is received.

In an example, in FIG. 23, the wireless device may determine that the first coreset index of the first coreset associated with the first PDCCH monitoring occasion that the first DCI is received is lower (or higher) than the second coreset index of the second coreset associated with the second PDCCH monitoring occasion that the second DCI is received, the third coreset index of the third coreset associated with the third PDCCH monitoring occasion that the third DCI is received, and the fourth coreset index of the fourth coreset associated with the fourth PDCCH monitoring occasion that the fourth DCI is received. In an example, the determining, in the HARQ-ACK codebook, the first location/position of the first HARQ-ACK information/feedback, the second location/position of the second HARQ-ACK information/feedback, the third location/position of the third HARQ-ACK information/feedback and the fourth location/position of the fourth HARQ-ACK information/feedback may be based on the first coreset index, the second coreset index, the third coreset index, and the fourth coreset index. Based on the determining that the first coreset index is lower (or higher) than the second coreset index, the third coreset index, and the fourth coreset index, the wireless device may include/record, in the HARQ-ACK codebook, the first location/position of the first HARQ-ACK information/feedback (for the first TB) before (or prior to, or earlier than) the second location/position of the second HARQ-ACK information/feedback (for the second TB), the third location/position of the third HARQ-ACK information/feedback (for the third TB), and the fourth location/position of the fourth HARQ-ACK information/feedback (for the fourth TB). In an example, in FIG. 23, the wireless device may determine that the second coreset index of the second coreset associated with the second PDCCH monitoring occasion is lower (or higher) than the third coreset index of the third coreset associated with the third PDCCH monitoring occasion and the fourth coreset index of the fourth coreset associated with the fourth PDCCH monitoring occasion. Based on the determining that the second coreset index is lower (or higher) than the third coreset index and the fourth coreset index, the wireless device may include/record, in the HARQ-ACK codebook, the second location/position of the second HARQ-ACK information/feedback before (or prior to, or earlier than) the third location/position of the third HARQ-ACK information/feedback and the fourth location/position of the fourth HARQ-ACK information/feedback. In an example, in FIG. 23, the wireless device may determine that the third coreset index of the third coreset associated with the third PDCCH monitoring occasion is lower (or higher) than the fourth coreset index of the fourth coreset associated with the fourth PDCCH monitoring occasion. Based on the determining that the third coreset index is lower (or higher) than the fourth coreset index, the wireless device may include/record, in the HARQ-ACK codebook, the third location/position of the third HARQ-ACK information/feedback before (or prior to, or earlier than) and the fourth location/position of the fourth HARQ-ACK information/feedback.

In an example, based on an ascending (or descending) order of respective coreset indices of the respective coresets that the plurality of DCIs is received, the wireless device may determine, in the HARQ-ACK codebook, the respective location/position of the respective HARQ-ACK information/feedback in an order of the first location/position of the first HARQ-ACK information/feedback, the second location/position of the second HARQ-ACK information/feedback, the third location/position of the third HARQ-ACK information/feedback and the fourth location/position of the fourth HARQ-ACK information/feedback (e.g., HARQ-ACK order={HARQ-ACK 1, HARQ-ACK 2, HARQ-ACK 3, HARQ-ACK 4} in FIG. 23).

Figure 24:
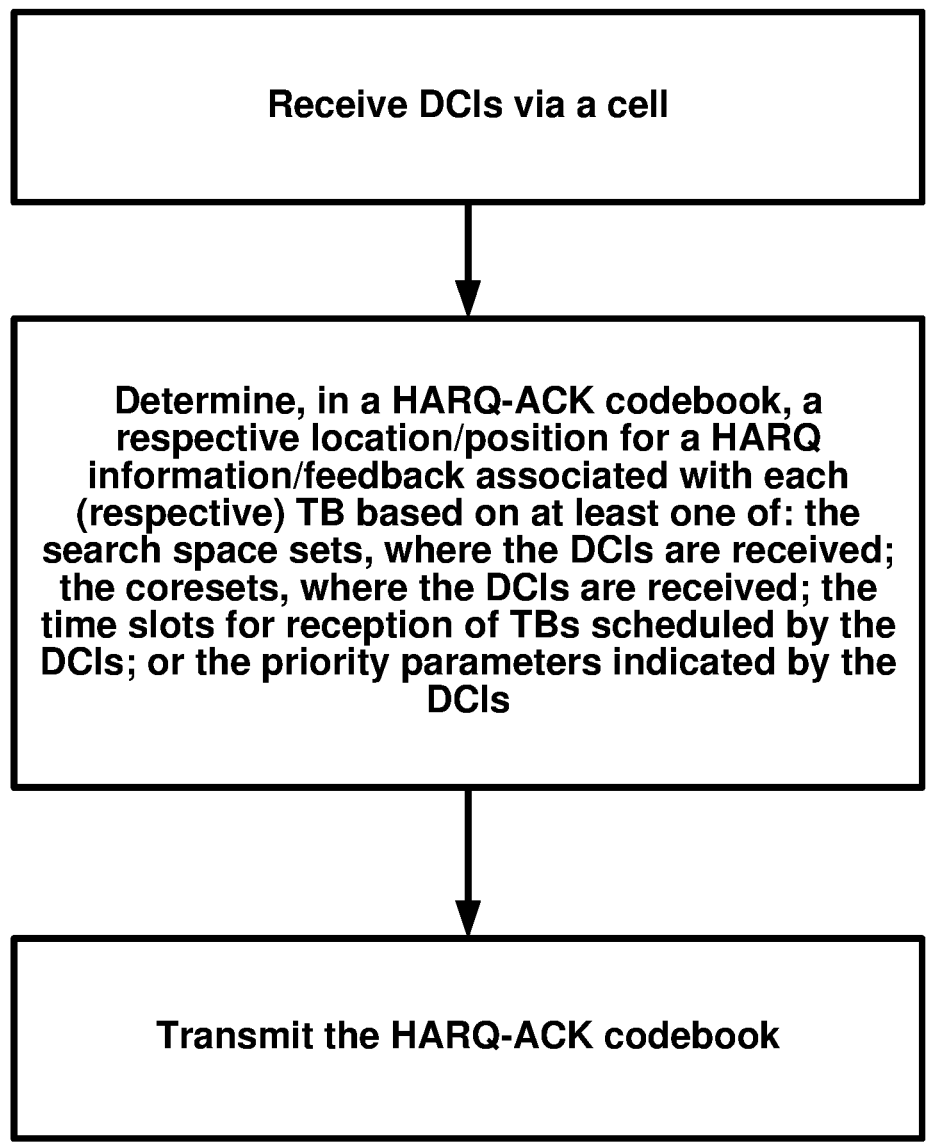
FIG. 24 is an example flow diagram of a HARQ-ACK codebook determination as per an aspect of an embodiment of the present disclosure.

FIG. 24 is an example flow diagram of a HARQ-ACK codebook determination as per an aspect of an embodiment of the present disclosure.

In an example, a wireless device may receive/detect a plurality of downlink control information (DCIs). The wireless device may receive/detect the plurality of DCIs via a cell.

In an example, the wireless device may receive/detect the plurality of DCIs in a physical downlink control channel (PDCCH) monitoring occasion of the cell. In an example, the wireless device may receive/detect the plurality of DCIs in a same physical downlink control channel (PDCCH) monitoring occasion of a same cell.

In an example, the wireless device may receive/detect the plurality of DCIs in PDCCH monitoring occasions, of the cell, with a same PDCCH monitoring occasion index (as discussed in FIG. 23). In an example, each PDCCH monitoring occasion of the PDCCH monitoring occasions may have the same PDCCH monitoring occasion index.

In an example, the plurality of DCIs may schedule transport blocks (TBs) in time slots. In an example, each DCI of the plurality of DCIs may schedule a respective TB of the TBs in a respective time slot of the time slots. In an example, the respective TB may be a respective PDSCH. In an example, the respective TB may be a respective PUSCH. The wireless device may receive (or transmit) the respective TB in the respective time slot.

In an example, each DCI of the plurality of DCIs may schedule a transport block (TB).

In an example, the wireless device may determine that each DCI of the plurality of DCIs may have a respective value of a field (e.g., PDSCH-to-HARQ feedback timing indicator field) indicating a same slot for a physical uplink control channel (PUCCH) transmission (e.g., of an HARQ-ACK information/feedback of a respective TB).

In an example, the wireless device may determine, in a HARQ-ACK codebook, a respective location/position of a respective hybrid automatic repeat request (HARQ) information/feedback associated with the respective TB. In an example, based on the respective value of the field of each DCI of the plurality of DCIs indicating the same slot, the wireless device may determine, in a HARQ-ACK codebook, a respective location/position of a respective hybrid automatic repeat request (HARQ) information/feedback associated with the respective TB. Based on the determining, the wireless device may transmit the HARQ-ACK codebook via an uplink channel (e.g., PUCCH, PUSCH).

In an example, the wireless device may determine, in a HARQ-ACK codebook, a respective location/position of a hybrid automatic repeat request (HARQ) information/feedback associated with each TB of the TBs. In an example, based on the respective value of the field of each DCI of the plurality of DCIs indicating the same slot, the wireless device may determine, in a HARQ-ACK codebook, a respective location/position of a hybrid automatic repeat request (HARQ) information/feedback associated with each TB of the TBs. Based on the determining, the wireless device may transmit the HARQ-ACK codebook via an uplink channel (e.g., PUCCH, PUSCH).

In an example, the HARQ-ACK codebook may comprise a HARQ-ACK information/feedback of each TB of the TBs. In an example, the HARQ-ACK codebook may comprise a respective HARQ-ACK information/feedback of the respective TB (of the respective TBs scheduled by the plurality of DCIs). In an example, the HARQ-ACK codebook may comprise HARQ-ACK information/feedback of the respective TBs.

In an example, determining, in the HARQ-ACK codebook, the respective location/position of the respective HARQ-ACK information/feedback associated with the respective TB may be based on an ascending (or descending) order of search space set indices of search space sets that the wireless device receives/detects the plurality of DCIs (discussed for FIG. 23).

In an example, determining, in the HARQ-ACK codebook, the respective location/position of the respective HARQ-ACK information/feedback associated with the respective TB may be based on an ascending (or descending) order of coreset indices of coresets that the wireless device receives/detects the plurality of DCIs (discussed for FIG. 23).

In an example, determining, in the HARQ-ACK codebook, the respective location/position of the respective HARQ-ACK information/feedback associated with the respective TB may be based on an ascending (or descending)

order of the time slots (for reception) of the TBs (e.g., PDSCHs) that the plurality of DCIs schedule (discussed for FIG. 21).

In an example, determining, in the HARQ-ACK codebook, the respective location/position of the respective HARQ-ACK information/feedback associated with the respective TB may be based on an ascending (or descending) order of respective priority parameters that the plurality of DCIs indicates schedule (discussed for FIG. 22).

In an example, the wireless device may transmit the HARQ-ACK codebook. In an example, the wireless device may transmit the HARQ-ACK codebook in the same slot (indicated by the field of each DCI of the plurality of DCIs) for the PUCCH transmission. In an example, based on the determining, in the HARQ-ACK codebook, the respective location/position of the respective HARQ-ACK information/feedback associated with the respective TB, the wireless device may transmit the HARQ-ACK codebook.

In an example, the wireless device may determine, for each TB, a respective location/position in a HARQ-ACK codebook for a hybrid automatic repeat request (HARQ) information/feedback associated with the TB. Based on the determining, the wireless device may transmit the HARQ-ACK codebook comprising the HARQ-ACK information/feedback associated with each TB at the respective location/position for the HARQ-ACK information/feedback.

FIG. 25, FIG. 26, FIG. 27 and FIG. 28 are example flow diagrams of a HARQ-ACK codebook determination as per an aspect of an embodiment of the present disclosure.

In an example, a wireless device may receive a first DCI scheduling a first transport block (TB) and a second DCI scheduling a second TB.

In an example, the wireless device may receive the first DCI and the second DCI in a PDCCH monitoring occasion of a cell. In an example, the wireless device may receive the first DCI and the second DCI in a same PDCCH monitoring occasion of a same cell (e.g., FIG. 25 and FIG. 26).

In an example, the wireless device may receive the first DCI in a first PDCCH monitoring occasion of a cell and the second DCI in a second PDCCH monitoring occasion of the cell. In an example, a first PDCCH monitoring occasion index of the first PDCCH monitoring occasion and a second PDCCH monitoring occasion index of the second PDCCH monitoring occasion may be the same (e.g., FIG. 27 and FIG. 28).

In an example, the first PDCCH monitoring occasion may be associated with a first search space set identified by a first search space set index (as discussed in FIG. 23). In an example, the second PDCCH monitoring occasion may be associated with a second search space set identified by a second search space set index (as discussed in FIG. 23).

In an example, the first PDCCH monitoring occasion may be associated with a first coreset identified by a first coreset index (as discussed in FIG. 23). In an example, the second PDCCH monitoring occasion may be associated with a second coreset identified by a second coreset index (as discussed in FIG. 23).

In an example, a PDSCH-to-HARQ feedback timing indicator field of the first DCI may indicate a first slot for a first PUCCH transmission of a first hybrid automatic repeat request (HARQ) information/feedback associated with the first TB. The PDSCH-to-HARQ feedback timing indicator field of the second DCI may indicate a second slot for a second PUCCH transmission of a second HARQ-ACK information/feedback associated with the second TB. In an example, the first slot for the first PUCCH transmission and the second slot for the second PUCCH transmission may be the same.

In an example, the wireless device may determine, in a HARQ-ACK codebook, a first location/position of the first HARQ-ACK information/feedback associated with the first TB and a second location/position of the second HARQ-ACK information/feedback associated with the second TB. In an example, the wireless device may determine, in the HARQ-ACK codebook, the first location/position of the first HARQ-ACK information/feedback associated with the first TB and the second location/position of the second HARQ-ACK information/feedback associated with the second TB based on the first slot for the first PUCCH transmission and the second slot for the second PUCCH transmission being the same.

In an example, based on the determining, in the HARQ-ACK codebook, the first location/position and the second location/position, the wireless device may transmit the HARQ-ACK codebook via an uplink channel (e.g., PUCCH, PUSCH) in FIG. 25-FIG. 28. In an example, the HARQ-ACK codebook may comprise the first HARQ-ACK information/feedback and the second HARQ-ACK information/feedback. In an example, the HARQ-ACK codebook may comprise the first HARQ-ACK information/feedback in the first location/position of the HARQ-ACK codebook. In an example, the HARQ-ACK codebook may comprise the second HARQ-ACK information/feedback in the second location/position of the HARQ-ACK codebook.

In an example, the first DCI may schedule the first TB for reception (or for transmission) in a first time slot. In an example, the first DCI scheduling the first TB for reception (or transmission) in the first time slot may comprise that the wireless device receives (or transmits) the first TB (e.g., PDSCH, or PUSCH) in the first time slot. In an example, the wireless device may receive/detect the first DCI in another slot different from the first time slot.

In an example, the second DCI may schedule the second TB for reception (or transmission) in a second time slot. In an example, the second DCI scheduling the second TB for reception (or for transmission) in the second time slot may comprise that the wireless device receives (or transmits) the second TB (e.g., PDSCH or PUSCH) in the second time slot. In an example, the wireless device may receive/detect the second DCI in another slot different from the second time slot.

Figure 25:
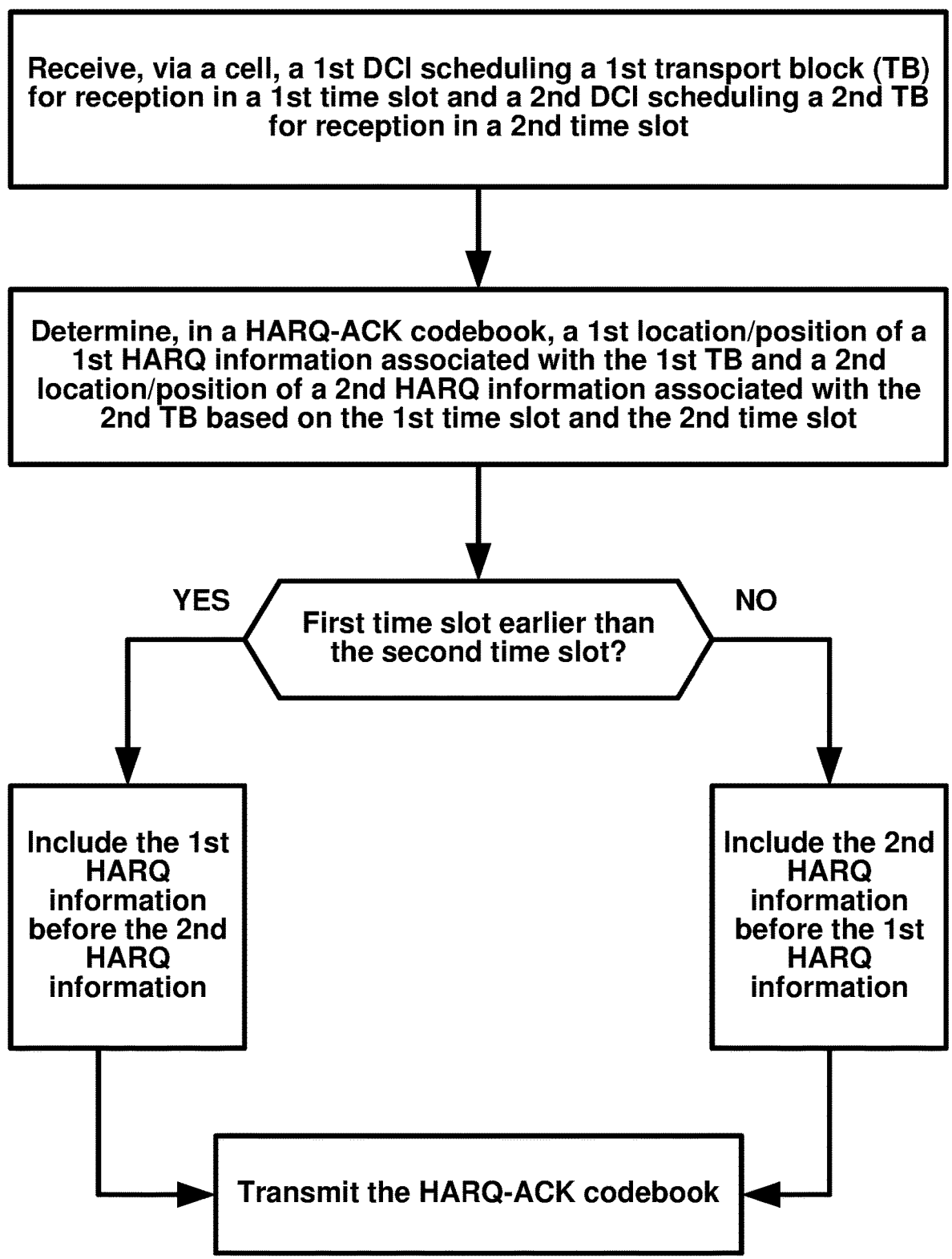
FIG. 25 is an example flow diagram of a HARQ-ACK codebook determination as per an aspect of an embodiment of the present disclosure.

In an example, in FIG. 25, the determining, in the HARQ-ACK codebook, the first location/position of the first HARQ-ACK information/feedback associated with the first TB and the second location/position of the second HARQ-ACK information/feedback associated with the second TB may be based on the first time slot and the second time slot. In an example, the first HARQ-ACK information/feedback may be recorded/included, by the wireless device, before (or prior, or earlier to) the second HARQ-ACK information/feedback in the HARQ-ACK codebook based on the first time slot being before/earlier/lower than the second time slot. In an example, the first HARQ-ACK information/feedback may be recorded/included, by the wireless device, before (or prior, or earlier to) the second HARQ-ACK information/feedback in the HARQ-ACK codebook based on the second time slot being before/earlier/lower than the first time slot. In an example, the second HARQ-ACK information/feedback may be recorded/included, by the wireless device, before (or prior, or earlier to) the first HARQ-ACK information/feedback in the HARQ-ACK codebook based on the second time slot being before/earlier/lower than the first time slot.

In an example, the determining, in the HARQ-ACK codebook, the first location/position of the first HARQ-ACK information/feedback associated with the first TB and the second location/position of the second HARQ-ACK information/feedback associated with the second TB may be based on the first time slot and the second time slot. In an example, the first location/position may have a lower bit position in the HARQ-ACK codebook than the second location/position based on the first time slot being before/earlier/lower than the second time slot. In an example, the first location/position may have a lower bit position in the HARQ-ACK codebook than the second location/position based on the second time slot being before/earlier/lower than the first time slot.

In an example, the first DCI may indicate a first priority parameter (e.g., as discussed for FIG. 22). In an example, the second DCI may indicate a second priority parameter (e.g., as discussed for FIG. 22).

Figure 26:
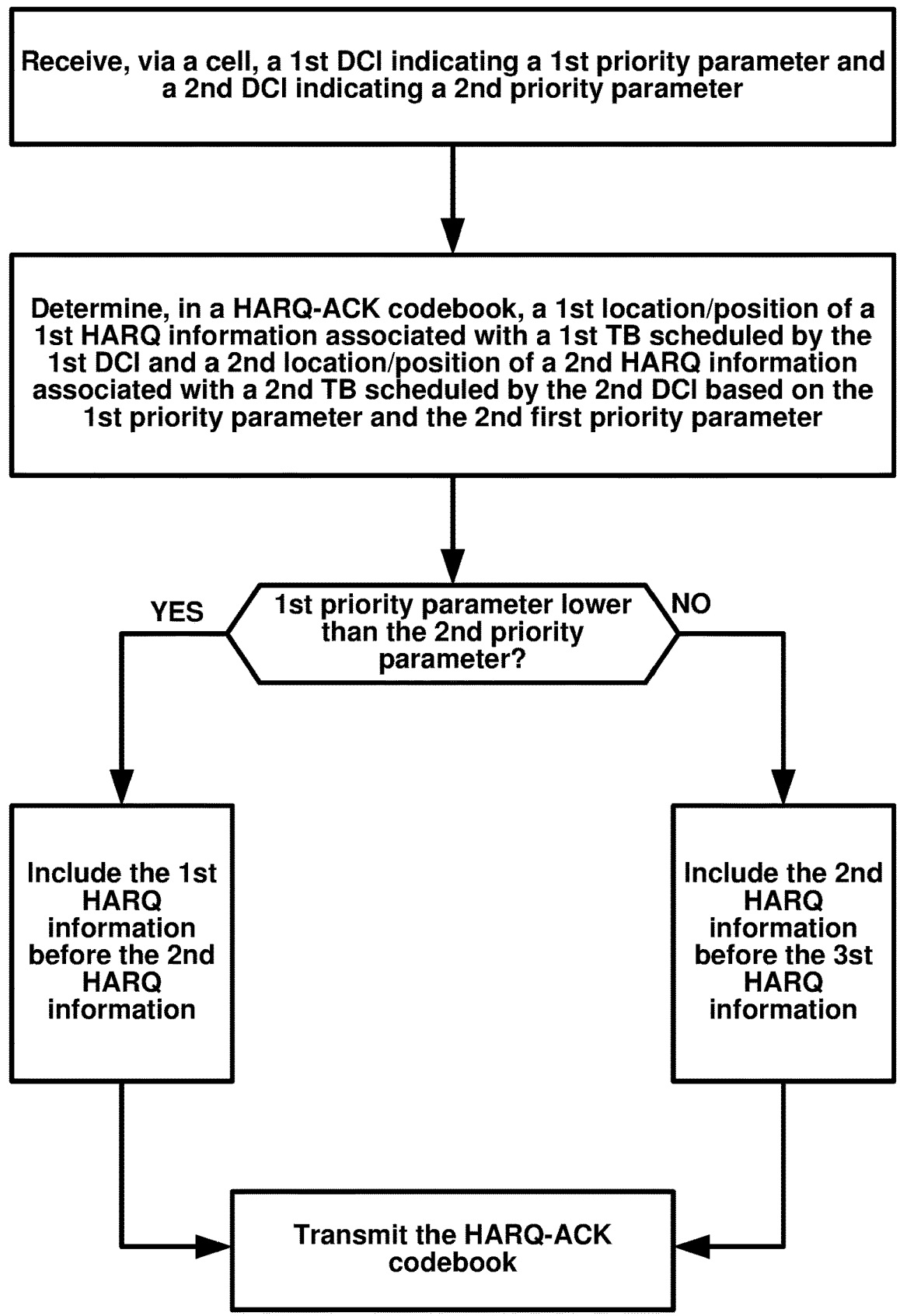
FIG. 26 is an example flow diagram of a HARQ-ACK codebook determination as per an aspect of an embodiment of the present disclosure.

In an example, in FIG. 26, the determining, in the HARQ-ACK codebook, the first location/position of the first HARQ-ACK information/feedback associated with the first TB and the second location/position of the second HARQ-ACK information/feedback associated with the second TB may be based on the first priority parameter and the second priority parameter. In an example, the first HARQ-ACK information/feedback may be recorded/included, by the wireless device, before (or prior, or earlier to) the second HARQ-ACK information/feedback in the HARQ-ACK codebook based on the first priority parameter being lower than the second priority parameter. In an example, the first HARQ-ACK information/feedback may be recorded/included, by the wireless device, before (or prior, or earlier to) the second HARQ-ACK information/feedback in the HARQ-ACK codebook based on the second priority parameter being lower than the first priority parameter. In an example, the second HARQ-ACK information/feedback may be recorded/included, by the wireless device, before (or prior, or earlier to) the first HARQ-ACK information/feedback in the HARQ-ACK codebook based on the second priority parameter being lower than the first priority parameter.

In an example, the determining, in the HARQ-ACK codebook, the first location/position of the first HARQ-ACK information/feedback associated with the first TB and the second location/position of the second HARQ-ACK information/feedback associated with the second TB may be based on the first priority parameter and the second priority parameter. In an example, the first location/position may have a lower bit position in the HARQ-ACK codebook than the second location/position based on the first priority parameter being lower than the second priority parameter. In an example, the first location/position may have a lower bit position in the HARQ-ACK codebook than the second location/position based on the second priority parameter being lower than the first priority parameter.

Figure 27:
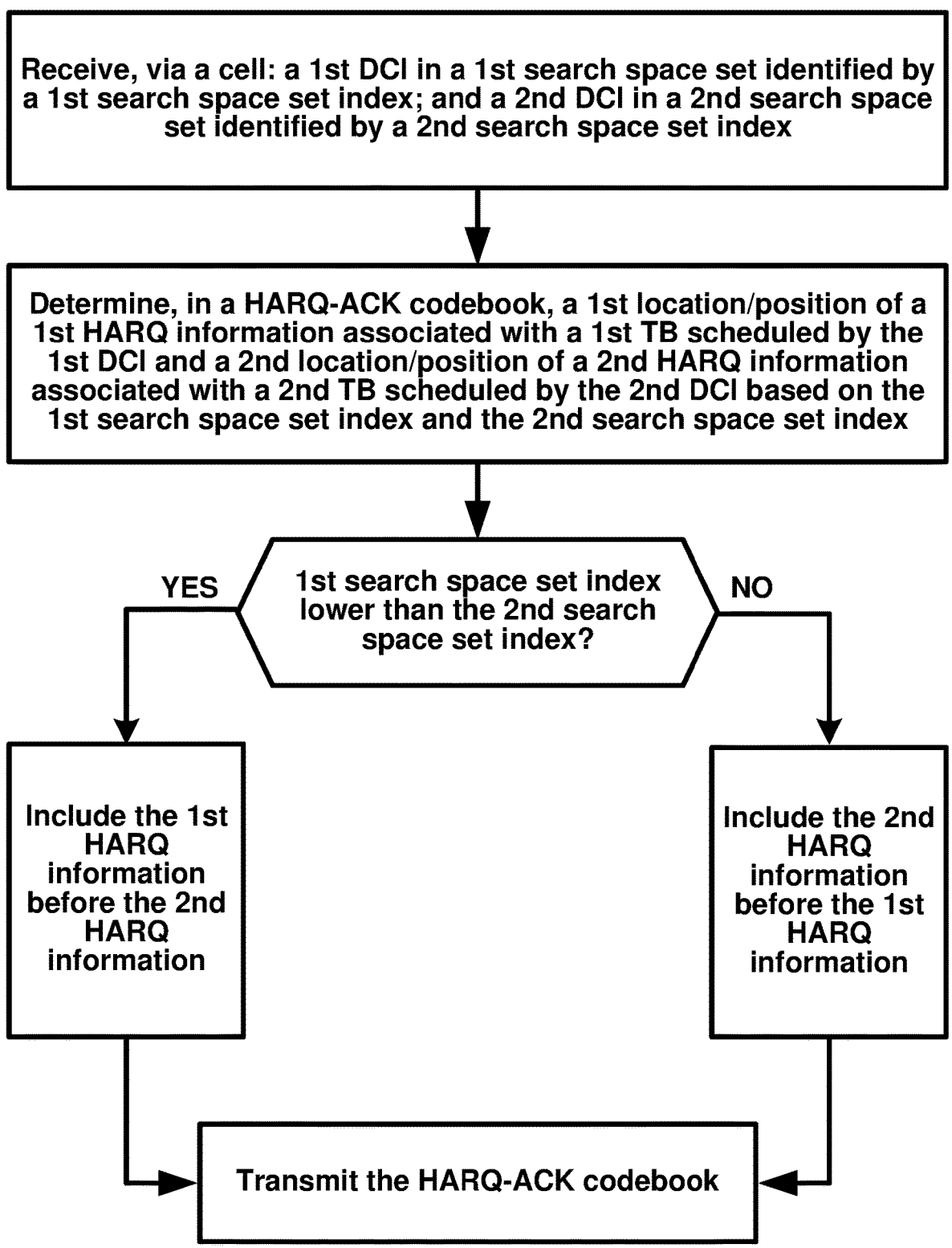
FIG. 27 is an example flow diagram of a HARQ-ACK codebook determination as per an aspect of an embodiment of the present disclosure.

In an example, in FIG. 27, the determining, in the HARQ-ACK codebook, the first location/position of the first HARQ-ACK information/feedback associated with the first TB and the second location/position of the second HARQ-ACK information/feedback associated with the second TB may be based on the first search space set index and the second search space set index. In an example, the first HARQ-ACK information/feedback may be recorded/included, by the wireless device, before (or prior, or earlier to) the second HARQ-ACK information/feedback in the HARQ-ACK codebook based on the first search space set index being before/earlier/lower than the second search space set index. In an example, the first HARQ-ACK information/feedback may be recorded/included, by the wireless device, before (or prior, or earlier to) the second HARQ-ACK information/feedback in the HARQ-ACK codebook based on the second search space set index being before/earlier/lower than the first search space set index. In an example, the second HARQ-ACK information/feedback may be recorded/included, by the wireless device, before (or prior, or earlier to) the first HARQ-ACK information/feedback in the HARQ-ACK codebook based on the second search space set index being before/earlier/lower than the first search space set index.

In an example, the determining, in the HARQ-ACK codebook, the first location/position of the first HARQ-ACK information/feedback associated with the first TB and the second location/position of the second HARQ-ACK information/feedback associated with the second TB may be based on the first search space set index and the second search space set index. In an example, the first location/position may have a lower bit position in the HARQ-ACK codebook than the second location/position based on the first search space set index being before/earlier/lower than the second search space set index. In an example, the first location/position may have a lower bit position in the HARQ-ACK codebook than the second location/position based on the second search space set index being before/earlier/lower than the first search space set index.

Figure 28:
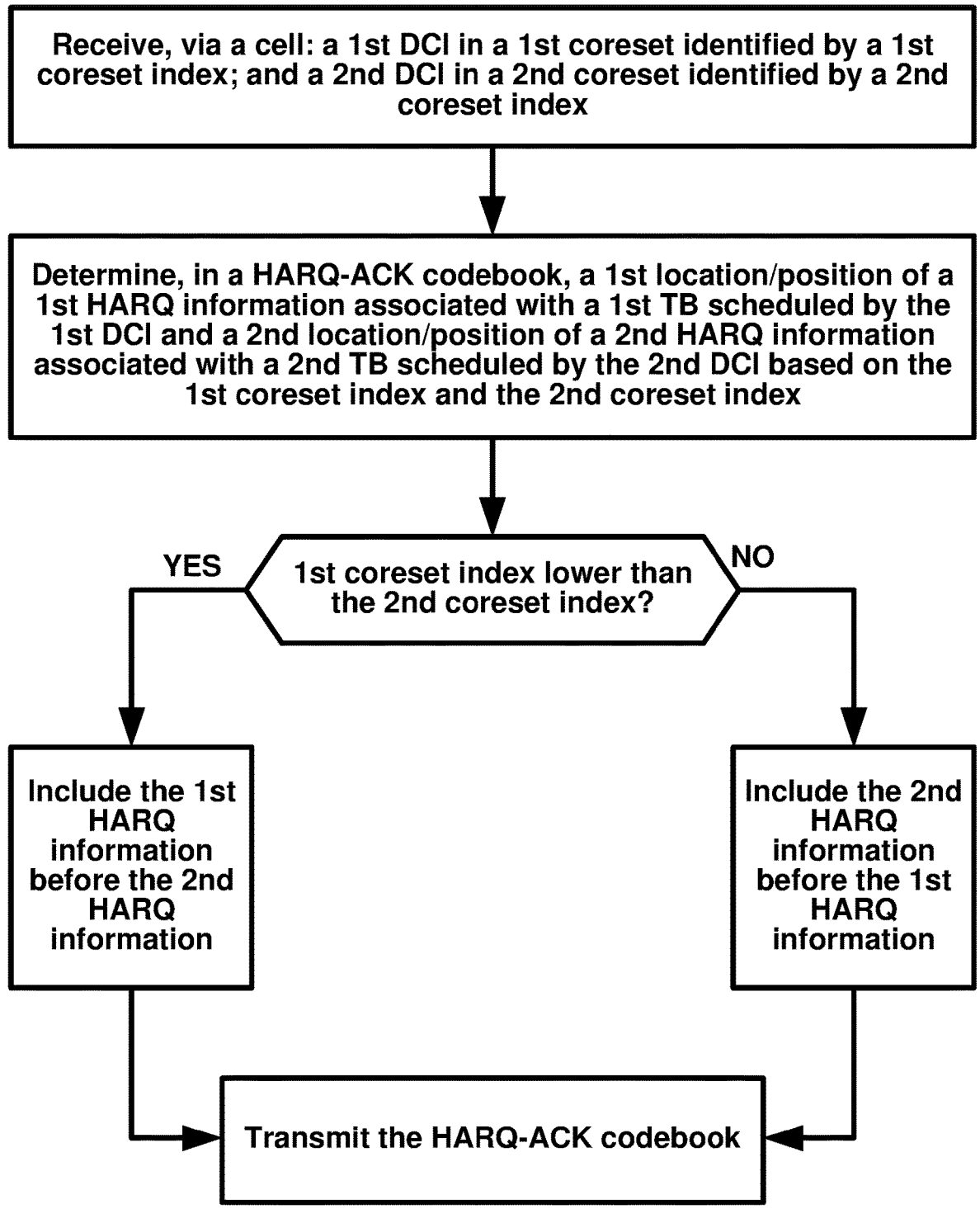
FIG. 28 is an example flow diagram of a HARQ-ACK codebook determination as per an aspect of an embodiment of the present disclosure.

In an example, in FIG. 28, the determining, in the HARQ-ACK codebook, the first location/position of the first HARQ-ACK information/feedback associated with the first TB and the second location/position of the second HARQ-ACK information/feedback associated with the second TB may be based on the first coreset index and the second coreset index. In an example, the first HARQ-ACK information/feedback may be recorded/included, by the wireless device, before (or prior, or earlier to) the second HARQ-ACK information/feedback in the HARQ-ACK codebook based on the first coreset index being before/earlier/lower than the second coreset index. In an example, the first HARQ-ACK information/feedback may be recorded/included, by the wireless device, before (or prior, or earlier to) the second HARQ-ACK information/feedback in the HARQ-ACK codebook based on the second coreset index being before/earlier/lower than the first coreset index. In an example, the second HARQ-ACK information/feedback may be recorded/included, by the wireless device, before (or prior, or earlier to) the first HARQ-ACK information/feedback in the HARQ-ACK codebook based on the second coreset index being before/earlier/lower than the first coreset index.

In an example, the determining, in the HARQ-ACK codebook, the first location/position of the first HARQ-ACK information/feedback associated with the first TB and the second location/position of the second HARQ-ACK information/feedback associated with the second TB may be based on the first coreset index and the second coreset index. In an example, the first location/position may have a lower bit position in the HARQ-ACK codebook than the second location/position based on the first coreset index being before/earlier/lower than the second coreset index. In an example, the first location/position may have a lower bit position in the HARQ-ACK codebook than the second location/position based on the second coreset index being before/earlier/lower than the first coreset index.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 29:
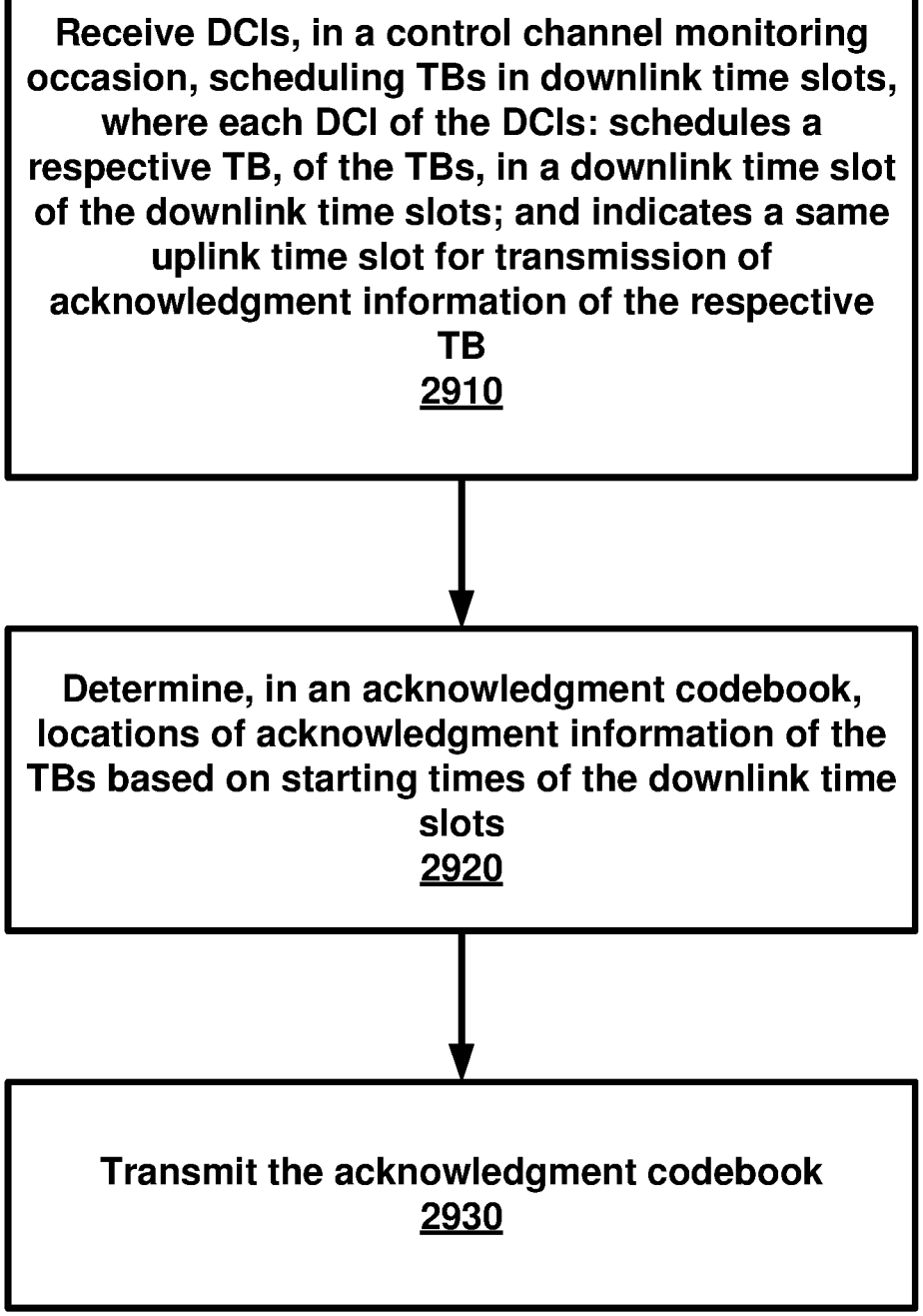
FIG. 29 is a flow diagram of an aspect of an example embodiment of the present disclosure.

FIG. 29 is a flow diagram as per an aspect of an example embodiment of the present disclosure. At 2910, a wireless device may receive a plurality of downlink control information (DCIs) in a control channel monitoring occasion. The plurality of DCIs may schedule transport blocks (TBs) in downlink time slots. Each DCI of the plurality of DCIs may schedule a respective TB, of the TBs, in a downlink time slot of the downlink time slots. Each DCI of the plurality of DCIs may indicate a same uplink time slot for transmission of acknowledgement information of the respective TB. At 2920, the wireless device may determine, in an acknowledgement codebook, locations of acknowledgement information of the TBs based on starting times of the downlink time slots. At 2930, the wireless device may transmit the acknowledgement codebook.

According to an example embodiment, the receiving the plurality of DCIs in the control channel monitoring occasion may comprise receiving the plurality of DCIs in the control channel monitoring occasion of a cell. The control channel monitoring occasion may be a physical downlink control channel (PDCCH) monitoring occasion.

According to an example embodiment, the acknowledgement information may be a hybrid automatic repeat request acknowledgement (HARQ-ACK) information. The acknowledgement codebook may be a HARQ-ACK codebook.

FIG. 30 is a flow diagram as per an aspect of an example embodiment of the present disclosure. At 3010, a base station may transmit a plurality of downlink control information (DCIs) in a control channel monitoring occasion. The plurality of DCIs may schedule transport blocks (TBs) in downlink time slots. Each DCI of the plurality of DCIs may schedule a respective TB, of the TBs, in a downlink time slot of the downlink time slots. Each DCI of the plurality of DCIs may indicate a same uplink time slot for reception of acknowledgement information of the respective TB. At 3020, the base station may determine, in an acknowledgement codebook, locations of acknowledgement information of the TBs based on starting times of the downlink time slots. At 3030, the base station may receive the acknowledgement codebook.

According to an example embodiment, the transmitting the plurality of DCIs in the control channel monitoring occasion may comprise transmitting the plurality of DCIs in the control channel monitoring occasion of a cell. The control channel monitoring occasion may be a physical downlink control channel (PDCCH) monitoring occasion.

According to an example embodiment, the acknowledgement information may be a hybrid automatic repeat request acknowledgement (HARQ-ACK) information. The acknowledgement codebook may be a HARQ-ACK codebook.

Figure 31:
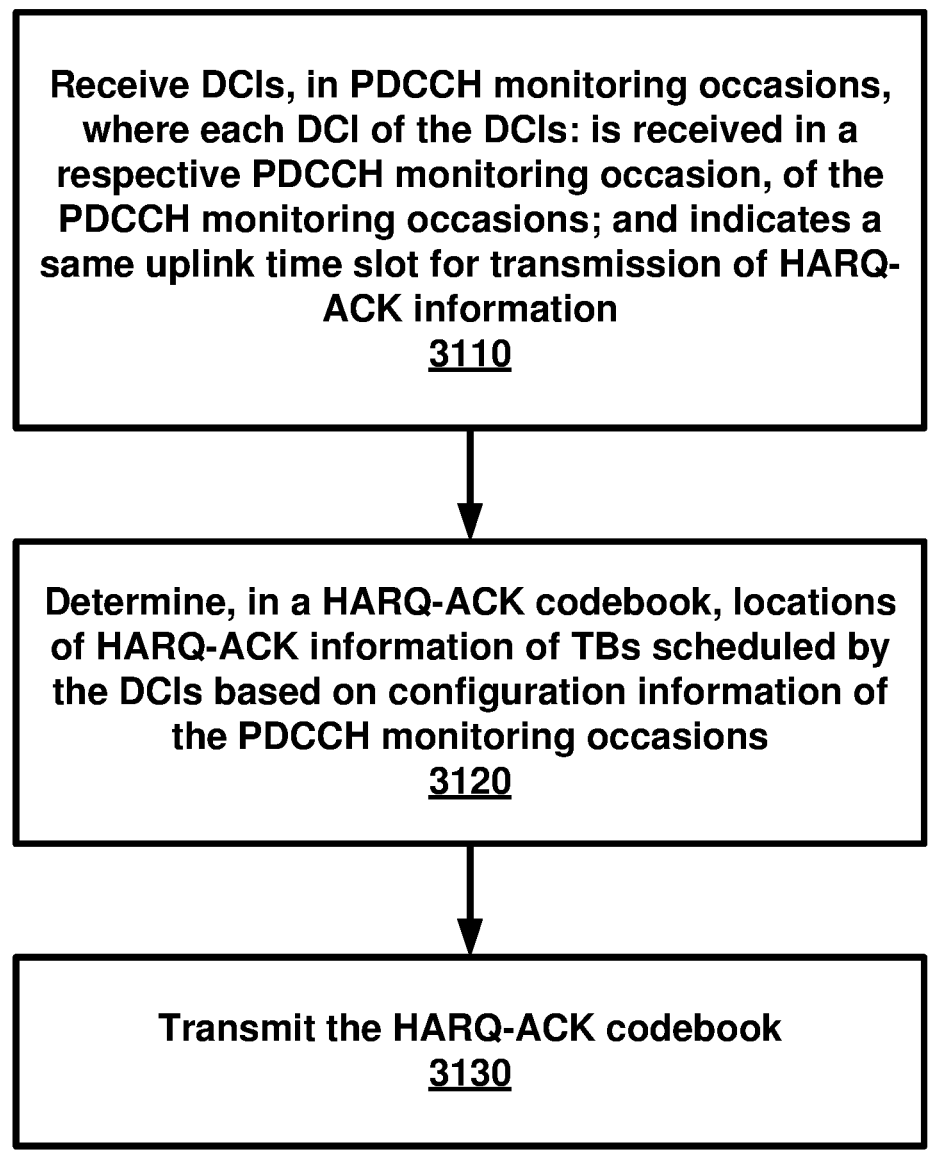
FIG. 31 is a flow diagram of an aspect of an example embodiment of the present disclosure.

FIG. 31 is a flow diagram as per an aspect of an example embodiment of the present disclosure. At 3110, a wireless device may receive a plurality of downlink control information (DCIs) in control channel monitoring occasions. The wireless device may receive each DCI of the plurality of DCIs in a respective control channel monitoring occasion of the control channel monitoring occasions. The plurality of DCIs may schedule transport blocks (TBs). Each DCI of the plurality of DCIs may schedule a respective TB of the TBs. Each DCI of the plurality of DCIs may indicate a same uplink time slot for transmission of acknowledgement information of the respective TB. At 3120, the wireless device may determine, in an acknowledgement codebook, locations of acknowledgement information of the TBs based on configuration information of the control channel monitoring occasions. At 3130, the wireless device may transmit the acknowledgement codebook.

According to an example embodiment, the receiving the plurality of DCIs in the control channel monitoring occasions may comprise receiving the plurality of DCIs in the control channel monitoring occasions of a cell. The control channel monitoring occasions may be physical downlink control channel (PDCCH) monitoring occasions.

According to an example embodiment, the acknowledgement information may be a hybrid automatic repeat request acknowledgement (HARQ-ACK) information. The acknowledgement codebook may be a HARQ-ACK codebook.

According to an example embodiment, a wireless device may receive a plurality of downlink control information (DCIs) in a physical downlink control channel (PDCCH) monitoring occasion of a cell. The plurality of DCIs may schedule transport blocks (TBs) in downlink time slots. Each DCI of the plurality of DCIs may schedule a respective TB, of the TBs, in a downlink time slot of the downlink time slots. Each DCI of the plurality of DCIs may indicate a same uplink time slot for transmission of hybrid automatic repeat request acknowledgement (HARQ-ACK) information of the respective TB. According to an example embodiment, the wireless device may determine, in a HARQ-ACK codebook, locations of HARQ-ACK information of the TBs based on starting times of the downlink time slots. According to an example embodiment, the wireless device may transmit, via an uplink channel, the HARQ-ACK codebook.

According to an example embodiment, each DCI of the plurality of DCIs may comprise a field indicating the same uplink time slot for transmission of HARQ-ACK information of the respective TB.

According to an example embodiment, the wireless device receives the TBs.

According to an example embodiment, the uplink channel may be a physical uplink control channel (PUCCH) resource. According to an example embodiment, the PUCCH resource may be a long PUCCH format or a short PUCCH format. According to an example embodiment, the uplink channel may be a physical uplink shared channel (PUSCH) resource.

According to an example embodiment, the determining the locations may be based on an ordering of the downlink time slots. According to an example embodiment, the ordering may be an ascending ordering. According to an example embodiment, the ordering may be a descending ordering.

According to an example embodiment, each DCI of the plurality of DCIs may comprise a second field indicating a respective priority parameter. According to an example embodiment, the determining the locations may be based on priority parameters that the plurality of DCIs indicate. According to an example embodiment, the determining the locations based on the priority parameters may comprise determining locations in an ordering of the priority parameters that the plurality of DCIs indicate. According to an example embodiment, the ordering may be an ascending ordering. According to an example embodiment, the ordering may be a descending ordering.

According to an example embodiment, each DCI of the plurality of DCIs may indicate a respective service type. According to an example embodiment, the determining the locations may be based on service types that the plurality of DCIs indicate. According to an example embodiment, the determining the locations based on the service types may comprise determining locations in an ordering of the service types that the plurality of DCIs indicate. According to an example embodiment, the ordering may be an ascending ordering. According to an example embodiment, the ordering may be a descending ordering. According to an example embodiment, a DCI indicating a service type may comprise a cyclic redundancy check (CRC) of the DCI being scrambled with a radio network temporary identifier (RNTI) associated with the service type. According to an example embodiment, the service type may be one of a plurality of service types. The plurality of service types may comprise Ultra-reliable low latency communication (uRLLC), Enhanced Mobile Broadband (eMBB) and Massive machine type communications (mMTC).

According to an example embodiment, the plurality of DCIs may schedule the TBs for a scheduled cell. According to an example embodiment, the cell may be cross-carrier scheduling the scheduled cell. According to an example embodiment, a subcarrier spacing of the cell may be lower than a subcarrier spacing of the scheduled cell.

According to an example embodiment, the transmitting the HARQ-ACK codebook may comprise transmitting the HARQ-ACK codebook in an uplink time slot that is the same as the same uplink time slot indicated by the plurality of DCIs.

According to an example embodiment, the receiving the plurality of DCIs in the PDCCH monitoring occasion of the cell may comprise receiving plurality of DCIs in the PDCCH monitoring occasion of a same slot or a same subframe or a same time interval.

According to an example embodiment, the determining the locations may be based on each DCI of the plurality of DCIs indicating the same uplink time slot.

According to an example embodiment, a wireless device may receive downlink control information (DCIs) in a control channel monitoring occasion. The DCIs may schedule transport blocks (TBs) in downlink time slots. Each DCI of the DCIs may schedule a respective TB, of the TBs, in a downlink time slot of the downlink time slots. Each DCI of the DCIs may indicate a same uplink time slot for transmission of acknowledgement information of the respective TB. According to an example embodiment, the wireless device may determine, in an acknowledgement codebook, locations of acknowledgement information of the TBs based on starting times of the downlink time slots. According to an example embodiment, the wireless device may transmit the acknowledgement codebook.

According to an example embodiment, the receiving the DCIs in the control channel monitoring occasion may comprise receiving the DCIs in the control channel monitoring occasion of a cell. According to an example embodiment, the control channel monitoring occasion may be a physical downlink control channel (PDCCH) monitoring occasion. According to an example embodiment, the acknowledgement codebook may be a hybrid automatic repeat request acknowledgement (HARQ-ACK) codebook. According to an example embodiment, the acknowledgement information may be a HARQ-ACK information.

According to an example embodiment, the wireless device receives the TBs.

According to an example embodiment, a wireless device may receive a plurality of downlink control information (DCIs) in a physical downlink control channel (PDCCH) monitoring occasion of a cell. According to an example embodiment, each DCI of the plurality of DCIs may schedule a respective transport block (TB) in a downlink time slot. According to an example embodiment, each DCI of the plurality of DCIs may indicate a same uplink time slot for transmission of hybrid automatic repeat request acknowledgement (HARQ-ACK) information of the respective TB. According to an example embodiment, the wireless device may determine, in a HARQ-ACK codebook, locations of HARQ-ACK information of TBs scheduled by the plurality of DCIs based on starting times of downlink time slots of the TBs. According to an example embodiment, the wireless device may transmit the HARQ-ACK codebook.

According to an example embodiment, a wireless device may receive a plurality of downlink control information (DCIs) in a physical downlink control channel (PDCCH) monitoring occasion of a cell. According to an example embodiment, the plurality of DCIs may schedule transport blocks (TBs) in downlink time slots. According to an example embodiment, each DCI of the plurality of DCIs may schedule a respective TB, of the TBs, in a downlink time slot of the downlink time slots. According to an example embodiment, each DCI of the plurality of DCIs may indicate a same uplink time slot for transmission of hybrid automatic repeat request acknowledgement (HARQ-ACK) information of the respective TB. According to an example embodiment, the wireless device may determine a first location of HARQ-ACK information, of a first TB of the TBs, in a HARQ-ACK codebook. According to an example embodiment, the determining the first location may be based on a first starting time of a first downlink time slot, of the first TB, among the downlink time slots. According to an example embodiment, the wireless device may transmit the HARQ-ACK codebook.

According to an example embodiment, a wireless device may receive, in a physical downlink control channel (PDCCH) monitoring occasion of a cell, a first downlink control information (DCI). The first DCI may schedule a first transport block (TB) in a first downlink time slot. The first DCI may indicate a first uplink time slot for transmission of a first hybrid automatic repeat request acknowledgement (HARQ-ACK) information of the first TB. According to an example embodiment, the wireless device may receive, in the PDCCH monitoring occasion of the cell, a second DCI. The second DCI may schedule a second TB in a second downlink time slot. The second DCI may indicate a second uplink time slot for transmission of a second HARQ-ACK information of the second TB. According to an example embodiment, in response to the first uplink time slot and the second uplink time slot being the same, the wireless device may determine a first location for the first HARQ-ACK information and a second location for the second HARQ-ACK information in a HARQ-ACK codebook. According to an example embodiment, the determining the first location and the second location may be based on the first downlink time slot and the second downlink time slot. According to an example embodiment, the wireless device may transmit the HARQ-ACK codebook.

According to an example embodiment, the first HARQ-ACK information may be prior to the second HARQ-ACK information in the HARQ-ACK codebook based on the first downlink time slot being earlier than the second downlink time slot.

According to an example embodiment, the first location may have a lower bit position in the HARQ-ACK codebook than the second location based on the first downlink time slot being earlier than the second downlink time slot.

According to an example embodiment, the first HARQ-ACK information may be prior to the second HARQ-ACK information in the HARQ-ACK codebook based on the second downlink time slot being earlier than the first downlink time slot.

According to an example embodiment, the wireless device receives the first TB and the second TB.

According to an example embodiment, a wireless device may receive one or more messages. The one or more messages may comprise one or more configuration parameters for a cell. According to an example embodiment, the one or more configuration parameters may indicate a first search space set. The first search space set may be identified by a first search space set index. The first search space set may indicate a first physical downlink control channel (PDCCH) monitoring occasion with a first start time. According to an example embodiment, the one or more configuration parameters may indicate a second search space set. The second search space set may be identified by a second search space set index. The second search space set may indicate a second PDCCH monitoring occasion with a second start time. According to an example embodiment, the wireless device may receive a first downlink control information (DCI) in the first PDCCH monitoring occasion. The first DCI may schedule a first transport block (TB). According to an example embodiment, the wireless device may receive a second DCI in the second PDCCH monitoring occasion. The second DCI may schedule a second TB. According to an example embodiment, in response to the first start time and the second start time being the same, the wireless device may determine a first location for a first hybrid automatic repeat request acknowledgement (HARQ-ACK) information of the first TB and a second location for a second HARQ-ACK information of the second TB in a HARQ-ACK codebook. According to an example embodiment, the determining the first location and the second location may be based on the first search space set index and the second search space set index. According to an example embodiment, the wireless device may transmit the HARQ-ACK codebook.

According to an example embodiment, the first search space set may be associated with a first control resource set (coreset) identified by a first coreset index. According to an example embodiment, the one or more configuration parameters may indicate the first coreset index for the first coreset. According to an example embodiment, the first search space set being associated with the first coreset may comprise the one or more configuration parameters indicating the first coreset index for the first search space set. According to an example embodiment, the second search space set may be associated with a second coreset identified by a second coreset index. According to an example embodiment, the one or more configuration parameters may indicate the second coreset index for the second coreset. According to an example embodiment, the second search space set being associated with the second coreset may comprise the one or more configuration parameters indicating the second coreset index for the second search space set. According to an example embodiment, the determining the first location and the second location may be based on the first coreset index and the second coreset index. According to an example embodiment, the determining the first location and the second location based on the first coreset index and the second coreset index may comprise determining the first location and the second location in an ordering of the first coreset index and the second coreset index. According to an example embodiment, the ordering may be an ascending ordering. According to an example embodiment, the ordering may be a descending ordering.

According to an example embodiment, a wireless device may receive downlink control information (DCIs) in physical downlink control channel (PDCCH) monitoring occasions associated with search space sets. The search space sets may be identified with search space set indexes. The wireless device may receive each DCI of the DCIs in a respective search space set, of the search space sets, with a search space set index of the search space set indexes. The DCIs may schedule transport blocks (TBs). Each DCI of the DCIs may schedule a respective TB of the TBs. Each DCI of the DCIs may indicate a same uplink time slot for transmission of hybrid automatic repeat request acknowledgement (HARQ-ACK) information of the respective TB. According to an example embodiment, the wireless device may determine, in a HARQ-ACK codebook, locations of HARQ-ACK information of the TBs based on the search space set indexes. According to an example embodiment, the wireless device may transmit the HARQ-ACK codebook.

According to an example embodiment, the wireless device receives the TBs.

According to an example embodiment, the wireless device may receive one or more messages comprising one or more configuration parameters.

According to an example embodiment, the one or more configuration parameters may indicate the search space set indexes for the search space sets. According to an example embodiment, the determining the locations based on the search space set indexes may comprise determining the locations based on an ordering of the search space set indexes. According to an example embodiment, the ordering may be an ascending ordering. According to an example embodiment, the ordering may be a descending ordering.

According to an example embodiment, the determining the locations may be further based on control resource set (coreset) indexes of coresets associated with the search space sets. According to an example embodiment, the determining based on the coreset indexes may comprise determining based on an ordering of the coreset indexes. According to an example embodiment, the ordering may be an ascending ordering. According to an example embodiment, the ordering may be a descending ordering. According to an example embodiment, the one or more configuration parameters may indicate the coreset indexes for the coresets. According to an example embodiment, the coresets being associated with the search space sets may comprise the one or more configuration parameters indicating the coreset indexes of the coresets for the search space sets. Each search space set of the search space sets may be associated with a respective coreset of the coresets.

According to an example embodiment, the determining the locations may be in response to each DCI of the DCIs indicating the same uplink time slot.

According to an example embodiment, a wireless device may receive downlink control information (DCIs) in control channel monitoring occasions. The wireless device may receive each DCI of the DCIs in a respective control channel monitoring occasion of the control channel monitoring occasions. The DCIs may schedule transport blocks (TBs). Each DCI of the DCIs may schedule a respective TB of the TBs. Each DCI of the DCIs may indicate a same uplink time slot for transmission of acknowledgement information of the respective TB. According to an example embodiment, the wireless device may determine, in an acknowledgement codebook, locations of acknowledgement information of the TBs based on configuration information of the control channel monitoring occasions. According to an example embodiment, the wireless device may transmit the acknowledgement codebook.

According to an example embodiment, the receiving the DCIs in the control channel monitoring occasions may comprise receiving the DCIs in the control channel monitoring occasions of a cell. The control channel monitoring occasions may be physical downlink control channel (PDCCH) monitoring occasions.

According to an example embodiment, the acknowledgement information may be a hybrid automatic repeat request acknowledgement (HARQ-ACK) information. The acknowledgement codebook may be a HARQ-ACK codebook.

According to an example embodiment, the wireless device may receive one or more messages comprising the configuration information of the control channel monitoring occasions.

According to an example embodiment, the receiving the DCIs in the control channel monitoring occasions may comprise receiving the DCIs in the control channel monitoring occasions associated with search space sets that are identified with search space set indexes. According to an example embodiment, the configuration information of the control channel monitoring occasions may indicate the search space set indexes for the search space sets. According to an example embodiment, the determining the locations based on the configuration information of the control channel monitoring occasions may comprise determining the locations based on the search space set indexes. According to an example embodiment, the determining based on the search space set indexes may comprise determining based on an ordering of the search space set indexes. According to an example embodiment, the ordering may be an ascending ordering. According to an example embodiment, the ordering may be a descending ordering.

According to an example embodiment, the receiving the DCIs in the control channel monitoring occasions may comprise receiving the DCIs in the control channel monitoring occasions associated with control resource sets that are identified with control resource set indexes. According to an example embodiment, the configuration information of the control channel monitoring occasions may indicate the control resource set indexes for the control resource sets. According to an example embodiment, the determining the locations based on the configuration information of the control channel monitoring occasions may comprise determining the locations based on the control resource set indexes of the control resource sets. According to an example embodiment, the determining based on the control resource set indexes may comprise determining based on an ordering of the control resource set indexes. According to an example embodiment, the ordering may be an ascending ordering. According to an example embodiment, the ordering may be a descending ordering.

According to an example embodiment, the determining the locations may be in response to each DCI of the DCIs indicating the same uplink time slot. According to an example embodiment, the wireless device receives the TBs.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
    receiving, by a wireless device, one or more messages comprising one or more configuration parameters indicating:
        a first subcarrier spacing for a first bandwidth part (BWP) of a scheduling cell; and
        a second subcarrier spacing for a second BWP of a scheduled cell different from the scheduling cell, wherein the first subcarrier spacing is lower than the second subcarrier spacing;
    receiving, in a control channel monitoring occasion in a time slot of the scheduling cell and via the scheduling cell, a plurality of downlink control information (DCIs) scheduling transport blocks (TBs) for the scheduled cell, wherein a number of the plurality of DCIs is based on the first subcarrier spacing and the second subcarrier spacing;
    ordering, in an acknowledgement codebook, acknowledgement information bits of the TBs based on starting times associated with the TBs; and
    transmitting the acknowledgement codebook.

2. The method of claim 1, wherein each DCI of the plurality of DCIs indicates a same uplink time slot for transmission of acknowledgement information of a respective TB of the TBs.

3. The method of claim 1, wherein each DCI of the plurality of DCIs schedules a respective TB of the TBs.

4. The method of claim 1, wherein the plurality of DCIs are a plurality of unicast DCIs.

5. The method of claim 1, wherein the ordering acknowledgement information bits is based on an ascending order of the starting times associated with the TBs, wherein each TB of the TBs is ordered in a respective time of the starting times.

6. The method of claim 1, wherein the ordering acknowledgement information of the TBs based on the starting times associated with the TBs is in response to receiving the plurality of DCIs in the same control channel monitoring occasion of the same cell.

7. The method of claim 1, wherein the number of the plurality of DCIs is:
two in response to the first subcarrier spacing and the second subcarrier spacing being 30 kHz and 60 kHz, respectively; and
four in response to the first subcarrier spacing and the second subcarrier spacing being:
15 kHz and 60 kHz, respectively; or
30 kHz and 120 kHz, respectively.

8. A wireless device comprising:
one or more processors; and
memory storing instructions that, when executed by the one or more processors, cause the wireless device to:
receive one or more messages comprising one or more configuration parameters indicating:
a first subcarrier spacing for a first bandwidth part (BWP) of a scheduling cell; and
a second subcarrier spacing for a second BWP of a scheduled cell different from the scheduling cell, wherein the first subcarrier spacing is lower than the second subcarrier spacing;
receive, in a control channel monitoring occasion in a time slot of the scheduling cell and via the scheduling cell, a plurality of downlink control information (DCIs) scheduling transport blocks (TBs) for the scheduled cell, wherein a number of the plurality of DCIs is based on the first subcarrier spacing and the second subcarrier spacing;
order, in an acknowledgement codebook, acknowledgement information bits of the TBs based on starting times associated with the TBs; and
transmit the acknowledgement codebook.

9. The wireless device of claim 8, wherein each DCI of the plurality of DCIs indicates a same uplink time slot for transmission of acknowledgement information of a respective TB of the TBs.

10. The wireless device of claim 8, wherein each DCI of the plurality of DCIs schedules a respective TB of the TBs.

11. The wireless device of claim 8, wherein the plurality of DCIs are a plurality of unicast DCIs.

12. The wireless device of claim 8, wherein the ordering acknowledgement information bits is based on an ascending order of the starting times associated with the TBs, wherein each TB of the TBs is ordered in a respective starting time of the starting times.

13. The wireless device of claim 8, wherein the ordering acknowledgement information of the TBs based on the starting times associated with the TBs is in response to receiving the plurality of DCIs in the same control channel monitoring occasion of the same cell.

14. The wireless device of claim 8, wherein the number of the plurality of DCIs is:
two in response to the first subcarrier spacing and the second subcarrier spacing being 30 kHz and 60 kHz, respectively; and
four in response to the first subcarrier spacing and the second subcarrier spacing being:
15 kHz and 60 kHz, respectively; or
30 kHz and 120 kHz, respectively.

15. A non-transitory computer-readable medium comprising instructions that, when executed by one or more processors of a wireless device, cause the wireless device to:
receive one or more messages comprising one or more configuration parameters indicating:
a first subcarrier spacing for a first bandwidth part (BWP) of a scheduling cell; and
a second subcarrier spacing for a second BWP of a scheduled cell different from the scheduling cell, wherein the first subcarrier spacing is lower than the second subcarrier spacing;
receive, in a control channel monitoring occasion in a time slot of the scheduling cell and via the scheduling cell, a plurality of downlink control information (DCIs) scheduling transport blocks (TBs) for the scheduled cell, wherein a number of the plurality of DCIs is based on the first subcarrier spacing and the second subcarrier spacing;
order, in an acknowledgement codebook, acknowledgement information bits of the TBs based on starting times associated the TBs; and
transmit the acknowledgement codebook.

16. The non-transitory computer-readable medium of claim 15, wherein each DCI of the plurality of DCIs indicates a same uplink time slot for transmission of acknowledgement information of a respective TB of the TBs.

17. The non-transitory computer-readable medium of claim 15, wherein each DCI of the plurality of DCIs schedules a respective TB of the TBs.

18. The non-transitory computer-readable medium of claim 15, wherein the plurality of DCIs are a plurality of unicast DCIs.

19. The non-transitory computer-readable medium of claim 15, wherein the ordering acknowledgement information bits is based on an ascending order of the starting times associated with of time slots of the TBs, wherein each TB of the TBs is ordered in a respective starting time of the starting times.

20. The non-transitory computer-readable medium of claim 15, wherein the number of the plurality of DCIs is:
two in response to the first subcarrier spacing and the second subcarrier spacing being 30 KHz and 60 kHz, respectively; and
four in response to the first subcarrier spacing and the second subcarrier spacing being:
15 kHz and 60 KHz, respectively; or
30 KHz and 120 kHz, respectively.

* * * * *